United States Patent
Kim et al.

(10) Patent No.: US 11,121,832 B2
(45) Date of Patent: *Sep. 14, 2021

(54) METHOD AND APPARATUS FOR TRANSMITTING DATA USING A MULTI-CARRIER IN A MOBILE COMMUNICATION SYSTEM

(71) Applicant: Samsung Electronics Co., Ltd., Suwon-si (KR)

(72) Inventors: Soeng Hun Kim, Yongin-si (KR); Gert-Jan Van Lieshout, Middlesex (GB); Sang Bum Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/674,847

(22) Filed: Nov. 5, 2019

(65) Prior Publication Data

US 2020/0067664 A1 Feb. 27, 2020

Related U.S. Application Data

(63) Continuation of application No. 16/107,714, filed on Aug. 21, 2018, which is a continuation of application
(Continued)

(30) Foreign Application Priority Data

Aug. 10, 2012 (KR) .................. 10-2012-0087760

(51) Int. Cl.
*H04J 3/00* (2006.01)
*H04L 5/00* (2006.01)
(Continued)

(52) U.S. Cl.
CPC ............ *H04L 5/0032* (2013.01); *H04L 5/001* (2013.01); *H04L 5/005* (2013.01); *H04L 5/0064* (2013.01);
(Continued)

(58) Field of Classification Search
CPC .......... H04W 72/0446; H04W 72/042; H04W 72/0413; H04W 56/0045; H04W 56/0015;
(Continued)

(56) References Cited

U.S. PATENT DOCUMENTS 6,370,390 B1 4/2002 Salin et al.
7,515,928 B2 4/2009 Kang
(Continued)

FOREIGN PATENT DOCUMENTS

CN 1229562 A 9/1999
CN 1524392 A 8/2004
(Continued)

OTHER PUBLICATIONS

Korean Notice of Allowance dated May 28, 2020, issued in a counterpart Korean Application No. 10-2013-0006771.
(Continued)

*Primary Examiner* — Atique Ahmed
(74) *Attorney, Agent, or Firm* — Jefferson IP Law, LLP

(57) ABSTRACT

The present disclosure relates to a method and apparatus for transmitting data using a multi-carrier in a mobile communication system. The method of transmitting data in user equipment of a wireless communication system using a carrier aggregation technique according to an embodiment of the present disclosure includes the steps of setting secondary cells included in an S-TAG (Secondary-Timing Advance Group) configured of only secondary cells (SCells), deactivating a downlink timing reference cell in the S-TAG; determining whether other activated secondary
(Continued)

cells exist besides the deactivated downlink timing reference cell in the S-TAG, and when the other activated secondary cells exist in the S-TAG, setting one of the other activated secondary cells as a new downlink timing reference cell. According to the present disclosure, uplink transmission speed can be increased in the user equipment and user QoS can be improved by transmitting data using one or more uplink carriers in the terminal.

16 Claims, 25 Drawing Sheets

Related U.S. Application Data

No. 14/232,740, filed as application No. PCT/KR2012/006407 on Aug. 10, 2012, now abandoned.

(60) Provisional application No. 61/595,646, filed on Feb. 6, 2012, provisional application No. 61/559,674, filed on Nov. 14, 2011, provisional application No. 61/552,114, filed on Oct. 27, 2011, provisional application No. 61/546,532, filed on Oct. 12, 2011, provisional application No. 61/545,363, filed on Oct. 10, 2011, provisional application No. 61/543,939, filed on Oct. 6, 2011, provisional application No. 61/543,475, filed on Oct. 5, 2011, provisional application No. 61/526,223, filed on Aug. 22, 2011, provisional application No. 61/521,910, filed on Aug. 10, 2011.

(51) Int. Cl.
*H04W 56/00* (2009.01)
*H04W 74/08* (2009.01)
*H04L 27/26* (2006.01)

(52) U.S. Cl.
CPC ........ *H04L 5/0098* (2013.01); *H04W 56/0005* (2013.01); *H04W 56/0015* (2013.01); *H04W 56/0045* (2013.01); *H04W 74/0833* (2013.01); *H04L 27/2601* (2013.01)

(58) Field of Classification Search
CPC .......... H04W 56/0005; H04W 74/0833; H04L 5/0048; H04L 5/0053; H04L 5/0032; H04L 5/001; H04L 5/005; H04L 27/2601; H04L 5/0098; H04L 5/0064
See application file for complete search history.

(56) References Cited

U.S. PATENT DOCUMENTS

| | | |
|---|---|---|
| 8,203,987 B2 | 6/2012 | Ishii et al. |
| 8,260,306 B2 | 9/2012 | Lee et al. |
| 8,432,843 B2 | 4/2013 | Cai et al. |
| 8,611,243 B2 | 12/2013 | Ko et al. |
| 8,638,705 B2 | 1/2014 | Park et al. |
| 8,649,288 B2 | 2/2014 | He et al. |
| 8,792,417 B2 | 7/2014 | Yeoum et al. |
| 8,838,046 B2 | 9/2014 | Fu et al. |
| 8,942,630 B2 | 1/2015 | Lee et al. |
| 9,072,025 B2 | 6/2015 | Jen et al. |
| 9,167,483 B2 | 10/2015 | Jang et al. |
| 9,237,419 B2 | 1/2016 | Jung et al. |
| 9,713,104 B2 | 7/2017 | Zhao et al. |
| 2003/0223452 A1 | 12/2003 | Toskala et al. |
| 2004/0053623 A1 | 3/2004 | Hoff et al. |
| 2004/0082328 A1 | 4/2004 | Japenga et al. |
| 2004/0180675 A1 | 9/2004 | Choi et al. |
| 2004/0192313 A1 | 9/2004 | Otting |
| 2004/0203775 A1 | 10/2004 | Bourdeaut et al. |
| 2005/0041608 A1 | 2/2005 | Jeong et al. |
| 2005/0111393 A1 | 5/2005 | Jeong et al. |
| 2006/0023664 A1 | 2/2006 | Jeong et al. |
| 2006/0058034 A1 | 3/2006 | Vaittinen et al. |
| 2006/0281466 A1 | 12/2006 | Gholmieh et al. |
| 2007/0004445 A1 | 1/2007 | Dorsey et al. |
| 2007/0019643 A1 | 1/2007 | Shaheen |
| 2007/0032251 A1 | 2/2007 | Shaheen |
| 2007/0054666 A1 | 3/2007 | Choi |
| 2007/0268877 A1 | 11/2007 | Buckley et al. |
| 2007/0287419 A1 | 12/2007 | Wang |
| 2008/0032662 A1 | 2/2008 | Tu |
| 2008/0225772 A1 | 9/2008 | Xu |
| 2008/0232310 A1* | 9/2008 | Xu ..................... H04W 52/0216 370/329 |
| 2008/0240439 A1 | 10/2008 | Mukherjee et al. |
| 2008/0273610 A1 | 11/2008 | Malladi et al. |
| 2008/0298325 A1 | 12/2008 | Vujcic |
| 2009/0034452 A1 | 2/2009 | Somasundaram et al. |
| 2009/0054055 A1 | 2/2009 | Iwamura et al. |
| 2009/0170498 A1 | 7/2009 | Venkatasubramanian et al. |
| 2009/0221289 A1 | 9/2009 | Xu et al. |
| 2009/0232054 A1 | 9/2009 | Wang et al. |
| 2009/0232118 A1 | 9/2009 | Wang et al. |
| 2009/0238098 A1 | 9/2009 | Cai et al. |
| 2009/0238105 A1 | 9/2009 | Wu et al. |
| 2009/0239525 A1 | 9/2009 | Cai et al. |
| 2009/0247176 A1 | 10/2009 | Song et al. |
| 2009/0247218 A1 | 10/2009 | Lee et al. |
| 2009/0253470 A1 | 10/2009 | Xu |
| 2009/0285141 A1 | 11/2009 | Cai et al. |
| 2009/0316586 A1* | 12/2009 | Yi ..................... H04W 74/002 370/242 |
| 2009/0316637 A1* | 12/2009 | Yi ..................... H04W 28/0278 370/329 |
| 2009/0323608 A1 | 12/2009 | Adachi et al. |
| 2010/0029283 A1 | 2/2010 | Iwamura |
| 2010/0075635 A1 | 3/2010 | Lim et al. |
| 2010/0091702 A1 | 4/2010 | Luo et al. |
| 2010/0093386 A1 | 4/2010 | Damnjanovic et al. |
| 2010/0110897 A1* | 5/2010 | Chun ..................... H04L 43/0811 370/241 |
| 2010/0110945 A1 | 5/2010 | Koskela et al. |
| 2010/0111019 A1 | 5/2010 | Wu |
| 2010/0118805 A1 | 5/2010 | Ishii et al. |
| 2010/0135159 A1 | 6/2010 | Chun et al. |
| 2010/0144361 A1 | 6/2010 | Gholmieh et al. |
| 2010/0172280 A1 | 7/2010 | Guo et al. |
| 2010/0177831 A1 | 7/2010 | Kim et al. |
| 2010/0195643 A1 | 8/2010 | Kodali et al. |
| 2010/0197310 A1 | 8/2010 | Jung et al. |
| 2010/0210255 A1 | 8/2010 | Amirijoo et al. |
| 2010/0240358 A1 | 9/2010 | Jen et al. |
| 2010/0255847 A1 | 10/2010 | Lee et al. |
| 2010/0296467 A1 | 11/2010 | Pelletier et al. |
| 2010/0317356 A1 | 12/2010 | Roessel et al. |
| 2010/0322217 A1 | 12/2010 | Jin et al. |
| 2010/0330921 A1 | 12/2010 | Kim et al. |
| 2011/0002284 A1 | 1/2011 | Talwar et al. |
| 2011/0003603 A1 | 1/2011 | Park et al. |
| 2011/0021197 A1 | 1/2011 | Ngai |
| 2011/0038277 A1 | 2/2011 | Hu et al. |
| 2011/0039558 A1 | 2/2011 | Lee et al. |
| 2011/0051609 A1 | 3/2011 | Ishii et al. |
| 2011/0053932 A1 | 3/2011 | Sim et al. |
| 2011/0058521 A1 | 3/2011 | Xu et al. |
| 2011/0085535 A1 | 4/2011 | Shaheen |
| 2011/0098046 A1 | 4/2011 | Shin |
| 2011/0103328 A1 | 5/2011 | Lee et al. |
| 2011/0103332 A1 | 5/2011 | Kuo |
| 2011/0105123 A1 | 5/2011 | Lee et al. |
| 2011/0116433 A1 | 5/2011 | Dorenbosch |
| 2011/0124334 A1 | 5/2011 | Brisebois et al. |
| 2011/0134774 A1 | 6/2011 | Pelletier et al. |
| 2011/0158116 A1 | 6/2011 | Tenny et al. |
| 2011/0158165 A1 | 6/2011 | Dwyer et al. |
| 2011/0164560 A1 | 7/2011 | Ki et al. |
| 2011/0170503 A1 | 7/2011 | Chun et al. |
| 2011/0171967 A1 | 7/2011 | Lee et al. |

(56) References Cited

U.S. PATENT DOCUMENTS

| | | |
|---|---|---|
| 2011/0183662 A1 | 7/2011 | Lee et al. |
| 2011/0188416 A1 | 8/2011 | Faccin et al. |
| 2011/0190000 A1 | 8/2011 | Kwun |
| 2011/0194505 A1 | 8/2011 | Faccin et al. |
| 2011/0195668 A1 | 8/2011 | Lee et al. |
| 2011/0199923 A1 | 8/2011 | Persson et al. |
| 2011/0216732 A1 | 9/2011 | Maeda et al. |
| 2011/0222451 A1 | 9/2011 | Peisa et al. |
| 2011/0243016 A1 | 10/2011 | Zhang et al. |
| 2011/0243106 A1 | 10/2011 | Hsu et al. |
| 2011/0249641 A1 | 10/2011 | Kwon et al. |
| 2011/0275365 A1 | 11/2011 | Fischer et al. |
| 2011/0294491 A1 | 12/2011 | Fong et al. |
| 2011/0299415 A1 | 12/2011 | He et al. |
| 2012/0008600 A1 | 1/2012 | Marinier et al. |
| 2012/0020231 A1 | 1/2012 | Chen et al. |
| 2012/0044898 A1 | 2/2012 | Ishii |
| 2012/0113831 A1 | 5/2012 | Pelletier et al. |
| 2012/0113876 A1 | 5/2012 | Li et al. |
| 2012/0113905 A1* | 5/2012 | Anderson ............ H04W 76/38 370/329 |
| 2012/0113948 A1 | 5/2012 | Kwon et al. |
| 2012/0135709 A1 | 5/2012 | Deng et al. |
| 2012/0176950 A1 | 7/2012 | Zhang et al. |
| 2012/0236776 A1 | 9/2012 | Zhang et al. |
| 2012/0250520 A1 | 10/2012 | Chen et al. |
| 2012/0276913 A1 | 11/2012 | Lim et al. |
| 2012/0300715 A1 | 11/2012 | Pelletier et al. |
| 2012/0300752 A1 | 11/2012 | Kwon et al. |
| 2012/0307669 A1 | 12/2012 | Kim et al. |
| 2012/0314640 A1 | 12/2012 | Kim et al. |
| 2013/0010619 A1 | 1/2013 | Fong et al. |
| 2013/0023267 A1 | 1/2013 | Ong et al. |
| 2013/0028185 A1 | 1/2013 | Wu |
| 2013/0039250 A1 | 2/2013 | Hsu |
| 2013/0051259 A1 | 2/2013 | Kim et al. |
| 2013/0083739 A1 | 4/2013 | Yamada |
| 2013/0090142 A1 | 4/2013 | Lee et al. |
| 2013/0235780 A1* | 9/2013 | Kim ................ H04W 72/0473 370/311 |
| 2013/0265866 A1 | 10/2013 | Yi et al. |
| 2013/0301421 A1* | 11/2013 | Yi ........................ H04W 76/28 370/241 |
| 2014/0023032 A1 | 1/2014 | Kim et al. |
| 2014/0044074 A1 | 2/2014 | Chen et al. |
| 2014/0119255 A1 | 5/2014 | Vannithamby et al. |
| 2014/0185595 A1 | 7/2014 | Wu et al. |
| 2014/0219185 A1 | 8/2014 | Etemad et al. |
| 2014/0228032 A1 | 8/2014 | Jung et al. |
| 2014/0233516 A1 | 8/2014 | Chun et al. |
| 2014/0233535 A1 | 8/2014 | Zhao et al. |
| 2014/0242974 A1 | 8/2014 | Lee et al. |
| 2015/0044972 A1 | 2/2015 | Lee et al. |
| 2015/0334636 A1 | 11/2015 | Maeda et al. |
| 2017/0195020 A1 | 7/2017 | Ko et al. |

FOREIGN PATENT DOCUMENTS

| | | |
|---|---|---|
| CN | 1671240 A | 9/2005 |
| CN | 1738486 A | 2/2006 |
| CN | 1809187 A | 7/2006 |
| CN | 1829380 A | 9/2006 |
| CN | 101213857 A | 7/2008 |
| CN | 101242608 A | 8/2008 |
| CN | 101370269 A | 2/2009 |
| CN | 101426256 A | 5/2009 |
| CN | 101553054 A | 10/2009 |
| CN | 101668250 A | 3/2010 |
| CN | 101682896 A | 3/2010 |
| CN | 101729990 A | 6/2010 |
| CN | 101772928 A | 7/2010 |
| CN | 101841830 A | 9/2010 |
| CN | 101841889 A | 9/2010 |
| CN | 102027798 A | 4/2011 |
| CN | 102098655 A | 6/2011 |
| CN | 102104905 A | 6/2011 |
| CN | 102118801 A | 7/2011 |
| CN | 102123516 A | 7/2011 |
| CN | 102123520 A | 7/2011 |
| CN | 102170644 A | 8/2011 |
| CN | 102204357 A | 9/2011 |
| EP | 0946071 A2 | 9/1999 |
| EP | 2104256 A1 | 9/2009 |
| EP | 2 117 279 A1 | 11/2009 |
| EP | 2 230 872 A1 | 9/2010 |
| EP | 2280576 A1 | 2/2011 |
| EP | 2 369 875 A1 | 9/2011 |
| EP | 2 469 939 A1 | 6/2012 |
| EP | 2555444 A2 | 2/2013 |
| EP | 2 693 801 A1 | 2/2014 |
| EP | 2693826 A1 | 2/2014 |
| GB | 2461780 A | 1/2010 |
| JP | 2013-135386 A | 7/2013 |
| KR | 10-2005-0015729 A | 2/2005 |
| KR | 10-2005-0032953 A | 4/2005 |
| KR | 10-2008-0031493 A | 4/2008 |
| KR | 10-2008-0089421 A | 10/2008 |
| KR | 10-2009-0019868 A | 2/2009 |
| KR | 10-2009-0039813 A | 4/2009 |
| KR | 10-2009-0086441 A | 8/2009 |
| KR | 10-2009-0104482 A | 10/2009 |
| KR | 10-2010-0017513 A | 2/2010 |
| KR | 10-2010-0034885 A | 4/2010 |
| KR | 10-2010-0051906 A | 5/2010 |
| KR | 10-2010-0105488 A | 9/2010 |
| KR | 10-2010-0106890 A | 10/2010 |
| KR | 10-2010-0108459 A | 10/2010 |
| KR | 10-2010-0135679 A | 12/2010 |
| KR | 10-2010-0137507 A | 12/2010 |
| KR | 10-2010-0139098 A | 12/2010 |
| KR | 2010-0126509 A | 12/2010 |
| KR | 2010-0133477 A | 12/2010 |
| KR | 2010-0137531 A | 12/2010 |
| KR | 10-2011-0000479 A | 1/2011 |
| KR | 10-2011-0000482 A | 1/2011 |
| KR | 10-2011-0010100 A | 1/2011 |
| KR | 10-2011-0049622 A | 5/2011 |
| KR | 10-2011-0081086 A | 7/2011 |
| KR | 10-2011-0081441 A | 7/2011 |
| KR | 10-2011-0088446 A | 8/2011 |
| KR | 10-2011-0093642 A | 8/2011 |
| KR | 10-2011-0095088 A | 8/2011 |
| KR | 2011-0091305 A | 8/2011 |
| KR | 2011-0109992 A | 10/2011 |
| RU | 2 262 811 C2 | 10/2005 |
| RU | 2009121539 C2 | 12/2010 |
| RU | 2 411 697 C2 | 2/2011 |
| RU | 2 426 251 C2 | 8/2011 |
| WO | 1998/01004 A2 | 1/1998 |
| WO | 1998/26625 A2 | 6/1998 |
| WO | 2005/122621 A1 | 12/2005 |
| WO | 2008/024788 A3 | 2/2008 |
| WO | 2008-081816 A1 | 7/2008 |
| WO | 2008/137354 A1 | 11/2008 |
| WO | 2008/157573 A1 | 12/2008 |
| WO | 2008-157575 A1 | 12/2008 |
| WO | 2010/063316 A1 | 6/2010 |
| WO | 2010/108358 A1 | 9/2010 |
| WO | 2010/121662 A1 | 10/2010 |
| WO | 2010/124228 A2 | 10/2010 |
| WO | 2010-125969 A1 | 11/2010 |
| WO | 2011-007985 A3 | 1/2011 |
| WO | 2011/017944 A1 | 2/2011 |
| WO | 2011/035420 A1 | 3/2011 |
| WO | 2011/038625 A1 | 4/2011 |
| WO | 2011/050921 A1 | 5/2011 |
| WO | 2011-063244 A2 | 5/2011 |
| WO | 2011/085200 A1 | 7/2011 |
| WO | 2011/085802 A1 | 7/2011 |
| WO | 2011/093666 A2 | 8/2011 |
| WO | 2011/105856 A2 | 9/2011 |
| WO | 2011/122910 A2 | 10/2011 |
| WO | 2011/154761 A1 | 12/2011 |

(56) References Cited

FOREIGN PATENT DOCUMENTS

| WO | 2012/108811 A1 | 8/2012 |
|---|---|---|
| WO | 2012/108876 A1 | 8/2012 |
| WO | 2012-141483 A2 | 10/2012 |
| WO | 2012/165821 A1 | 12/2012 |
| WO | 2013/025237 A1 | 2/2013 |
| WO | 2013-051836 A1 | 4/2013 |
| WO | 2013-051912 A2 | 4/2013 |
| WO | 2013-065995 A2 | 5/2013 |

OTHER PUBLICATIONS

Korean Notice of Allowance dated Jun. 29, 2020, issued in a counterpart Korean Application No. 10-2019-0037950.
3rd Generation Partnership Project; Technical Specification Group Radio Access Network; Evolved Universal Terrestrial Radio Access (E-UTRA); Medium Access Control (MAC) protocol specification (Release 10), 3GPP TS 36.321 V10.4.0, Dec. 15, 2011, Valbonne, France.
3rd Generation Partnership Project; Technical Specification Group Radio Access Network; Evolved Universal Terrestrial Radio Access (E-UTRA); User Equipment (UE) procedures in idle mode (Release 10), 3GPP TS 36.304 V10.3.0 (Sep. 2011), Valbonne, France.
Ericsson, ST-Ericsson, Extended access barring for MTC devices, 3GPP TSG-RAN WG2 #74, R2-113030, May 13, 2011, Barcelona, Spain.
Intel Corporation, EAB for RAN overload protection, 3GPP TSG RAN WG2 Meeting #74, R2-113217, May 13, 2011, Barcelona, Spain.
Korean Office Action dated Nov. 28, 2019, issued in the Korean Application No. 10-2013-0006771.
European Summons to attend oral proceedings dated Dec. 2, 2019, issued in the European Application No. 12 837 968.2.
Korean Decision of Patent dated Dec. 19, 2019, issued in the Korean Application No. 10-2012-0140229.
Chinese Office Action dated Dec. 30, 2019, issued in the Chinese Application No. 201710210508.8.
Korean Office Action dated Feb. 5, 2020, issued in the Korean Application No. 10-2019-0169542.
LG Electronics Inc. et al., Capability indication of handover support between LTE FDD and LTE TDD, 3GPP TSG RAN WG2 #74, R2-113282, Barcelona, Spain, May 3, 2011.
Nokia Corporation et al., UE capability signaling for CA and MIMO in REL10, 3GPP TSG RAN WG2 #72, R2-106934, Jacksonville, U.S.A, Nov. 28, 2010.
HTC Corporation et al., Correction to field descriptions of UE-EUTRA-Capability, 3GPP TSG RAN WG2 #68bis, R2-100769, Valencia, Spain, Jan. 21, 2010.
3rd Generation Partnership Project; Technical Specification Group Services and System Aspects; Service accessibility (Release 10), 3GPP TS 22.011 V10.3.0, XP050914344, Apr. 1, 2011.
Canadian Office Action dated Jun. 6, 2019, issued in the Canadian Application No. 2,859,499.
Korean Office Action dated Jun. 17, 2019, issued in the Korean Application No. 10-2019-0068946.
European Search Report dated Jul. 3, 2019, issued in the European Application No. 19165270.0.
Indian Office Action dated Jul. 3, 2019, issued in the Indian Application No. 62/KOLNP/2014.
Ericsson et al., CSI and SRS reporting at unexpected DRX state change, 3GPP TSG RAN WG2 #75, R2-114033, Aug. 15, 2011.
Nokia Siemens Networks et al., Clarification on CQI/SRS reporting during DRX, 3GPP TSG RAN WG2 #75, R2-114021, Aug. 15, 2011.
Huawei, HiSilicon, Consideration on coverage optimization, 3GPP TSG-RAN WG2 Meeting #76, R2-115885, Nov. 14-18, 2011.
Research in Motion UK Limited, Interference measurement for BT, 3GPP TSG-RAN WG2 Meeting #77, R2-120183, Jan. 27, 2012.

Jordi Perez-Romero et al., RRM Algorithms, Radio Resource Management Strategies in UMTS, John Wiley & Sons, Ltd, Chichester, UK, Jun. 17, 2005.
Ericsson et al., Introduction of relays in MAC, 3GPP TSG RAN WG2 #71, R2-105210, Oct. 5, 2010.
Texas Instruments, Increasing Sounding Capacity for LTE-A, 3GPP TSG RAN WG1 #59bis, R1-100745, Jan. 21, 2010.
Korean Office Action dated Sep. 4, 2019, issued in the Korean Application No. 10-2012-0113330.
Korean Decision on Patent dated Sep. 5, 2019, issued in the Korean Application No. 10-2013-0002595.
Korean Decision on Patent dated Sep. 18, 2019, issued in the Korean Application No. 10-2013-0004568.
Korean Decision on Patent dated Sep. 20, 2019, issued in the Korean Application No. 10-2014-7008813.
Indian Office Action dated Sep. 18, 2019, issued in the Indian Application No. 3851/KOLNP/2013.
European Search Report dated Oct. 24, 2019, issued in the European Application No. 19179723.2.
Indian Office Action dated Oct. 22, 2019, issued in the Indian Application No. 763/KOLNP/2014.
Korean Office Action dated Oct. 23, 2019, issued in the Korean Application No. 10-2012-0087760.
SAMSUNG: "Discussion on CQI/SRS transmission during DRX", 3GPP TSG-RAN2 #75 Meeting, R2-114180, XP050539989, Aug. 22, 2011.
3rd Generation Partnership Project; Technical Specification Group Radio Access Network; Study on Minimization of drive-tests in Next Generation Networks; (Release 9), 3GPP TR 36.805, V9.0.0, Dec. 2009, pp. 1-24.
Huawei et al., The MDT applicability of EPLMN, 3GPP Change Request 36.331 CR CRNum, 10.2.0, 3GPP TSG-WG2 #75, R2-114011, Athens, Greece, Aug. 22 to 26, 2011, pp. 1-16.
3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10), 3GPP TS 37.320, V10.4.0, Dec. 2011, pp. 1-18.
23.1 RRC Connection Establishment, published on Aug. 12, 2011 as per WayBack Machine. [retrieved from internet on Mar. 9, 2017], Aug. 12, 2011.
Nokia Corporation et al., RACH and carrier aggregation, 3GPP DRAFT, R2-096844, Jeju, South Korea, Nov. 9, 2009.
Asustek, Issues of Random Access procedure on SCell, 3GPP DRAFT, R2-112922, XP050495298, Barcelona, Spain, May 3, 2011.
ITRI, Considerations on Random Access on SCell, 3GPP DRAFT, R2-113192, XP050495362, Barcelona, Spain, May 3, 2011.
New Postcom, Consideration on RA response window size for SCell, 3GPP DRAFT, R2-123485, XP050665586, Qingdao, China, Aug. 7, 2012.
LG Electronics Inc, Applicable Scope of PCI/PSC range of CSG cells, 3GPP TSG-RAN WG2 #75bis, R2-115448 Zhuhai, China, Oct. 4, 2011.
"3rd Generation Partnership Project; Technical Specification Group Radio Access Network; Evolved Universal Terrestrial Radio Access (E-UTRA); User Equipment (UE) radio transmission and reception (Release 10)", 3GPP Standard; 3GPP TS 36.101, No. V10.3.0, Jun. 21, 2011, pp. 1-237, XP050553331.
Vodafone, Extended ACB for TRAN, 3GPP TSG-RAN WG2#72 R2-106275, 3GPP, Nov. 9, 2010.
Vodafone, Rejection of Connections towards a congested CN Node for UM TS and LTE, 3GPP TSG-RAN WG3#69bis R3-102964, 3GPP, Oct. 12, 2010.
ITRI, Handling of Roaming MTC Devices for CN overload control, 3GPP TSG-RAN WG2#72bis R2-110399, 3GPP, Jan. 11, 2011.
NEC, DOCOMO, NTC, Samsung, vSRVCC Enhancements in TS 24.301 excluding vSRVCC indicator (terminology variant 2), 3GPP TSG-CT WG1#72 C1-112670, 3GPP, Jul. 4, 2011.
Interdigital: "RACH with Carrier Aggregation", 3GPP DRAFT; R2-102132 (RACH in CA), 3rd Generation Partnership Project (3GPP), Mobile Competence Centre; 650, Route Des Lucioles;

(56) References Cited

OTHER PUBLICATIONS

F-06921 Sophia-Antipolis Cedex; France, vol. RAN WG2, No. Beijing, china; Apr. 12, 2010, Apr. 6, 2010, XP050422566.
"3rd Generation Partnership Project; Technical Specification Group Radio Access Network; Evolved Universal Terrestrial Radio Access (E-UTRA); Medium Access Control (MAC) protocol specification (Release 11)", 3GPP Standard; 3GPP TS 36.321, 3rd Generation Partnership Project (3GPP), Mobile Competence Centre; 650, Route Des Lucioles; F-06921 Sophia-Antipolis Cedex; France, vol. RAN WG2, No. V11.0.0, Sep. 21, 2012, pp. 1-55, XP050649832.
3GPP TS 36.321 V10.1.0, 3rd Generation Partnership Project; Technical Specification Group Radio Access Network; Evolved Universal Terrestrial Radio Access (E-UTRA); Medium Access Control (MAC) protocol specification (Release 10), Mar. 2011.
Ericsson et al., "Multiple frequency band indicators per cell", 3GPP TSG-RAN2 Meeting #75, R2-114301, Aug. 26, 2011.
LG Electronics Inc: "FGI bit 25", 3GPP DRAFT; R2-113277 FGI Bit for Inter-Frequency Measurements and Reporting, 3rd Generation Partnership Project (3GPP), Mobile Competence Centre; 650, Route Des Lucioles; F-06921 Sophia-Antipolis Cedex; France, vol. RAN WG2, No. Barcelona, Spain; May 9, 2011, May 3, 2011, XP050495420.
LG Electronics Inc, "Removing linking of primary PLMN to PCI range of CSG cells", 3GPP DRAFT 36.331 CR, 8.14.0, R2-114521, Applicable PLMN scope of PCI range for CSG cells, 3RD Generation Partnership Project, 3GPP TSG RAN2 Meeting No. 75, XP050539644, Aug. 15, 2011, Athens, Greece.
CATT, Corrections and Clarifications on UTRA related, 36.331 CR, 10.5.0, R2-121551, 3GPP TSG-RAN2 Meeting No. 77bis, Mar. 19, 2012, Jeju, Korea.
CATT, Corrections and Clarifications on UTRA related, 36.331 CR, 9.10.0, R2-121549, 3GPP TSG-RAN2 Meeting No. 77bis, Mar. 19, 2012, Jeju, Korea.
CATT, Analysis on FGIs for 3/4-mode UE, 3GPP TSG RAN, WG2 Meeting No. 77bis, R2-121173, Mar. 19, 2012, Jeju, Korea.
Motorola; Solution for Extra Low Power Consumption & Time Controlled; 3GPP TSG SA WG2 Meeting #78; TD S2-101215; Feb. 22-26, 2010; San Francisco, CA.
Ericsson et al.; Extended access barring for MTC devices; 3GPP TSG-RAN WG2 #74; R2-113030; May 9-13, 2011; Barcelona, Spain.
LG Electronics Inc.; Further Discussion on EAB; 3GPP TSG-RAN WG2 #74; R2-113339; May 9-13, 2011; Barcelona, Spain.
3GPP; 3rd Generation Partnership Project; Technical Specification Group Services and System Aspects; Service accessibility (Release 11); 3GPP TS 22.011; V11.0.0; Jun. 2011; Valbonne, France.
Pantech; IDC trigger procedure; 3GPP TSG-RAN WG2 Meeting #77; R2-120664; Nov. 14-18, 2011; Dresden, Germany.
Huawei, HiSilicon Enabling SMS for PS-only, SA WG2 Meeting #87 S2-114586, Oct. 14, 2011.
3rd Generation Partnership Project; Technical 3rd Generation Partnership Project; Technical Aspects, 3GPP TS 23.272 V10.5.0, Aug. 24, 2011.
3GPP TSG-RAN WG2#77 R2-120603, Jan. 30, 2012.
Ericsson, ST-Ericsson, "Accessibility measurements for MDT", 3GPP SG-RAN WG2 #76 Tdoc R2-116148, Nov. 8, 2011.
Alcatel-Lucent, "VLR SGs paging retry", 3GPP SA WG2 Meeting #87 S2-114636, pp. 1-4, Oct. 14, 2011.
3GPP TS 22.011 v11.2.0, Service accessibility, Dec. 31, 2011.
3GPP TSG-RAN WG2 Meeting #75 R2-113988, General consideration of EAB in LTE, Huawei.
Huawei, Hisilicon, Discussion on TA Group Management, 3GPP TSG-RAN WG2 Meeting #74, May 9-13, 2011, pp. 1-4, R2-113285, 3rd Generation Partnership Project, Sophia-Antipolis Cedex, France.
Huawei, Hisilicon, RACH Issues for Supporting Multiple TAs, 3GPP TSG-RAN WG2 Meeting #75, Aug. 22-26, 2011, R2-113994, 3rd Generation Partnership Project, Sophia-Antipolis Cedex, France.
Huawei et al., Consideration on DRX in eICIC Scenario, 3GPP TSG-RAN WG2 Meeting #73, Taipei, Feb. 21-25, 2011, pp. 1-2, R2-111021.

Alcatel-Lucent et al., RRC Signalling Design for Almost Blank Subframe Patterns, 3GPP TSG-RAN WG2 Meeting #72, Jacksonville, USA, Nov. 15-19, 2010, pp. 1-7, R2-106451.
Research in Motion UK Limited, UE Power Saving for eICIC, 3GPP TSG RAN WG2 Meeting #73, Taipei, Taiwan, Feb. 21-25, 2011, R2-111233.
3rd Generation Partnership Project; Technical Specification Group Radio Access Network Extending 850MHz Study Item Technical Report (Release 9), 3GPP TR 37.806, Aug. 2011, V1.1.0, 3GPP, Valbonne, France.
Ericsson et al., Multiple Frequency Band Indicators Per Cell, 3GPP TSG-RAN WG2 #75, Athens, Greece, Aug. 22-26, 2011, pp. 1-5, Tdoc R2-114299.
Huawei, "[75#35]—LTE: MBMS Service Continuity", 3GPP Draft; R2-115017 Summary of Email Discussion 75#35 LTE—MBMS Service Continuity, 3rd Generation Partnership Project (3GPP), Mobile Competence Centre, 650, Route Des Lucioles, F-06921 Sophia-Antipolis Cedex; France, (Oct. 4, 2011), vol. RAN WG2, No. Zhuhai; Oct. 10, 2011, pp. 1-20, XP050540930; Oct. 4, 2011.
Randy H. Katz, "Adaptation and Mobility in Wireless Information Systems", IEEE Personal Communications, (1994), XP011415559 DOI: http://dx.doi.org/10.1109/98.295355.
3rd Generation Partnership Project; Technical Specification Group Radio Access Network; Evolved Universal Terrestrial Radio Access (E-UTRA); User Equipment (UE) radio transmission and reception (Release 10), 3GPP Standard; 3GPP TS 36.101, Jun. 21, 2011 3rd Generation Partnership Project (3GPP), Mobile Competence Centre; 650, route des Lucioles; F-06921 Sophia-Antipolis Cedex; France, vol. RAN WG4, Nr: V10.3.0, pp. 1-237 https://www.etsi.org/deliver/etsi_ts/136100_136199/13610 1/10.03.00_60/ts_136101v100300p.pdf; Jun. 21, 2011.
3GPP, R4-114382 TR 37.806 v1.1.0 change bars, https://www.3gpp.org/ftp/tsg_ran/WG4_Radio/TSGR4_60/docs; Aug. 17, 2011.
Rapporteur (Ericsson) et al., R2-115078, UE soft buffer handling in MAC, 3GPP TSG RAN WG2 #75bis, 3GPP; Oct. 4, 2011.
Huawei, HiSilicon "EAB parameters in shared network" 3GPP TSG-RAN WG2 Meeting #76, R2-115830; Nov. 8, 2011.
MediaTek "Further details on EAB" 3GPP TSG-RAN #76 Meeting, R2-116094; Nov. 8, 2011.
ZTE, Panasonic SierraWireless "Clarification on how EAB is applied in shared Network" 3GPP TSG-RAN Meeting #54, S1-111310; May 13, 2011.
Ericsson, R2-080934, Details of MAC DRX Control, 3GPP TSG RAN WG2 #61, 3GPP; Feb. 4, 20208.
Qualcomm Incorporated, "Assistance Information for MBMS UEs in RRC IDLE mode", 3GPP Draft; R2-115104, 3rd Generation Partnership Project (3GPP), Mobile Competence Centre; 650, Route Des Lucioles; F-06921 Sophia-Antipolis Cedex; France, (Oct. 3, 2011), vol. RAN WG2, No. Zhuhai; Oct. 10, 2011, pp. 1-3, XP050540796; Oct. 3, 2011.
Korean Notice of Allowability dated Feb. 26, 2020, issued in a counterpart Korean Application No. 10-2012-0087076.
Korean Office Action dated Feb. 26, 2020, issued in a counterpart Korean Application No. 10-2012-0113330.
Chinese Office Action dated Mar. 27, 2020, issued in a counterpart Chinese Application No. 201711026422.6.
Chinese Office Action dated Apr. 3, 2020, issued in a counterpart Chinese Application No. 201710709108.1.
Korean Office Action dated Apr. 13, 2020, issued in a counterpart Korean Application No. 10-2012-0087760.
Brazilian Office Action dated Apr. 7, 2020, issued in a counterpart Brazilian Application No. BR1120140087130-0.
Brazilian Office Action dated Mar. 30, 2020, issued in a counterpart Brazilian Application No. BR112014004199-7.
Brazilian Office Action dated Apr. 17, 2020, issued in a counterpart Brazilian Application No. BR112014008194-8.
Huawei et al, "How does the UE determine whether neighbour cells of MBMS frequency can provide the service(s) that it is interested to receive", 3GPP Draft; R2-114430; How Does the UE Determine Whether Neighbour Cells of MBMS Frequency Can Provide the Service(s) That it is Interested to Receive, 3rd Generation Partnership Project (3GPP), Mobile Competence Centre; 650, Route Des,

(56) References Cited

OTHER PUBLICATIONS (Aug. 16, 2011), vol. RAN WG2, No. Athens, Greece; Aug. 22, 2011, pp. 1/4-4/4, XP050552786; Aug. 16, 2011.
Fujitsu, "Discussion on PHR for SCell in Rel-11", 3GPP TSG-RAN WG2 Meeting #75, R2-114485; Aug. 16, 2018.
InterDigital Communications, "Completion of Initial Timing Alignment Procedure for SCells", 3GPP TSG-RAN WG2 #75bis, R2-115408; Oct. 4, 2011.
3GPP, "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10)", 3GPP TS 37.320 V10.3.0; Feb. 10, 2011.
LG Electronics Inc,"MDT coverage optimization enhancement for HetNet", 3GPP TSG-RAN WG2 #75bis, R2-115451; Oct. 4, 2011.
Samsung, "PS-only high level function description", 3GPP TSG SA WG2 Meeting #89, S2-120485; Jan. 31, 2018.
Research in Motion Ltd: "Go to Long Sleep Command for L TE DRX", 3GPP Draft; R2-081868, 3rd Generation Partnership Project (3GPP), Mobile Competence Centre; 650, Route Des Lucioles; F-06921 Sophia-Antipolis Cedex; France, XP050139558; Mar. 25, 2008.
Lte: "E-UTRA; MAC Protocol Specification (3GPP TS 36.321 Version 10.2.0 Release 10)", ETSI TS 136 321 V10.2.0., pp. 34-35,41-44, XP055319954; Jun. 28, 2011.
European Office Action dated Nov. 19, 2018; Application No. 18186199.8-1218.
European Office Action dated Oct. 2, 2018; Application No. 12 837 968.2-1214.
Korean Office Action dated Sep. 3, 2018; Application No. 10-2014-7008813.
Korean Office Action dated Sep. 3, 2018; Application No. 10-2014-7010287.
Korean Office Action dated Sep. 7, 2018; Application No. 10-2014-7012797.
Korean Office Action dated Sep. 10, 2018; Application No. 10-2012-0109917.
Korean Office Action dated Sep. 13, 2018; Application No. 10-2012-0140229.
Ericsson et al., SMS over SGs usage to support NAS procedures for PS only SMS, SA WG2v#89, S2-121108, Feb. 10, 2011.
Huawei et al., Enabling SMS for PS-only, SA WG2 #87, S2-114186, Oct. 4, 2011.
Huawei et al., Support for Enhanced UE Battery Saving, SA WG2 Meeting #89, S2-120715, Jan. 31, 2012.
3rd Generation Partnership Project; Technical Specification Group Radio Access Network; Evolved Universal Terrestrial Radio Access (E-UTRA); Radio Resource Control (RRC); Protocol specification (Release 9), 3GPP TS 36.331 V10.4.0, Dec. 20, 2011.
LG Electronics Inc., R2-114456, EAB model in UE, 3GPP TSG RAN WG2 #75, Aug. 16, 2011.
Korean Decision to Grant dated Dec. 12, 2018, issued in the Korean Application No. 10-2012-0037390.
Korean Office Action dated Dec. 15, 2018, issued in the Korean Application No. 10-2014-7028047.
Japanese Office Action dated Dec. 17, 2018, issued in the Japanese Patent Application No. 2018-073713.
Korean Office Action dated Dec. 20, 2018, issued in the Korean Application No. 10-2013-0012964.
Korean Office Action dated Jan. 3, 2019 , issued in the Korean Application No. 10-2013-0002595.
Korean Office Action dated Jan. 21, 2019, issued in the Korean Application No. 10-2014-7027400.
LG Electronics Inc. "MDT performance at early LTE deployment scenario", 3GPP TSG-RAN WG2 #75bis, 3gpp R2-115451, Oct. 2011.
Samsung, "UL synchronization maintenance for SCELL", 3GPP TSG-RAN WG2 Meeting #75, R2-114164, Aug. 15, 2011.
LG Electronics Inc., "RACH applicability and TA group", 3GPP TSG-RAN WG2 Meeting #75bis, R2-115399, Oct. 4, 2011.
Qualcomm Incorporated, Separate UE capability for FDD and TDD, 3GPP TSG RAN WG2 #74, R2-113059, May 9-13, 2011.
Qualcomm Incorporated, UE capability for FDD and TDD, 3GPP TSG RAN WG2 #73bis, R2-111868, Apr. 11-15, 2011.
Qualcomm Incorporated, Introduction of UE capability for handover between FDD and TDD, 3GPP TSG RAN WG2 #74, R2-113056, May 9-13, 2011.
Ericsson et al., "Registration of MME for SMS", 3GPP SA WG2 Meeting #93, Oct. 12, 2012 S2-124181, Oct. 12, 2012.
3GPP, "3rd Generation Partnership Project; Technical Specification Group Services and System Aspects; Circuit Switched (CS) fallback in Evolved Packet System (EPS); Stage 2 (Release 10)", 3GPP TS 23.272 V10.5.0, Aug. 24, 2011.
Intel Corporation, R2-113215, Configuration of multiple TA in Rel-11 CA, 3GPP TSG RAN WG2 #74, 3GPP, May 3, 2011.
InterDigital Communications, R2-113255, Support for multiple Timing Advance in LTE CA, 3GPP TSG RAN WG2 #74, 3GPP, May 3, 2011.
NTT DOCOMO, Further discussions on LTE-A UE categories/ capabilities, 3GPP TSG-RAN WG4 Ad-hoc meeting #2010-04, R4-103470, Oct. 7, 2010.
Korean Decision of Patent dated Mar. 4, 2019 issued in Korean Application No. 10-2014-7010287.
Korean Office Action dated Mar. 4, 2019 issued in Korean Application No. 10-2014-7008813.
Korean Office Action dated Mar. 11, 2019 issued in Korean Application No. 10-2012-0085793.
Korean Office Action dated Mar. 13, 2019 issued in Korean Application No. 10-2013-0004568.
Korean Office Action dated Mar. 14, 2019 issued in Korean Application No. 10-2012-0140229.
Korean Office Action dated Mar. 18, 2019 issued in Korean Application No. 10-2012-0087760.
Korean Decision of Patent dated Apr. 10, 2019 issued in Korean Application No. 10-2012-0112390.
Korean Decision of Patent dated May 2, 2019 issued in Korean Application No. 10-2019-7009763.
3GPP, 3rd Generation Partnership Project; Technical Specification Group Radio Access Network; Evolved Universal Terrestrial Radio Access (E-UTRA); Radio Resource Control (RRC); Protocol specification (Release 10) 3GPP TS 36.331 V10.3.0, Sep. 2011.
Extended European Search Report dated Jan. 12, 2021, issued in a counterpart European Application No. 20201347.0-1218.
European Office Action dated Feb. 24, 2021, issued in a counterpart European Application No. 12839409.5-1212.
Chairman: "Notes", 3GPP Draft; Notes RAN2 May 13-1700, 3rd Generation Partnership Project (3GPP), Mobile Competence Centre; 650, Route Des Lucioles; F-06921 Sophia-Antipolis Cedex; France, vol. RAN WG2, No. May 9, 2011, pp. 1-84, XP050496185; May 11, 2011, Barcelona, Spain.
Alcatel-Lucent et al: RA procedure on SCell, 3GPP Draft; [1] R2-120603 RACH_V1, 3rd Generation Partnership Project (3GPP), Mobile Competence Centre; 650, Route Des Lucioles; F-06921 Sophia-Antipolis Cedex; France, vol. RAN WG2, No. Feb. 6, 2012-Feb. 10, 2012, XP050565204; Jan. 30, 2012 Dresden, Germany.
CATT: Detail on SCell RACH Configuration, 3GPP Draft; R2-122175, 3rd Generation Partnership Project (3GPP), Mobile Competence Centre; 650, Route Des Lucioles; F-06921 Sophia-Antipolis Cedex; France, vol. RAN WG2, No. May 21, 2012-May 25, 2012, pp. 1-3, XP050607173; May 15, 2012, Prague, Czech Republic.
ETSI: LTE; Evolved Universal Terrestrial Radio Access (E-UTRA); Medium Access Control (MAC) protocol specification, 3GPP TS 36.321 Version 10.4.0 Release 10, XP055132087; Jan. 1, 2012.
New Postcom: "Clarification on the indication for In-device Coexistence" 3GPP Draft; R2-112094; Clarification on the Indication for In-Device Co-Existence, 3rd Generation Partnership Project (3GPP), Mobile Competence Centre; 650, Route Des Lucioles; F-06921 Sophiaantipolis Cedex; France, vol. RAN WG2, No. Apr. 11, 2011, XP050494240; Apr. 3, 2011, Shanghai, China.

(56) References Cited

OTHER PUBLICATIONS

Pantech: "RLF handling due to IDC", 3GPP Draft; R2-112909, 3rd Generation Partnership Project (3GPP), Mobile Competence Centre; 650, Route Des Lucioles; F-06921 Sophia-Antipolis Cedex; France, vol. RAN WG2, No. May 9, 2011, XP050495294; May 3, 2011, Barcelona, Spain.
U.S. Office Action dated Dec. 9, 2020, issued by the U.S. Patent and Trademark Office; U.S. Appl. No. 16/715,587.
A Notification of a Decision to Grant a Patent dated Aug. 31, 2020, issued in a counterpart Korean Application No. 10-2012-0113330.
Ericsson, ST-Ericsson, "UE soft buffer handling in MAC" R2-114568; 3GPP TSG-RAN2 WG2 Meeting #75; Aug. 26, 2011, Athens, Greece.
Nokia Siemens Networks, Nokia Corporation, "HARQ comparison for soft buffer handling" R2-114940; 3GPP TSG-RAN WG2 Meeting #75bis; Oct. 10, 2011, Zhuhai, China.
U.S. Office Action dated Apr. 16, 2021, issued by the U.S. Patent and Trademark Office; U.S. Appl. No. 16/715,587.
Chinese Office Action dated May 8, 2021, issued in a counterpart Chinese Application No. 2020110508237.
European Office Action dated May 4, 2021, issued in a counterpart European Application No. 12 839 782.5-1212.
Intel Corporation: "Enhancements in DRX operation", 3GPP Draft; R2-124974_TEI11_DRX-Final, 3rd Generation Partnership Project (3GPP), Mobile Competence Centre; 650, Route Des Lucioles; F-06921 Sophia-Antipolis Cedex; France, vol. RAN WG2, No. XP050666517; Sep. 28, 2012, Bratislava, Slovakia.
Ericsson et al: "CSI and SRS reporting at unexpected DRX state change", 3GPP Draft; R2-115438 CSI and SRS Reporting at Unexpected DRX State Change, 3rd Generation Partnership Project (3GPP), Mobile Competence CEntre; 650, Route Des Lucioles; F-06921 Sophia-Antipolis Cedex; France, vol. RAN WG2, No. XP050540889; Oct. 3, 2011, Zhuhai.
Samsung: "Discussion on mandating CSI/SRS transmission during uncertain period", 3GPP Draft; R2-124687 Mandating CSLSRS for 4 Subframes, 3rd Generation Partnership Project (3GPP), Mobile Competence Centre; 650, Route Des Lucioles; F-06921 Sophia-Antipolis Cedex; France vol. RAN WG2, No. XP050666412; Sep. 28, 2012, Bratislava, Slovakia.

\* cited by examiner

METHOD AND APPARATUS FOR TRANSMITTING DATA USING A MULTI-CARRIER IN A MOBILE COMMUNICATION SYSTEM

CROSS-REFERENCE TO RELATED APPLICATION(S)

This application is a continuation application of prior application Ser. No. 16/107,714, filed on Aug. 21, 2018, which was a continuation application of prior application Ser. No. 14/232,740, filed on Jan. 14, 2014, which was the U.S. National Stage application under 35 U.S.C. § 371 of an International application number PCT/KR2012/006407, filed on Aug. 10, 2012 and was based on and claimed the priority under 35 U.S.C. § 119(e) of a U.S. Provisional application No. 61/521,910, filed on Aug. 10, 2011 in the U.S. Patent and Trademark Office, a U.S. Provisional application No. 61/526,223, filed on Aug. 22, 2011 in the U.S. Patent and Trademark Office, a U.S. Provisional application No. 61/543,475, filed on Oct. 5, 2011 in the U.S. Patent and Trademark Office, a U.S. Provisional application No. 61/543,939, filed on Oct. 6, 2011 in the U.S. Patent and Trademark Office, a U.S. Provisional application No. 61/545,363, filed on Oct. 10, 2011 in the U.S. Patent and Trademark Office, a U.S. Provisional application No. 61/546,532, filed on Oct. 12, 2011 in the U.S. Patent and Trademark Office, a U.S. Provisional application No. 61/552,114, filed on Oct. 27, 2011 in the U.S. Patent and Trademark Office, a U.S. Provisional application No. 61/559,674, filed on Nov. 14, 2011 in the U.S. Patent and Trademark Office, a U.S. Provisional application No. 61/595,646, filed on Feb. 6, 2012 in the U.S. Patent and Trademark Office and under 35 U.S.C. § 119(a) of a Korean patent application number 10-2012-0087760, filed on Aug. 10, 2012, in the Korean Intellectual Property Office, the disclosure of which is incorporated by reference herein in its entirety.

TECHNICAL FIELD

The present disclosure relates to a method and apparatus for transmitting data using multiple carriers in a mobile communication system.

BACKGROUND ART

The mobile communication system has been developed for the user to communicate on the move. With the rapid advance of technologies, the mobile communication system has evolved to the level capable of providing high speed data communication service as well as voice telephony service.

Recently, as one of the next generation mobile communication system, Long Term Evolution (LTE) is on the standardization by the 3rd Generation Partnership Project (3GPP). LTE is a technology designed to provide high speed packet-based communication of up to 100 Mbps and has been ratified almost.

Recent studies are focused on the LTE-Advanced (LTE-A) for improving data rate with the adaptation of several new techniques to legacy LTE system. Carrier Aggregation (CA) is one of the most important techniques for such a leap in technology. Unlike the conventional data communication using single downlink carrier and single uplink carrier, CA uses multiple downlink and multiple uplink carriers. In order for a terminal to transmit data using multiple uplink carriers, many new requirements such as per-carrier uplink transmission timing management and multi-carrier random access have to be fulfilled. The present disclosure relates to a method and apparatus for transmitting data on the uplink carriers while fulfilling such requirements.

DISCLOSURE OF INVENTION

Technical Problem

The present disclosure has been made in an effort to solve the above problem and aims to provide a method and apparatus for transmitting data using one or more uplink carriers that is capable of improving uplink data rate and end-user Quality of Service (QoS).

Solution to Problem

In accordance with an aspect of the present disclosure, a data transmission method of a terminal in a wireless communication system using a carrier aggregation technology includes configuring secondary carriers included in a Secondary-Timing Advance Group (S-TAT) composed of Secondary Cells (SCells), deactivating a downlink timing reference carrier (Downlink Timing Reference Cell) of the S-TAG, determining whether the S-TAG includes other activated secondary carriers than the deactivated downlink timing reference carrier, and configuring one of the other activated secondary carriers as new downlink timing reference carrier.

In accordance with another aspect of the present disclosure, a terminal transmitting data in a wireless communication system using a carrier aggregation technology includes a transceiver which transmits and receives data and a controller which controls configuring secondary carriers included in a Secondary-Timing Advance Group (S-TAT) composed of Secondary Cells (SCells), deactivating a downlink timing reference carrier (Downlink Timing Reference Cell) of the S-TAG, determining whether the S-TAG includes other activated secondary carriers than the deactivated downlink timing reference carrier, and configuring one of the other activated secondary carriers as new downlink timing reference carrier.

Advantageous Effects of Invention

The data transmission method and apparatus of the present disclosure is capable of improving uplink data rate and end-user QoS by transmitting data using one or more uplink carriers.

MODE FOR THE INVENTION

Exemplary embodiments of the present disclosure are described with reference to the accompanying drawings in detail.

The same reference numbers are used throughout the drawings to refer to the same or like parts. Detailed description of well-known functions and structures incorporated herein may be omitted to avoid obscuring the subject matter of the present disclosure. A description is made of the LTE system and carrier aggregation in brief prior to explaining the present disclosure.

Figure 1:
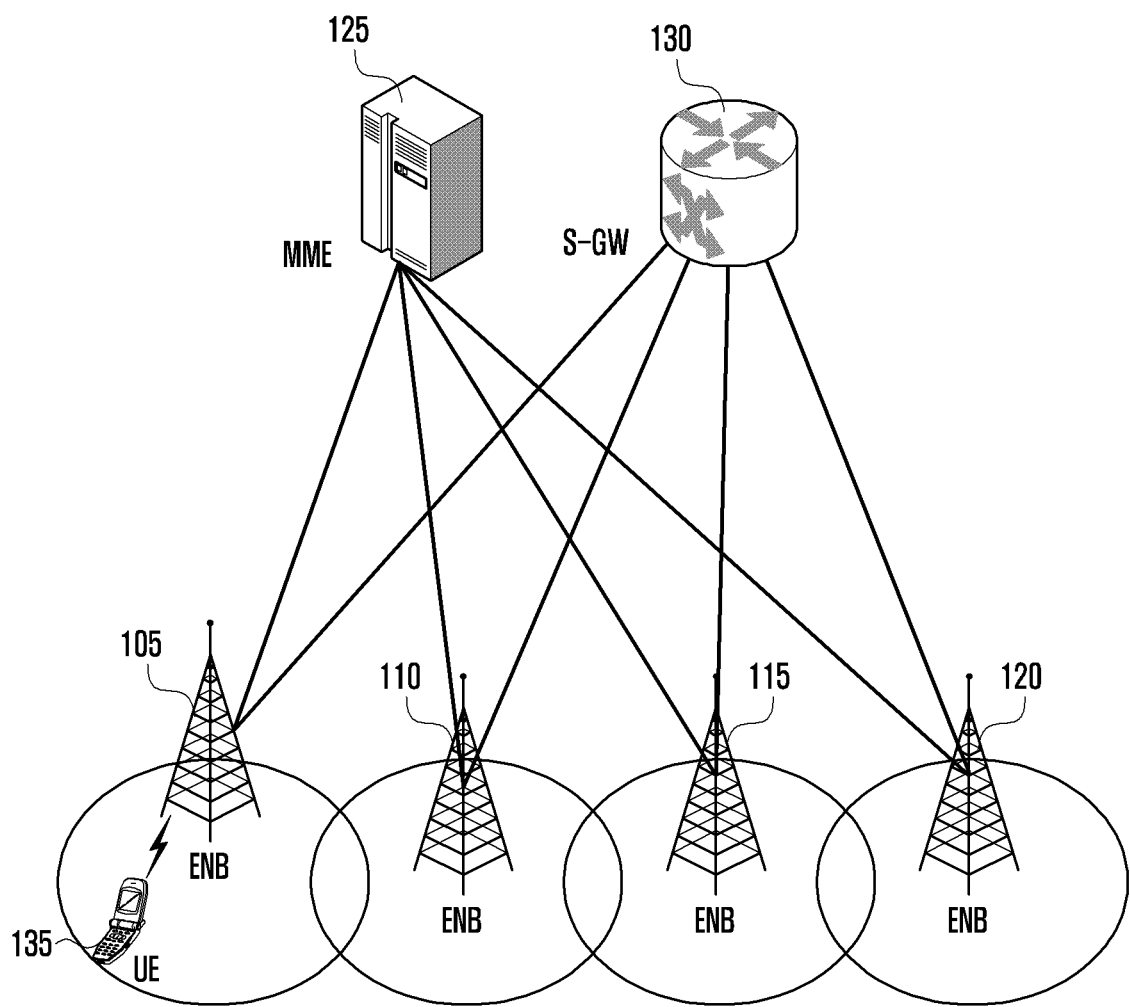
FIG. 1 is a diagram illustrating the architecture of an LTE system to which the present disclosure is applied.

FIG. 1 is a diagram illustrating the architecture of an LTE system to which the present disclosure is applied.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

In FIG. 1, the eNBs 105, 110, 115, and 120 corresponds to the legacy node Bs of the UMTS system. The eNBs 105, 110, 115, and 120 allow the UE to establish a radio link and are responsible for complicated functions as compared to the legacy node B. In the LTE system, all the user traffic including real time services such as Voice over Internet Protocol (VoIP) are provided through a shared channel and thus there is a need of a device which is located in the eNB to schedule data based on the state information such as UE buffer conditions, power headroom state, and channel state. Typically, one eNB controls a plurality of cells. In order to secure the data rate of up to 100 Mbps, the LTE system adopts Orthogonal Frequency Division Multiplexing (OFDM) as a radio access technology. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. MME 125 is responsible for various control functions and connected to a plurality of eNBs.

Figure 2:
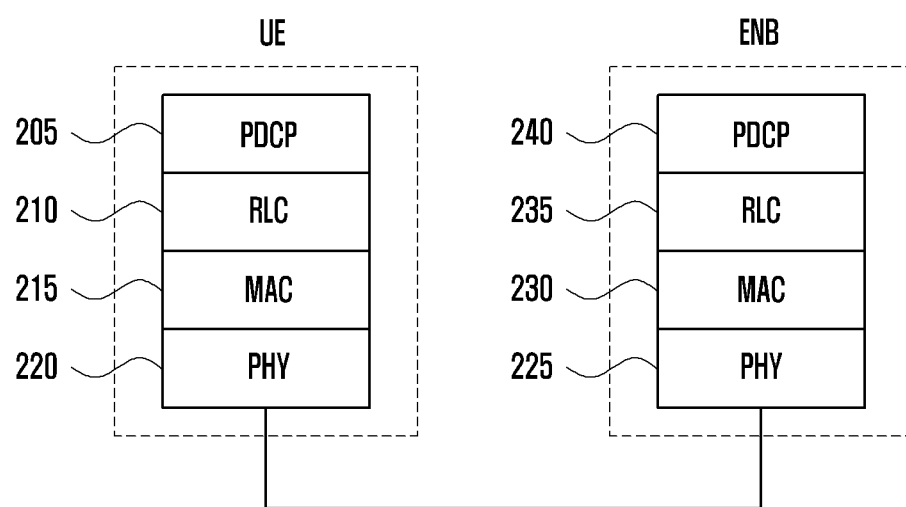
FIG. 2 is a diagram illustrating a protocol stack of the LTE system to which the present disclosure is applied.

FIG. 2 is a diagram illustrating a protocol stack of the LTE system to which the present disclosure is applied.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments in appropriate size for Automatic Repeat Request (ARQ) operation. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer.

Figure 3:
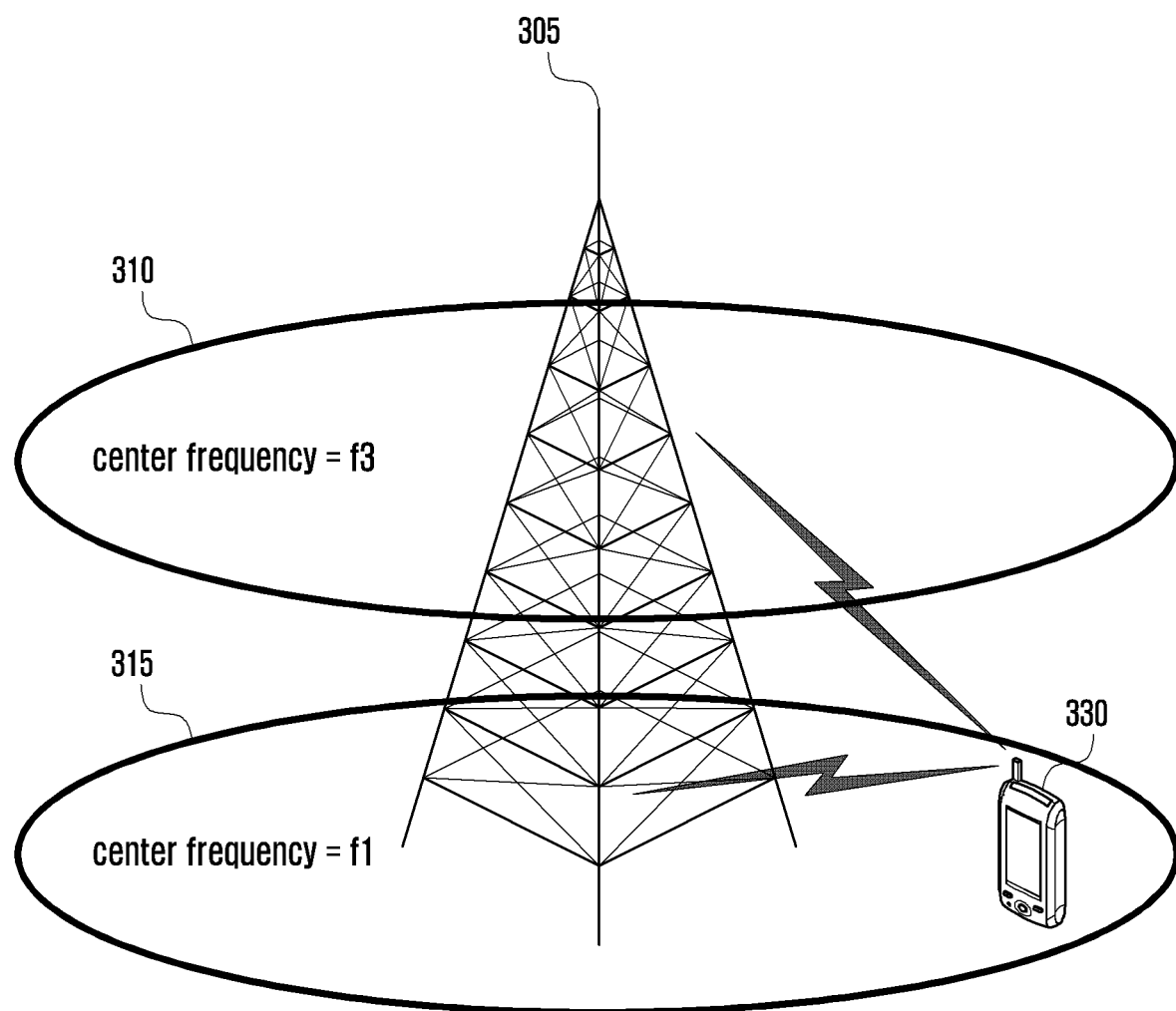
FIG. 3 is a diagram for explaining carrier aggregation.

FIG. 3 is a diagram for explaining carrier aggregation.

Referring to FIG. 3, typically an eNB can use multiple carriers transmitted and receive in different frequency bands. For example, when the eNB 305 is configured to use the carrier 315 with center frequency f1 and the carrier 310 with center frequency f3, the conventional UE has to transmit/receive data using one of the carriers 310 and 315. However, the UE having the carrier aggregation capability can transmit/receive data using multiple carriers simultaneously. The eNB 305 allocates more carriers to the carrier aggregation-enabled UE 330 depending on the condition to increase data rate. Such a technique of aggregating the downlink carriers and/or uplink carriers are is referred to as carrier aggregation.

Terms to be used frequently in describing the present disclosure are as follows.

In case that a cell is configured with one downlink carrier and one uplink carrier as a conventional concept, the carrier aggregation can be understood as if the UE communicates data via multiple cells. With the use of carrier aggregation, the peak data rate increases in proportion to the number of aggregated carriers.

In the following description, the phrase "the UE receives data through a certain downlink carrier or transmits data through a certain uplink carrier" means to transmit or receive data through control and data channels provided in a cell corresponding to center frequencies and frequency bands of the downlink and uplink carriers.

In the present disclosure, carrier aggregation is expressed in the form of configuration of a plurality of serving cells along with the terms such as primary serving cell (PCell), secondary serving cell (S Cell), and activated serving cell. The above terms have the same meanings specified for use in LTE communication system as specified in TS36.331 and TS36.321. In the present disclosure, the terms timeAlignmentTimer, PH (Power Headroom), PHR (Power Headroom Report), Activation/Deactivation MAC Control Element, C-RNTI MAC CE, TAC MAC CE, RAR window, etc. are used in the meanings as specified in TS36.321.

First Embodiment

In the first embodiment of the present disclosure, the random access procedure of a UE configured with a plurality of uplink carriers is performed in such a way of executing different random access operations on the primary and secondary carriers.

Figure 4:
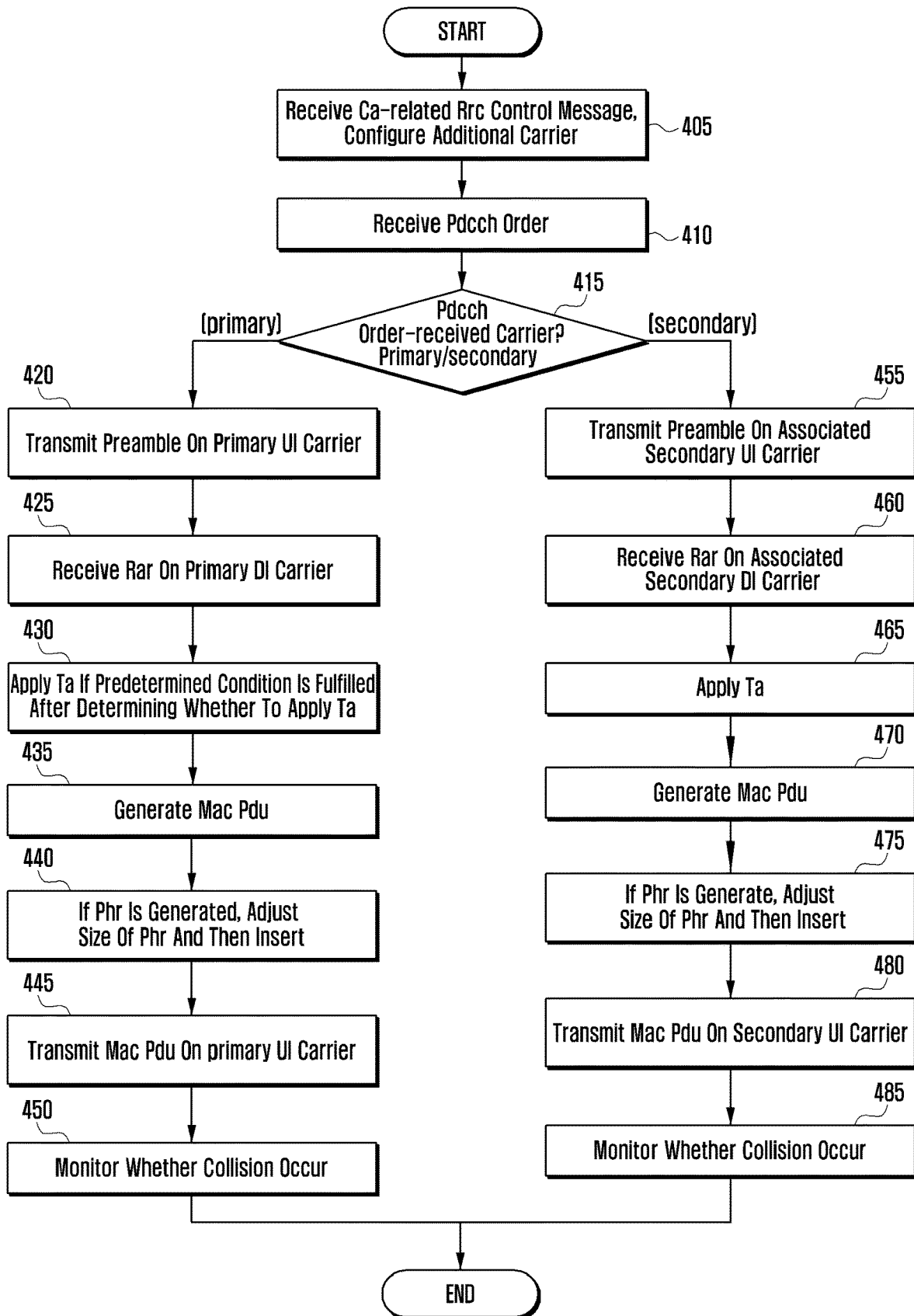
FIG. 4 is a flowchart illustrating the UE operation according to the first embodiment of the present disclosure.

FIG. 4 is a flowchart illustrating the UE operation according to the first embodiment of the present disclosure.

First, the UE receives an RRC control message instructing carrier aggregation at step 405. The RRC control message includes downlink carrier aggregation information and uplink carrier aggregation information. Here, the downlink carrier aggregation information may include downlink carrier frequency and bandwidth, and the uplink carrier aggregation information may include uplink carrier frequency and bandwidth. If the UE receives PDCCH order through a certain downlink carrier, the RRC control message may include the information on the uplink carrier for Random Access Procedure.

Such information may be signaled explicitly using predetermined bits or identifiers. In the present disclosure, however, the downlink carrier information and uplink carrier information associated with random access are arranged close together in the RRC control message 505 to indicate which downlink and uplink carriers are correlated in view of random access. If certain downlink and uplink carriers are correlated in view of random access, this means that the UE which receives PDCCH order on a certain downlink carrier transmits a preamble on the uplink carrier correlated with the downlink carrier in view of random access and, if a random access response message corresponding to the preamble is received, performs uplink transmission using the uplink transmission resource indicated in the random access response message on the uplink carrier. This is described in more detail with reference to FIG. 5.

Figure 5:
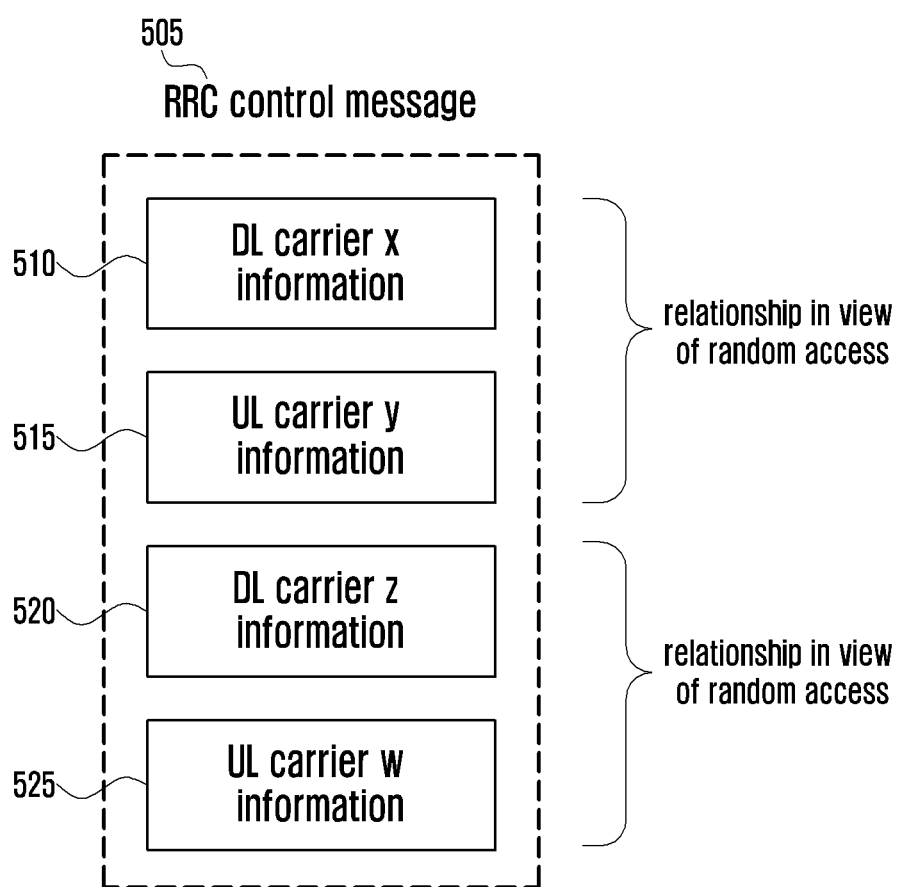
FIG. 5 is a diagram illustrating a structure of the RRC control message according to the first embodiment of the present disclosure.

FIG. 5 is a diagram illustrating a structure of the RRC control message according to the first embodiment of the present disclosure.

Referring to FIG. 5, the RRC control message instructing carrier aggregation includes downlink carrier x information 510, uplink carrier y information 515, downlink carrier z information 520, and uplink carrier w information 525 in sequence. In this case, the downlink carrier x and uplink carrier y arranged close together are correlated and the downlink carrier z and uplink carrier w arranged close together are correlated. According to an embodiment of the present disclosure, if a preamble is allocated through PDCCH order on the downlink carrier x, the UE transmits the preamble on the uplink carrier y correlated with the downlink carrier x and, if a Random Access Response message is received, performs uplink transmission using the uplink transmission resource indicated by random access response message on the carrier y. The same operation may be performed on the downlink carrier z and uplink carrier w.

If the RRC control message is received, the UE configures the downlink and uplink carriers to perform the normal operation.

The UE receives a PDCCH order at step 410. The PDCCH order is a predetermined field (e.g. radio resource allocation field) set to a predetermined (e.g. 1) for instructing the UE to perform random access procedure. The UE may be allocated the preamble for use in random access procedure through the PDCCH order, and this preamble is referred to as dedicated preamble.

The UE determines whether the PDCCH order is received on the primary downlink carrier or a secondary downlink carrier at step 415. If there is no handover since the establishment of current RRC connection on the downlink carrier indicated by a certain PCI of a certain downlink frequency, this downlink carrier is the primary downlink carrier. If there is any handover since the establishment of the RRC connection, this is determined as the downlink carrier to be used as the primary carrier in the handover procedure.

The secondary downlink carrier is the downlink carrier aggregated additionally through the RRC control message. In the present disclosure, the term 'downlink carrier' is used in a meaning different a little from the normal downlink carrier. In the present disclosure, the downlink carrier is similar in meaning to the cell characterized by a certain downlink center frequency, bandwidth, and Physical Cell Identifier (PCI). In more detail, the downlink part of a cell in the common meaning denotes the downlink carrier which the present disclosure means. If it is determined that the PDCCH order has been received on the primary downlink carrier, the procedure goes to step 420 and, otherwise if it is determined that the PDCCH order has been receiver on the secondary carrier, step 455.

The UE transmits the preamble on the primary uplink carrier at step 420. As described above, if there is no handover performed since the current connection establishment on the uplink carrier indicated by a certain uplink center frequency and bandwidth, this uplink carrier is the primary uplink carrier. Otherwise if there is any handover performed after the RRC connection establishment, the uplink carrier to be used as the primary carrier is determined in the handover procedure. Afterward, UE receives a random access response message on the primary downlink carrier at operation 425. The random access response message includes uplink Timing Advance Command (TAC) and uplink resource allocation information.

Upon receipt of the Random Access Response message, the UE checks the two conditions as follows and, if at least one of the conditions is fulfilled, adjusts the uplink transmission timing based on the TAC at operation 430.

Condition 1) dedicated preamble has been transmitted

Condition 2) random preamble has been transmitted and time alignment timer (timeAlignmentTimer) is not running at the time when the Random Access Response has been received.

If none of the two conditions is fulfilled, i.e. if a random preamble has been transmitted and the timeAlignmentTimer is running at the time when the Random Access Response has been received, the UE does not apply TAC. This is to prevent malfunctioning caused by failure of contention resolution.

Adjusting uplink transmission timing is having the uplink frame boundary precede the downlink frame boundary as much as TAC in order for the uplink signal transmitted by the UE to arrive the eNB within the duration of Cyclic Prefix.

Afterward, the UE generates MAC PDU for uplink transmission using the uplink transmission resource allocated for the random access response. In order to determine whether to include C-RNTI MAC CE in the MAC PDU, the UE determines whether the dedicated preamble has been used. If the MAC layer of the UE has selected a preamble, this means that no dedicated preamble is used; and if the MAC layer of the UE has not selected a preamble, this means that a preamble is indicated, resulting in use of the dedicated preamble. In the case that the dedicated preamble has been used, the eNB has the information on the UE already and thus the UE does not include C-RNTI MAC CE in the MAC PDU. In the case that the dedicated preamble has not been used, the eNB has no information on the UE and thus the UE includes the C-RNTI MAC CE in the MAC PDU.

In the case that Power Headroom Report is triggered, the UE adjusts PHR size and inserts the PHR into the MAC PDU at operation 440. For example, if the pathloss has changed more than a predetermined threshold or a periodic PHR timer (periodicPHR-Timer) has expired, the UE determines that PHR has been triggered. If PHR has been triggered, the UE generates PHR and inserts the PHR into the MAC PDU. Typically, the MAC PDU is 56 bits and the C-RNTI MAC CE is 24 bits. The PHR includes 16-bit MAC sub-header, 8-bit bitmap, and a plurality of pairs of PHs and maximum transmit powers of UEs. The pairs of PHs and maximum transmit powers are 16 bits in size and thus, although the PHR has been triggered, it is likely that there is not enough space for transmitting PHs on all carriers. In this case, the UE adjusts the size PHR MAC CE to be fit for the remained space of the MAC PDU. At this time, the UE arranges the PH of the primary carrier with priority and then the PHs of the secondary carriers in a descending order of the index assigned to the carrier. The index assigned to the carrier is identical with the serving cell index.

Afterward, the UE transmits the MAC PDU on the primary uplink carrier at step 445. If the dedicated preamble has been transmitted, the procedure ends and, otherwise if the random preamble has been transmitted, the procedure goes to step 450.

At step 450, the UE waits until a downlink assignment or uplink grant indicating new transmission is received for checking presence of collision. If none of downlink assignment and uplink grant is received in a predetermined duration, this means random access failure and thus the UE returns the procedure to step of transmitting preamble. If any of downlink assignment and uplink grant is received in a predetermined duration, the UE determines that the random access has completed successfully and thus ends the procedure.

If the PDCCH order is received on the secondary carrier, the UE transmits a preamble on the secondary uplink carrier associated, in view of random access, with the secondary downlink carrier on which the PDCCH order has been received at step 455.

The UE receives the Random Access Response on the secondary downlink carrier on which the PDCCH order has been received or associated, in view of random access, with the secondary uplink carrier on which the preamble has been transmitted at step 460. The random access response message contains the uplink transmission timing command (TACO and uplink transmission resource allocation information. In the case that the random access is performed on the secondary carrier, the probability of malfunctioning caused by collision is very low as compared to the case where the random access is performed on the primary carrier such that the UE adjust the uplink transmission timing on the uplink carrier on which the preamble has transmitted by applying TAC contained in the Random Access Response message at step 465.

Adjusting the uplink transmission timing is having the uplink frame boundary precede the frame boundary of the downlink carrier associated in view of random access as much as TAC such that the uplink signal transmitted by the UE arrives in the cyclic prefix duration from the view point of the base station.

Unlike the random access performed on the primary carrier, the random access on the secondary carrier has low probability of malfunctioning caused by collision such that the UE is capable of adjusting the uplink transmission timing immediately without determination on whether to start time alignment timer and whether to use dedicated preamble, resulting in reduction of complexity.

The reason for performing random access through the primary carrier is to report the buffer state when the uplink transmission timing has been acquired already as well as to adjust the uplink transmission timing. In the case of performing the random access to report the buffer state, the UE adjusts the transmission timing in the random access process and, if the adjusted transmission timing is incorrect for a certain reason (e.g. contention), has to stop uplink transmission until the incorrect timing is corrected.

Accordingly, in the case of the primary carrier, whether to adjust uplink transmission timing is determined in consideration of whether the uplink timing is acquired at the current time. In the case of the random access on the secondary carrier, however, there is no need of considering whether to adjusting uplink transmission timing because there is only one reason for adjusting the uplink transmission timing. Accordingly, in the case of the uplink transmission timing adjustment, it is possible to adjust the uplink timing immediately without determining whether to start the timing alignment timer and whether to use dedicated preamble.

Afterward, the UE generates the mace PDU at step 470 like step 435 and, if PHR is triggered, adjust the size of PHR and inserts the PHR into the MAC PDU at step 475. For example, if the pathloss change is greater than a threshold or the periodic PHR timer periodicPHR-Timer expires, the UE determines that the PHR is triggered. If PHR is triggered, the UE generate the PHR and inserts the PHR into the MAC PDU. Typically, the size of the mace PDU is 56 bits and the size of C-RNTI MAC CE is 24 bits. The PHR includes 16-bit MAC sub-header, 8-bit bitmap, and pairs of PHs and maximum transmission powers of the UE. Since the pairs of PHs and maximum transmission powers are 16-bit long, although the PHR has been triggered, it is likely that there is not enough space for transmitting PHs on all carriers. In this case, the UE adjusts the size PHR MAC CE to be fit for the remained space of the MAC PDU. At this time, the UE arranges the PH of the secondary carrier on which the random access has been performed. The UE also includes the PH of the primary carrier with priority and then the PH of the secondary carrier on which the random access has been performed among all of the secondary carriers.

The UE transmits the MAC PDU on the secondary uplink carrier at step 480. If the dedicated preamble has been transmitted, the procedure ends and, otherwise, if the random preamble is transmitted, the procedure goes to step 485.

At step 485, the UE waits until the uplink grant instructing new transmission is received on the uplink carrier on which the random access procedure has been performed to determine whether any collision exists. If no uplink grant is received in the predetermined time, this means random access failure and thus the UE returns the procedure to step of transmitting a preamble. If an uplink grant is received in the predetermined time, this means the successful random access and thus the UE ends the procedure. Unlike step 450, the main reason for considering only the uplink grant is because the random access is performed on the second carrier mainly for uplink data transmission. Accordingly, it is preferred to consider only the uplink grant.

Second Embodiment

Timing Advance Group (TAG) is a set of serving cells sharing the same uplink transmission timing. The eNB needs to be aware of the different between downlink frame boundaries of the serving cells configured to the UE for managing the TAG for the UE. For example, if the same uplink transmission timing is applied for the two serving cells having large difference in downlink frame boundary reception timings, it is likely to fail maintain uplink synchronization.

In the second embodiment of the present disclosure, if the difference in reception timing between at least two serving cells belonging to the same TAG is equal to or greater than a predetermined threshold when the eNB configures the TAG for the UE, the eNB reconfigures the TAG based on the reception timing difference reported.

Figure 6:
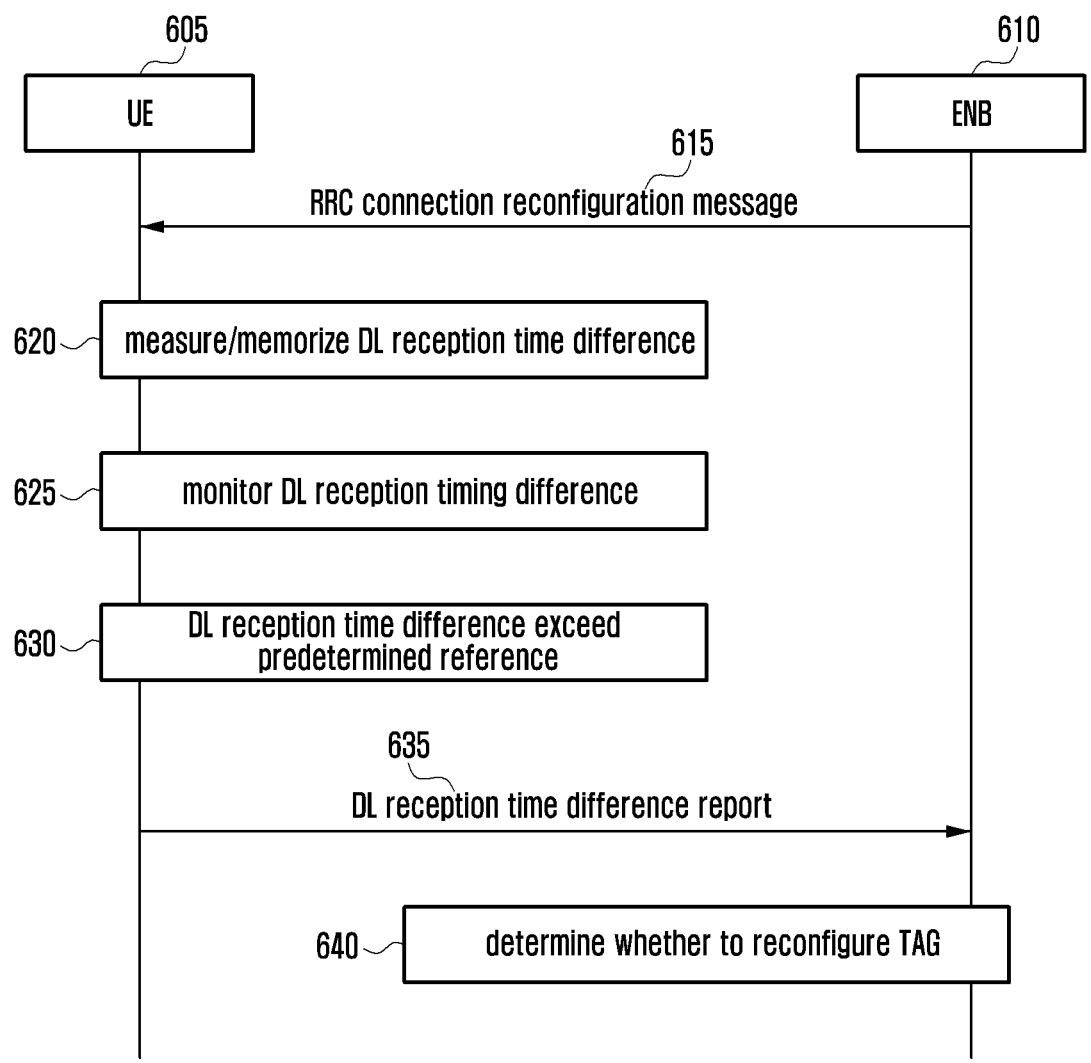
FIG. 6 is a signal flow diagram illustrating signal flows between the UE and the eNB according to the second embodiment of the present disclosure.

FIG. 6 is a signal flow diagram illustrating signal flows between the UE and the eNB according to the second embodiment of the present disclosure.

The eNB 610 determines to add a SCell for the UE 605 (for the reason of increasing traffic of the UE) at a certain time and transmits an RRC Connection Reconfiguration (RRCConnectionReconfiguration) message to the UE as step 615.

This message includes the information on the SCell to be added (SCellToAddModList), Physical Cell ID per SCell to be added (pshyCellId), downlink center frequency of SCell to be added (dl-CarrierFreq), common radio resource information of the SCell to be added (radioResourceConfigCommonSCell), and dedicated radio resource information of the SCell to be added (radioResourceConfigDedicatedSCell). If uplink is configured to the SCell, uplink carrier center frequency and bandwidth information (ul-Configuration) is also included.

The control message may include TAG information. The TAG information is the information indicating which serving cell belongs to which TAG. The TAG is classified into one of Primary-TAG (P-TAG) and Secondary-TAG (S-TAG), P-TAG is the TAG including PCell, and S-TAG including SCells without PCell. According to an embodiment of the present disclosure, SCell 1, SCell 2, SCell 3, and SCell 4 are configured and all SCells have uplink channels. At this time, if it is determine that the Scell1 and PCell share the same uplink transmission timing and if SCell 2, SCell 3, and SCell4 share the same uplink transmission timing, the eNB 610 configures the PCell and SCell1 into P-TAG and the SCell 2, SCell 3, and SCell4 into an S-TAG, e.g. S-TAG #1. In this case, the eNB 610 may generate a control message including the information indicating that the SCell1 belongs to P-TAG and SCell 2, SCell 3, and SCell4 belong to S-TAG #1.

Instead of including the above information entirely in the control message, it is possible to omit the following informations to simplify the message structure and reduce signaling overhead. By fixing the downlink timing reference cell of P-TAG as PCell, there is no need of indicating downlink timing reference cell for P-TAG. By defining that if TAG information is not provided for a certain SCell the corresponding SCell belongs to P-TAG, there is no need of including TAG information for the SCell belonging to P-TAG. At this time, in order to prevent the SCells having no uplink configuration from belonging to P-TAG, the TAG information indicates no target to belong to P-TAG and restricted to the serving cell having uplink configuration.

The UE 605 measures and memorizes the downlink transmission timing difference between the serving cells belonging to the TAG and the downlink timing reference cell at step 620. This process is described with reference to FIG. 7.

Figure 7:
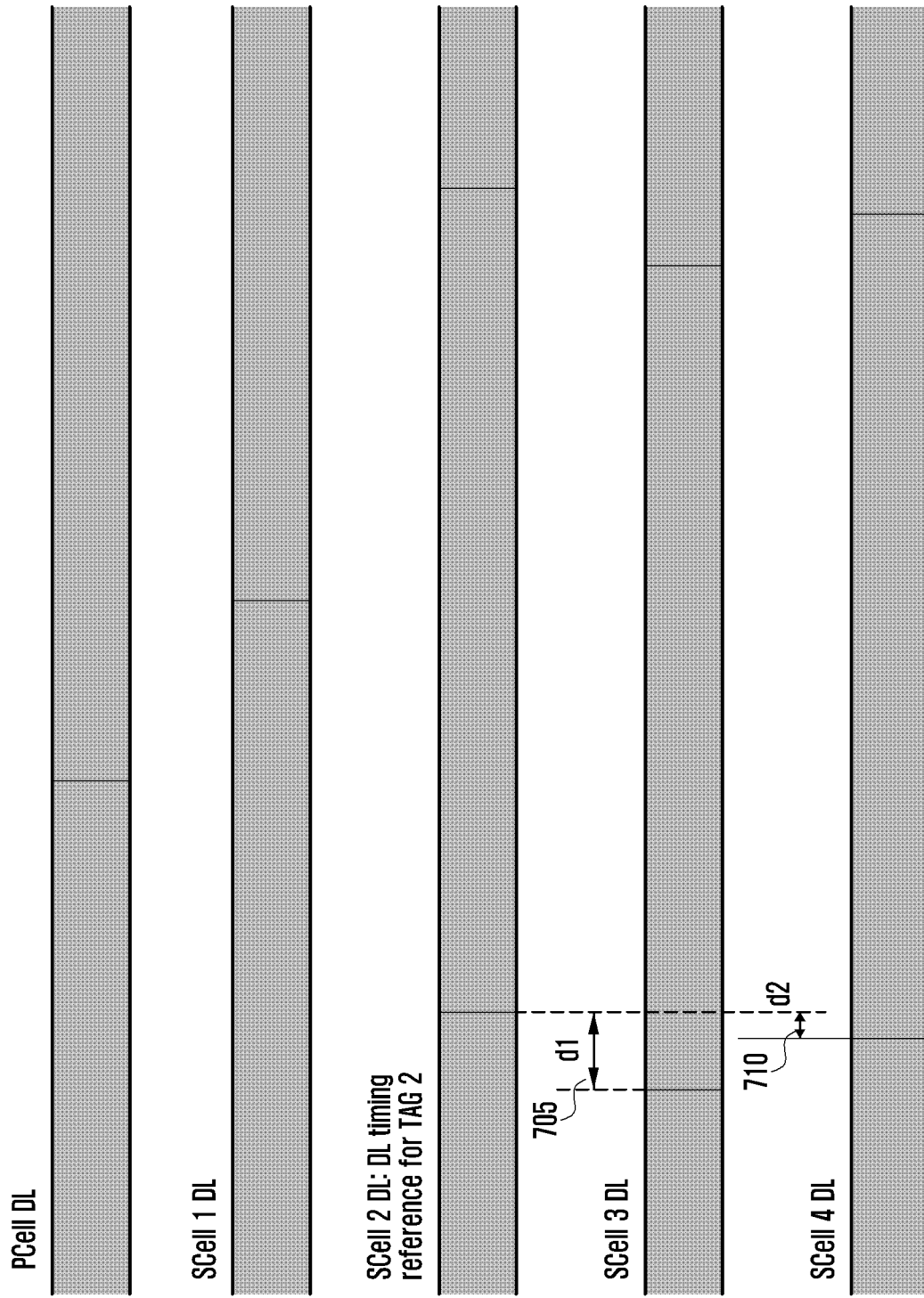
FIG. 7 is a diagram illustrating downlink reception timings of the serving cells according to the second embodiment of the present disclosure.

FIG. 7 is a diagram illustrating downlink reception timings of the serving cells according to the second embodiment of the present disclosure.

Referring to FIG. 7, in S-TAG #1, the downlink timing difference between SCell 2 as the downlink timing reference cell, and SCell 3 is d1 705 and the downlink timing difference between SCell 2 and SCell 4 is d2 710. The UE 605 may measure and memorize the downlink difference values.

Afterward, the UE 605 monitors the downlink reception timing difference at step 625. If the downlink reception timing difference of a serving cell belonging to the a certain TAG changes significantly as compared to the downlink reception timing difference at the time when the TAG has been configured initially, this means that the corresponding SCell has to be not included in the corresponding TAG. If the downlink reception timing difference of a serving cell belonging to a certain TAG is greater than a predetermined threshold, this means that the corresponding SCell has to be not included in the corresponding TAG.

Accordingly, if it is detected that the displacement of the downlink reception timing difference of a certain SCell and the reception timing difference at the time when the corresponding SCell is included in the corresponding TAG is greater than a predetermined threshold, the UE 605 reports the DL reception timing difference to the eNB 610 through an RRC control message at step 635. The RRC control message may include the following informations.

1) identifier of S Cell of which DL reception timing difference exceed a predetermined threshold 2) DL reception timing difference value The eNB 610 determines whether the reconfigure TAG based on the RRC control message received from the UE 605 at step 640.

Figure 8:
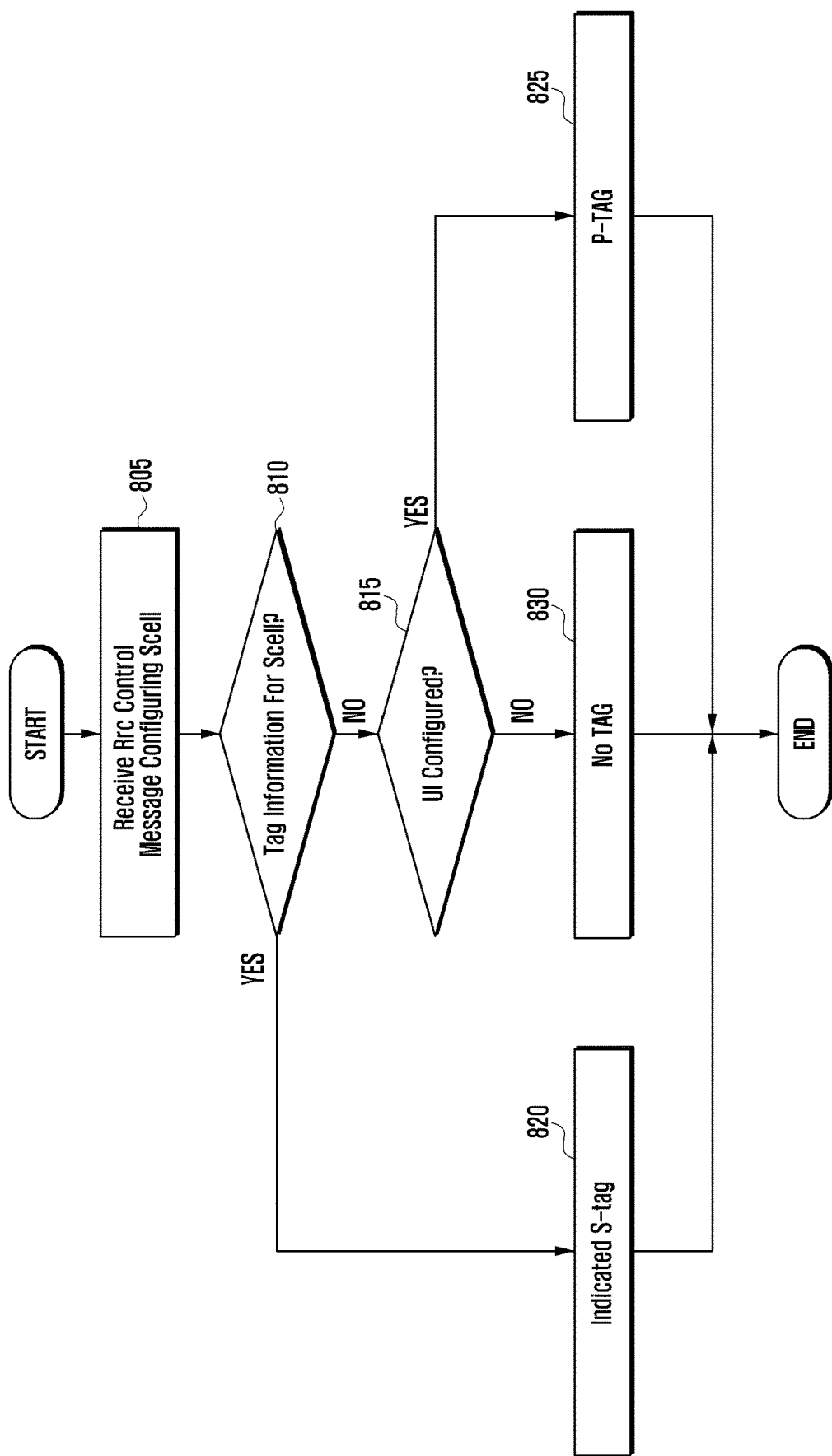
FIG. 8 is a flowchart illustrating the UE operation of configuring TAG of SCell according to the second embodiment of the present disclosure.

FIG. 8 is a flowchart illustrating the UE operation of configuring TAG of SCell according to the second embodiment of the present disclosure. A description is made of the TAG configuration operation of the UE with reference to FIG. 8.

The UE 650 receives an RRC control message for configuring SCell from the eNB 610 at step 805. Afterward, the UE 605 determines whether the TAG information on the SCell is included in the RRC control message at step 810. If it is determined that the RRC control message include the tag information on the S Cell, the UE includes the SCell in the S-TAG indicated by the TAG information at step 820 and performs uplink transmission at the uplink transmission timing of the S-TAG in the SCell afterward.

If it is determined that the RRC control message does not include the TAG information on the SCell, the UE 605 determines whether the SCell is configured with UL, i.e. whether ul-Configuration is instructed to the SCell, at step 815. If it is determined that the SCell is configured with UL, the UE 605 includes the SCell in P-TAG at operation 825 and performs uplink transmission at the uplink transmission timing of the PCell afterward.

If it is determined that the SCell is configured with uplink, the UE 605 skips including the SCell in any TAG at step 830 and ends the procedure.

Figure 9:
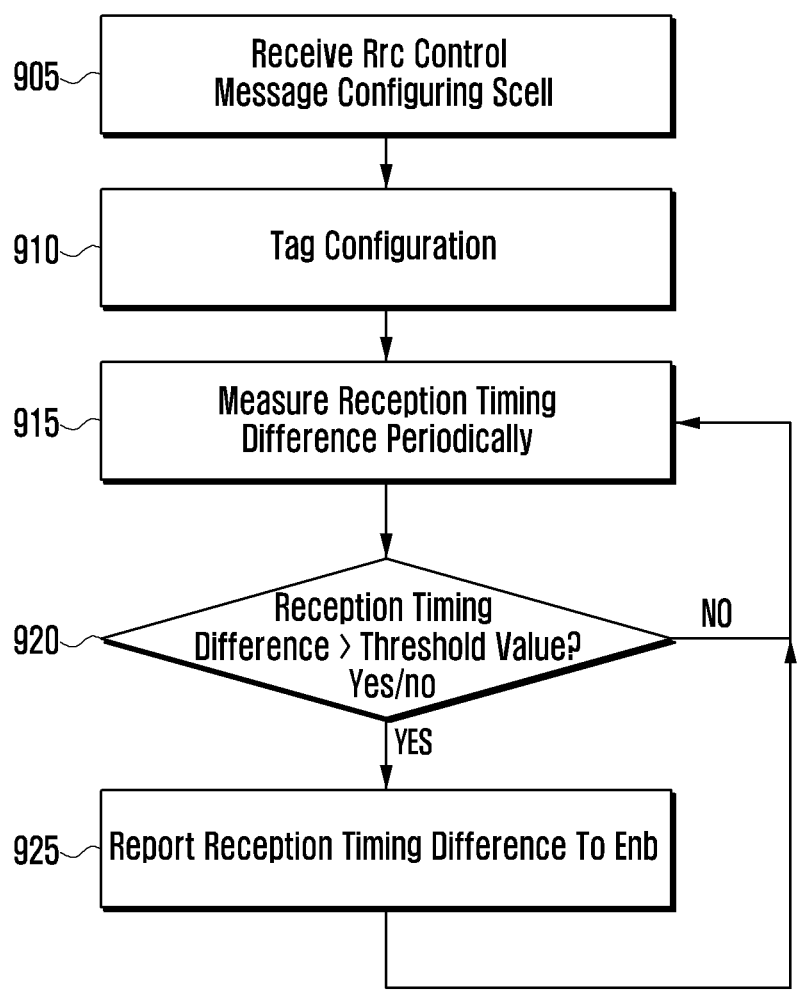
FIG. 9 is a flowchart illustrating the UE operation according to the second embodiment of the present disclosure.

FIG. 9 is a flowchart illustrating the UE operation according to the second embodiment of the present disclosure. A description is made of the UE operation with reference to FIG. 9.

First, the UE 605 receives an RRC control message for configuring S Cell at step 905. Next, the UE 605 configures TAG at step 910 and measures reception timing difference between the serving cells per TAG at step 915.

If the reception timing difference between the serving cells is greater than a predetermined threshold at step 920, the UE 605 generates the RRC control message including the identifier of the serving cell of which reception timing difference is greater than the threshold, TAG identifier, and timing difference value to the eNB at step 925. If the reception timing difference between the serving cells is not greater than the threshold, the UE 605 returns the procedure to step 915 to measure the reception timing difference between the serving cells per TAG continuously.

Third Embodiment

There is one downlink timing reference cell per TAG which makes it possible for the UE to analogize the uplink transmission timing of the corresponding TAG from the downlink reception timing of the downlink timing reference cell. The S-TAG consists of only SCells, and the SCell switches between active state and inactive state such that the timing reference cell of a certain S-TAG may be in the inactive state. Since the UE reduces the downlink signal reception frequency for the cell in the inactive state, it may cause problem in uplink transmission timing management.

In order to solve this problem, the third embodiment of the present disclosure proposes a method for the UE to select one of the cells in the active state currently instead of designating a fixe downlink timing reference cell.

Figure 10:
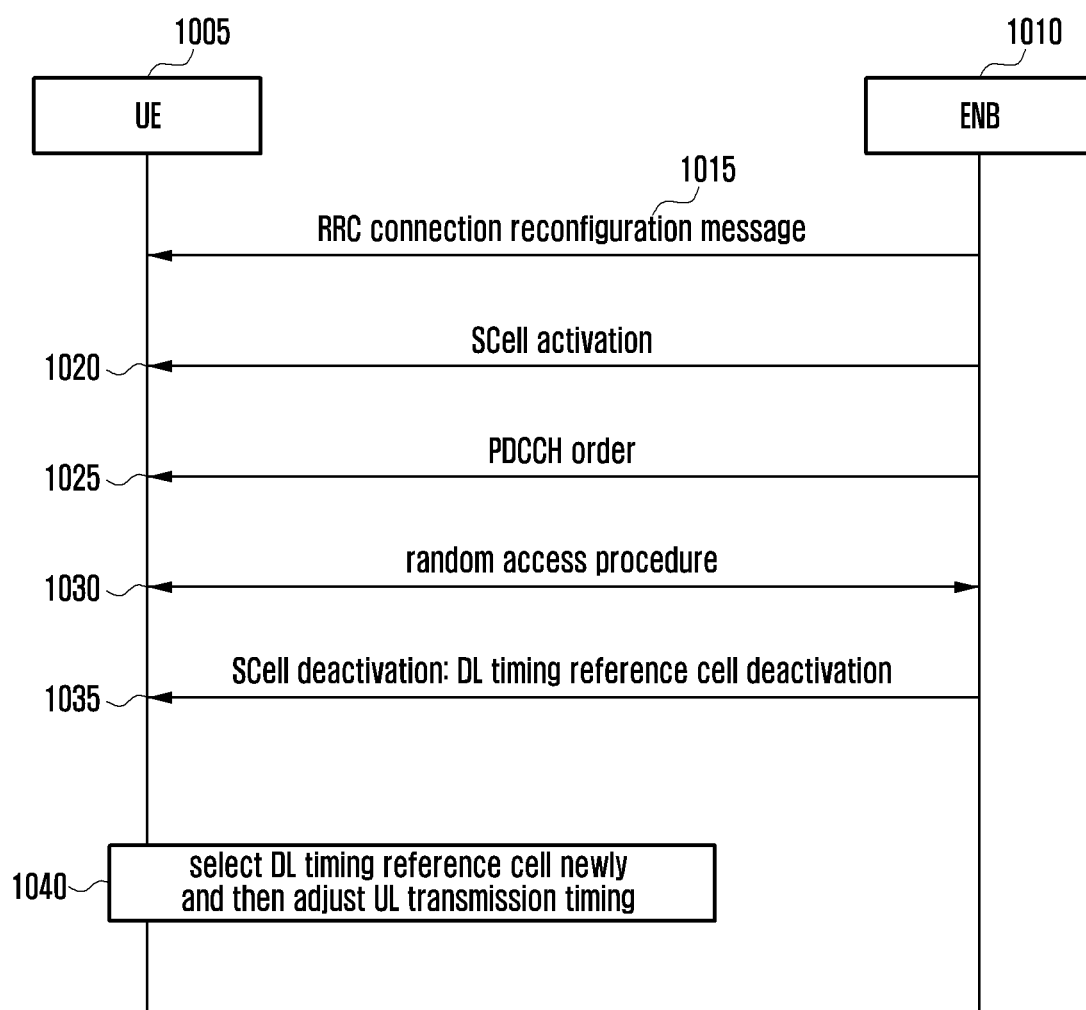
FIG. 10 is a signal flow diagram illustrating signal flows between the UE and the eNB according to the third embodiment of the present disclosure.

FIG. 10 is a signal flow diagram illustrating signal flows between the UE and the eNB according to the third embodiment of the present disclosure.

First, the eNB determines to configure additional SCell to the UE (for the reason of increasing traffic of the UE) and sends the UE an RRC Connection Reconfiguration (RRC-ConnectionReconfiguration) message at a certain time at step 1015.

This message includes the information on the SCell to be added (SCellToAddModList), Physical Cell ID per SCell to be added (pshyCellId), downlink center frequency of SCell to be added (dl-CarrierFreq), common radio resource information of the SCell to be added (radioResourceConfigCommonSCell), and dedicated radio resource information of the SCell to be added (radioResourceConfigDedicatedSCell).). If uplink is configured to the SCell, uplink carrier center frequency and bandwidth information (ul-Configuration) is also included.

The control message may include TAG information. The TAG information is the information indicating which serving cell belongs to which TAG. The TAG is classified into one of Primary-TAG (P-TAG) and Secondary-TAG (S-TAG), P-TAG is the TAG including PCell, and S-TAG including SCells without PCell. According to an embodiment of the present disclosure, SCell 1, SCell 2, SCell 3, and SCell 4 are configured and all SCells have uplink channels.

At this time, if it is determine that the Scell1 and PCell share the same uplink transmission timing and if SCell 2, SCell 3, and SCell4 share the same uplink transmission timing, the eNB 610 configures the PCell and SCell1 into P-TAG and the SCell 2, SCell 3, and SCell4 into an S-TAG, e.g. S-TAG #1. In this case, the eNB 610 may generate a control message including the information indicating that the SCell1 belongs to P-TAG and SCell 2, SCell 3, and SCell4 belong to S-TAG #1. Until the uplink transmission timing is acquired through a random access procedure for the SCells belonging to the S-TAG, the UE assumes that the uplink transmission is barred.

The eNB activates the SCell at step 1020. The activation of the SCell is instructed by Activation/Deactivation MAC Control Element (CE) for activating SCell. Next, the eNB sends the UE the PDCCH order instructing to perform random access. As aforementioned, since the S Cells belonging to the same TAG as the PCell are ready for uplink transmission upon being activated, if the uplink grant for the SCells belonging to the same TAG as the PCell is received, the UE may perform uplink transmission. For the S Cells belonging to the TAG including no PCell are ready for uplink transmission only when the uplink transmission timing is acquired through random access procedure. Step 1025 is the step of initiating the random access procedure for the S-TAG which has not acquired uplink transmission timing yet.

The UE and the eNB perform the random access procedure by exchanging preamble and Random Access Response (RAR) at step 1030. The UE determines the transmit power of the preamble by referencing pathlossReferenceLinking parameter if pathlossReferenceLinking indicates PCell. If pathlossReferenceLinking indicates an SCell, the preamble transmit power is determined by referencing the pathloss of the corresponding SCell. The UE receives TAC in the random access procedure and determines the uplink transmission timing based on the received TAC. This is described in more detail with reference to FIG. 11.

Figure 11:
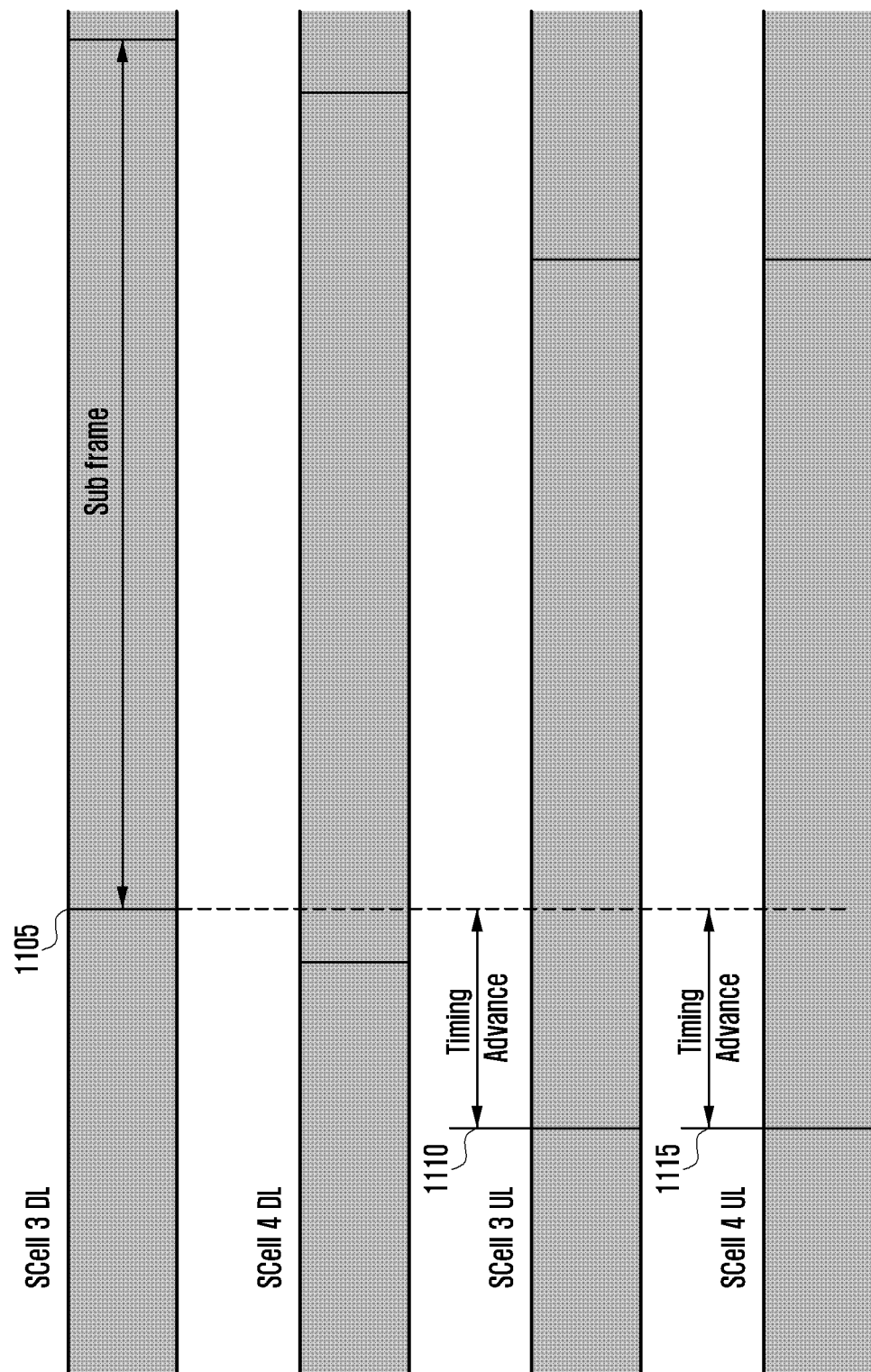
FIG. 11 is a diagram illustrating downlink timing reference cell and the uplink transmission timings according to the third embodiment of the present disclosure.

FIG. 11 is a diagram illustrating downlink timing reference cell and the uplink transmission timings according to the third embodiment of the present disclosure.

If the random access procedure is initiated in a certain SCell (e.g. SCell 3) by the PDCCH order, the UE transmits the random access in match to the downlink frame boundary 1105 of the SCell 3. If the preamble is received, the eNB determines a suitable TAC in order to positing the uplink signal reception timing in the cyclic prefix duration and sends the UE the TAC in the random access response.

Upon receipt of TAC, the UE advances the uplink transmission timing as much as indicated from the downlink frame boundary of SCell 3. Assuming the distance between the downlink frame boundary and uplink frame boundary is Timing Advance (TA) 1110, the SCell of the downlink frame as TA reference is referred to as DL timing reference SCell. The UE determines the uplink transmission timings of the SCells (SCell 4 in FIG. 11) belonging to the same TAG as SCell 3 by applying the TA 1115 to the downlink frame boundary of the DL timing reference SCell. After performing this procedure, i.e. after determining the uplink transmission timing of S-TAG #1 by referencing TAC, the UE starts a time alignment timer (TimeAlignmentTimer) for S-TAG #1.

If the Activation/Deactivation MAC CE indicating deactivation of SCell 3 as the DL timing reference SCell of S-TAG #1 is received at step 1035, the UE deactivates SCell 3. Afterward, the UE selects a cell in the active state among SCells in the TAG of which DL timing reference SCell has been deactivated as a new DL timing reference SCell. The UE determines the new DL timing reference SCell in consideration of the SCell of which pathlossReferenceLinking parameter is set to SCell with priority. If the new DL timing reference S Cell is determined, the UE updates TA. This is described in detail with reference to FIG. 12.

Figure 12:
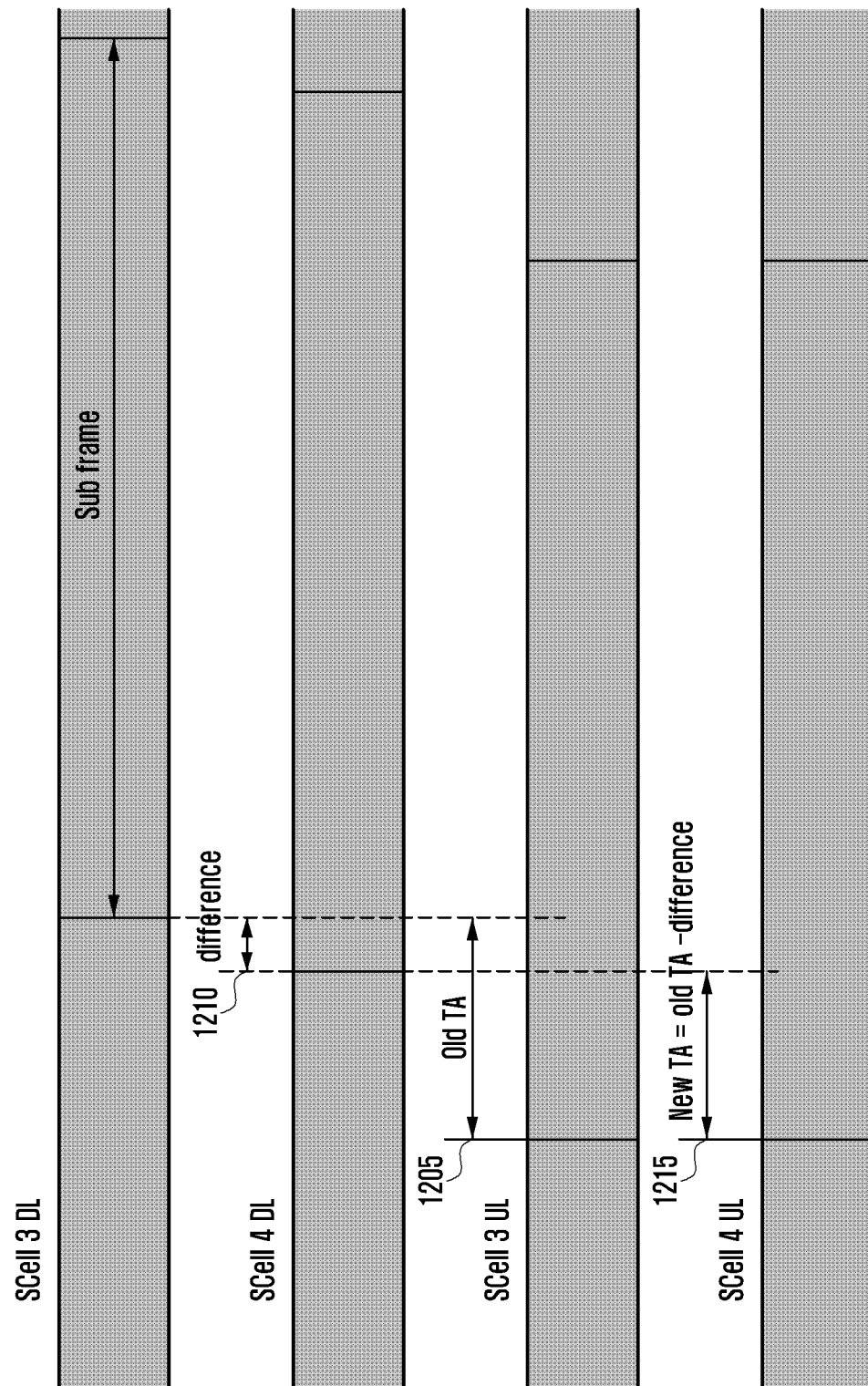
FIG. 12 is a diagram illustrating a method for the UE to determine a new TA by referencing a new uplink timing reference cell according to the third embodiment of the present disclosure.

FIG. 12 is a diagram illustrating a method for the UE to determine a new TA by referencing a new uplink timing reference cell according to the third embodiment of the present disclosure.

If the new DL timing reference S Cell is determined, the UE updates TA as follows.

New TA 1215=Old TA (TA configured by referencing deactivated DL timing reference SCell 1205–difference (difference value between uplink frame boundary of deactivated DL timing reference SCell and uplink frame boundary of new DL timing reference SCell 1210)

Afterward, the UE adjust the uplink transmission timing in match to the downlink subframe boundary of the new DL timing reference SCell. If there is no SCell in the active state, the UE maintains the DL timing reference SCell and does not takes the above operation.

Figure 13:
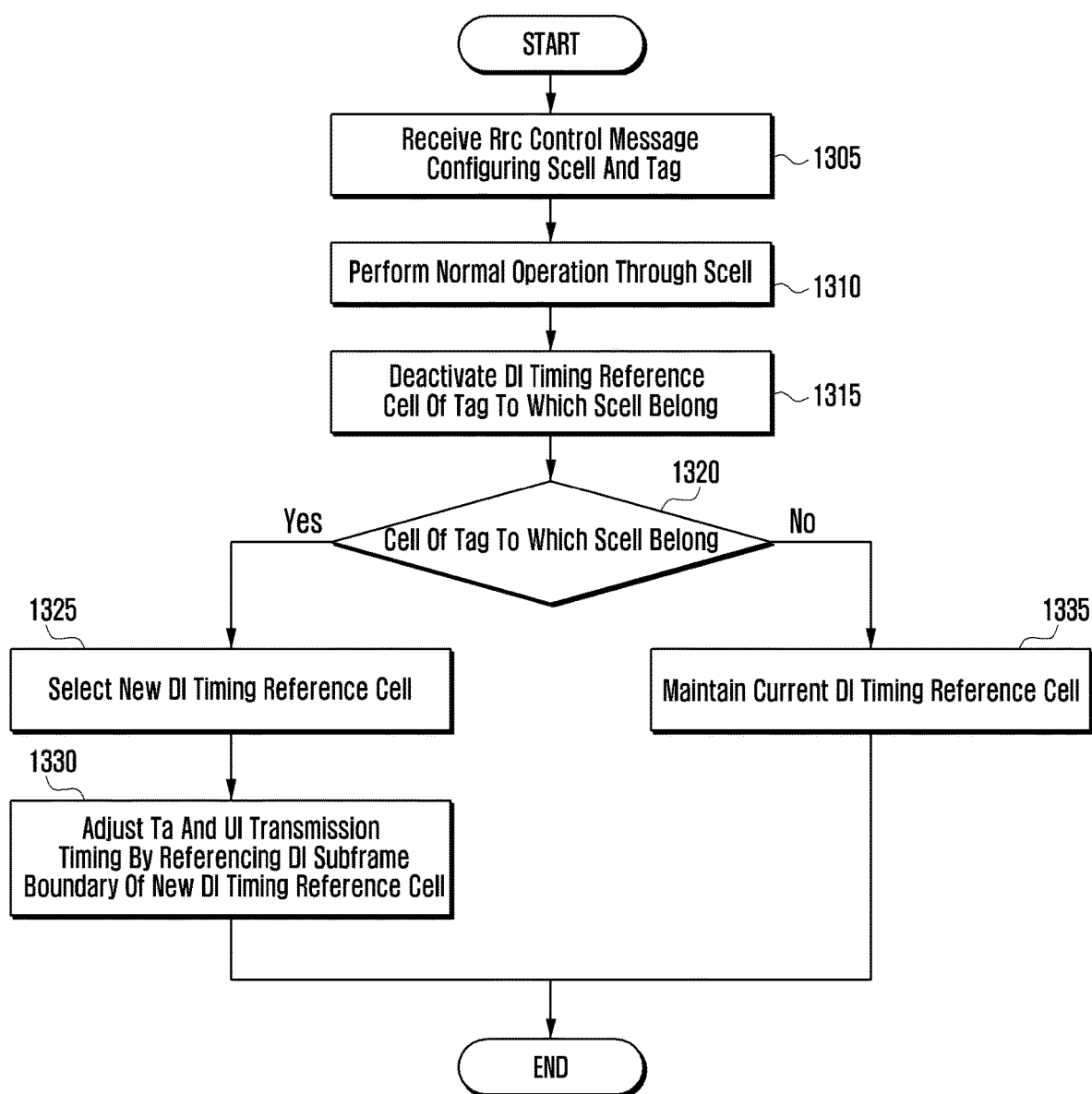
FIG. 13 is a flowchart illustrating the UE operation according to the third embodiment of the present disclosure.

FIG. 13 is a flowchart illustrating the UE operation according to the third embodiment of the present disclosure.

The UE receives an RRC control message for configuring SCells and TAG from the eNB at step 1305. The UE configures SCells and includes the SCells in suitable TAGs according to the information included in the RRC control message. At this time, if the RRC control message includes explicit information indicating a TAG to which the SCell is included, the UE includes the SCell in the corresponding TAG. Otherwise if the RRC control message includes no explicit information indicating any TAG in which the SCell is included and if the SCell has no uplink configuration, the UE includes the SCell in P-TAG.

The UE performs normal operations through the added SCell at step 1310. Here, the normal operation is to perform a random access procedure in the SCell or a serving cell belonging to the same TAG as the SCell to acquire uplink synchronization for TAG and start timing alignment timer (TimeAlignmentTimer). In the case that the SCell is in the active state, it is possible to perform DL/UL data communication through the SCell.

If a MAC CE deactivating the DL timing reference SCell of TAG including the SCell is received or if there is no data transmission/reception in a predetermined duration in the DL timing reference SCell, the UE deactivates the DL timing reference SCell autonomously at step 1315. For reference, the SCell in which the random access procedure has been performed may operate as the DL timing reference SCell.

Afterward, the UE determines whether there is any active SCell in the TAG at step 1320. If there is any active SCell in the TAG, the procedure goes to step 1325 and, otherwise if there is no other active S Cell in the TAG, the procedure goes step 1335. The UE also may check whether there is any active SCell configured with uplink among the SCells of the TAG such that the procedure goes to step 1325 if there is any active SCell configured with uplink among the SCells of the TAG and, otherwise, step 1335.

At step 1325, the UE selects one of the active SCells configure with uplink among SCells of the same TAG as a new DL timing reference SCell. At this time, the cell having the best channel condition or the SCell configured as pathloss reference SCell is selected with priority. Afterward, the UE calculates a new TA based on the downlink subframe boundary of the newly selected DL timing reference SCell and applies the new TA. The UE adjusts the uplink transmission timing of the corresponding TAG based on the downlink subframe boundary of the newly selected DL timing reference SCell.

At step 1335, the UE maintains the current downlink timing reference SCell and ends the procedure.

Fourth Embodiment

The random access in SCell is different from the random access in PCell in various properties. For example, the random access in SCell is triggered only by PDCCH order under the assumption that C-RNTI has been already assigned to the UE and, if it is determined to use the dedicated preamble always for the random access in SCell, the C-RNTI of the UE can be used in transmitting the Random Access Response message.

By taking into consideration of these properties, different random access procedures are applied to the PCell and SCell. In this way, it is possible to reduce the overhead occurring in the random access in SCell.

The UE receives C-RNTI in the random access response message in the random access procedure in SCell and RA-RNTI in the Random Access Response message in the random access procedure in PCell. Typically, the TAC is transferred to the UE in the Random Access Response (RAR) or TAC MAC CE: the RAR if random access procedure is in progress and, otherwise, TAC MAC CE.

In the present disclosure, while the random access procedure is performed in the SCell, the TAC is transmitted in TAC MAC CE instead of RAR, and the random access procedure completion is determined based on whether TAC MAC CE is received. However, since the use of the legacy TAC MAC CE format may cause any problem due to small size of TAC, it is necessary to define a new format of TAC MAC CE.

Figure 14:
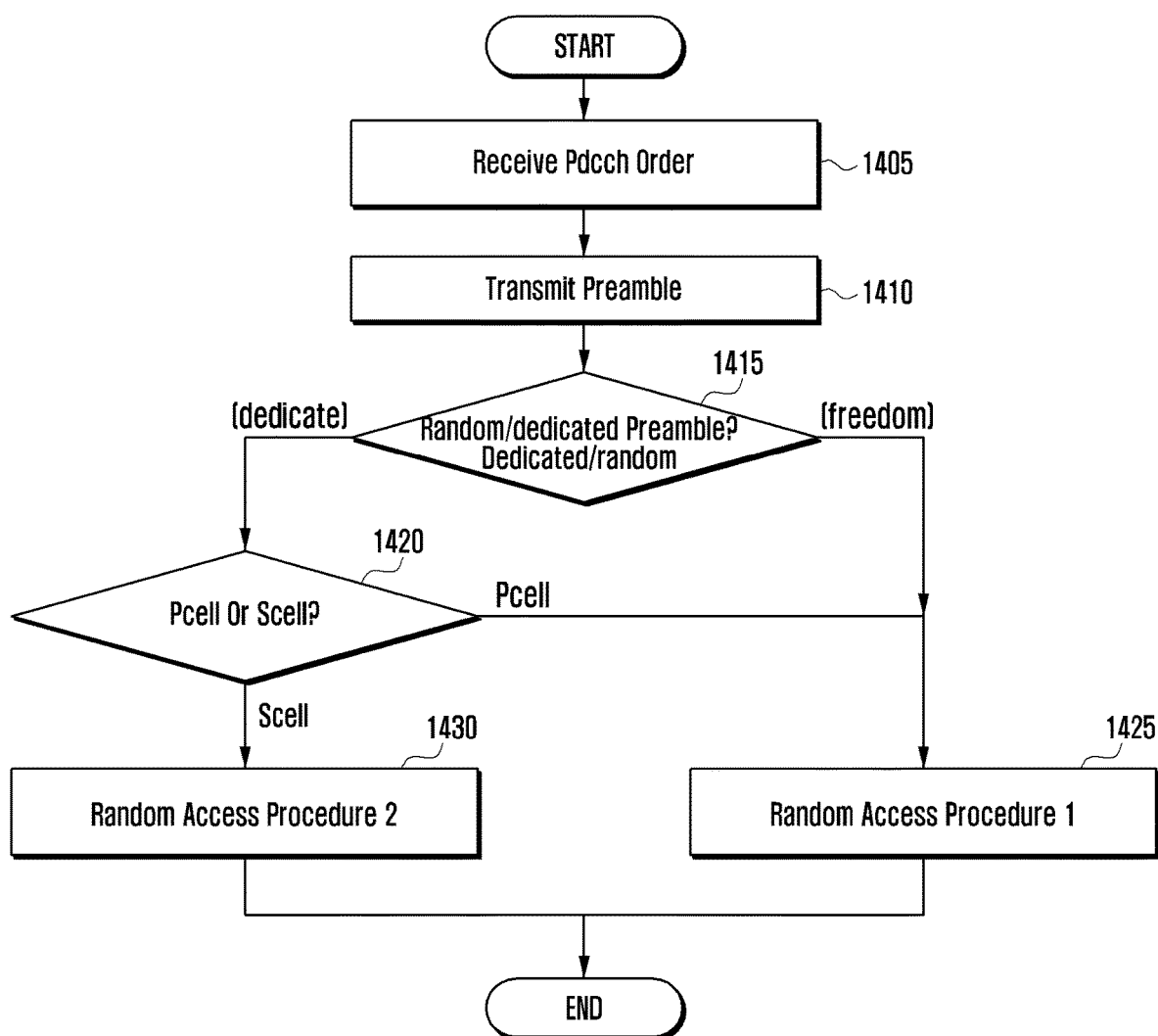
FIG. 14 is a flowchart illustrating the UE operation according to the fourth embodiment of the present disclosure.

FIG. 14 is a flowchart illustrating the UE operation according to the fourth embodiment of the present disclosure.

Referring to FIG. 14, the UE receives PDCCH order instructing to perform random access procedure from the eNB at step 1405. If the PDCCH order is received, the UE initiates random access in PCell or SCell. If the PDCCH order is received in PCell, the UE initiates random access procedure in PCell and, otherwise if the PDCCH order is received in SCell, the UE initiates random access procedure in the corresponding SCell. The PDCCH order may include the information indicating the serving cell in which the random access procedure is initiated.

The UE initiates the random access procedure in PCell or SCell at step 1410. The UE selects a preamble according to a predetermined rule (or preamble indicated by PDCCH order) and transmits the selected preamble. At this time, if the random access is performed in PCell, the UE determines the transmit power of the preamble by taking notice of the pathloss in the PCell. In the case that the random access is performed in SCell, if the pathlossReferenceLinking parameter indicates PCell, the UE references the pathloss of the PCell and, otherwise if the pathlossReferenceLinking parameter indicates SCell, the pathloss of the SCell to determine the transmit power of the preamble.

The UE determines whether the dedicated preamble or random preamble has been used at step 1415. If the random preamble has been used, the UE perform random access procedure 1 at step 1425. If the dedicated preamble has been used, the procedure goes to step 1420. Here, the random preamble is the preamble selected from a predetermined preamble set, and the dedicated preamble is the preamble designated by the eNB.

At step 1420, the UE determines whether the random access procedure has been initiated in PCell or SCell. Or, the UE determines whether the random access procedure has been initiated in the P-TAG or S-TAG. In the case that the random access procedure has been initiated in the PCell, the UE performs the random access procedure 1 at step 1425. In the case that the random access procedure has been initiated in SCell or S-TAG, the UE performs random access procedure 2 at step 1430.

Here, the random access procedure 1 is the normal random access procedure in which the UE receives a Random Access Response in reply to the preamble, applies the TAC included in the Random Access Response, and performs uplink transmission based on the uplink grant included in the Random Access Response.

The random access procedure 2 is the random access procedure in which the UE transmits the dedicated preamble in SCell (or SCell belonging to and S-TAG or a certain SCell). At this time, if the TAC MAC CE transmitted with C-RNTI of the UE is received, the random access procedure ends. The UE determines uplink transmission timing by applying TAC included in the received TAC MAC CE.

Typically, the TAC MAC CE contains 6-bit TAC and has a value of + or ? indicating a relative adjustment value to the current uplink transmission timing. However, if the UE configure the transmission timing initially for a certain S Cell, the 6-bit relative value may not be enough for use in uplink timing adjustment. In the case of using the random access procedure 2 according to the present disclosure, the TAC MAC CE carries TAC longer than 6 bits (e.g. 11-bit TAC). In the following description, the conventional TAC MAC CE is referred to as the first TAC MAC CE and the TAC MAC CE for use in responding to the preamble in the SCell random access procedure as the second TAC MAC CE. The first TAC MAC CE format and the second TAC MAC CE format are shown in FIG. 15.

Figure 15:
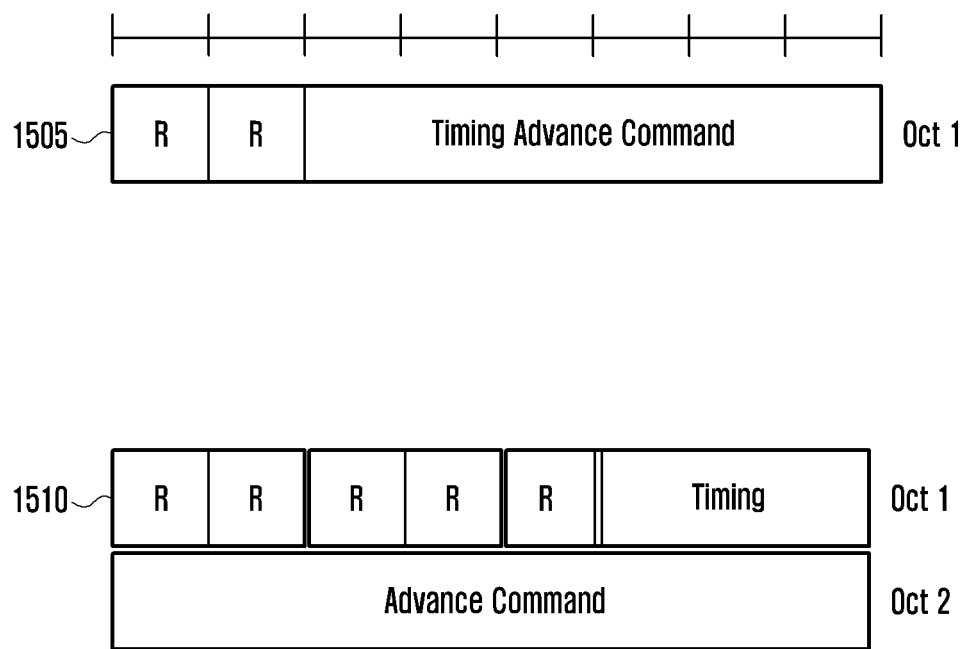
FIG. 15 is a diagram illustrating formats of TAC according to the fourth embodiment of the present disclosure.

FIG. 15 is a diagram illustrating formats of TAC according to the fourth embodiment of the present disclosure.

The formats of the first and second TAC MAC CEs according to an embodiment of the present disclosure are structured as denoted by reference number 1505 and 1510. In an embodiment, some of the reserved 5 bits of the second TAC MAC CE 1510 may be used for uplink transmission power control. Also, the second TAC MAC CE 1510 may be structured in the same format of the first TAC MAC CE 1505 with the exception of defining meaning of the TAC of the second TAC MAC CE 1510 differently from the meaning of the TAC of the first TAC MAC CE as shown in table 1.

TABLE 1

| Meaning of TAC in first TAC MAC CE | Meaning of TAC in second TAC MAC CE for UE in random access procedure 2 |
|---|---|
| Each value in range from 0 to 63 which is applied based on current UL transmission timing is actually defined by predetermined mapping table. That is, some defined with + and others with −. | Predetermined m bits of TAC following the same mapping rule with the same size as 11-bit TAC used in RAR. e.g., m MSB bits of 11-bit TAC. Or m LSB bit or Xn~Xn + m bits. The TAC is applied by referencing downlink subframe of DL timing reference cell. Only advancing is possible compared to the DL subframe boundary. That is, only + value (or − value) is defined. |

If random procedure 2 is used, the UE monitors to receive the second TAC MAC CE transmitted with its C-RNTI in predetermined time duration (e.g. duration identical with RAR window) after transmitting the preamble. If it is received, the UE applies TAC and ends the random access procedure. If the second TAC MAC CE is not received before the expiry of the time duration, the UE performs preamble retransmission procedure.

Fifth Embodiment

Semi-Persistent Scheduling (SPS) is a technique in which the UE uses the transmission resource allocated at a time periodically. For example, if the eNB allocates the transmission resource X to the UE semi-persistently, the UE uses the transmission resource X at a predetermined interval. The SPS transmission resource is also referred to as configured DL assignment or configured UL grant and, if the SPS transmission resource is activated, this is expressed as configured DL assignment or configured UL grant is initialized and, if the SPS transmission resource is deactivated, this is expressed as configured DL assignment or configured UL grant is cleared. In the following, the configured DL assignment or configured UL grant is referred to as configured resource for explanation convenience.

If the resource configured to the UE is initialized at a certain time, it is necessary to determine the timing to use the configured resource. For this purpose, the eNB sends the UE an RRC control message notifying of the period of the configured resource and the UE checks the subframe corresponding to the configured resource using the parameters such as configured resource-initialized time and period. At this time, it is possible to be aware of the initialization time using the follow equation:

$$(10*SFN+subframe)=[(10*SFNstart\ time+subframe\text{-}start\ time)+N*semiPersistSchedInterval]\ modulo\ 10240,\ for\ all\ N>0. \qquad \text{Equation (1)}$$

Here, SFNstart time denotes the system frame number of the radio frame when the configured resource has been initialized, subframestart time denotes the subframe number of the subframe when the configured resource has been initialized, and semiPersistSchedInterval denotes the configured resource occurrence interval.

Although it is possible to calculate the configure resource occurrence time accurately using the above equation in the normal case, there is a drawback in that if semiPersistSchedInterval is not a divisor of 10240 the configure resource occurs more frequently than semiPersistSchedInterval.

Figure 16:
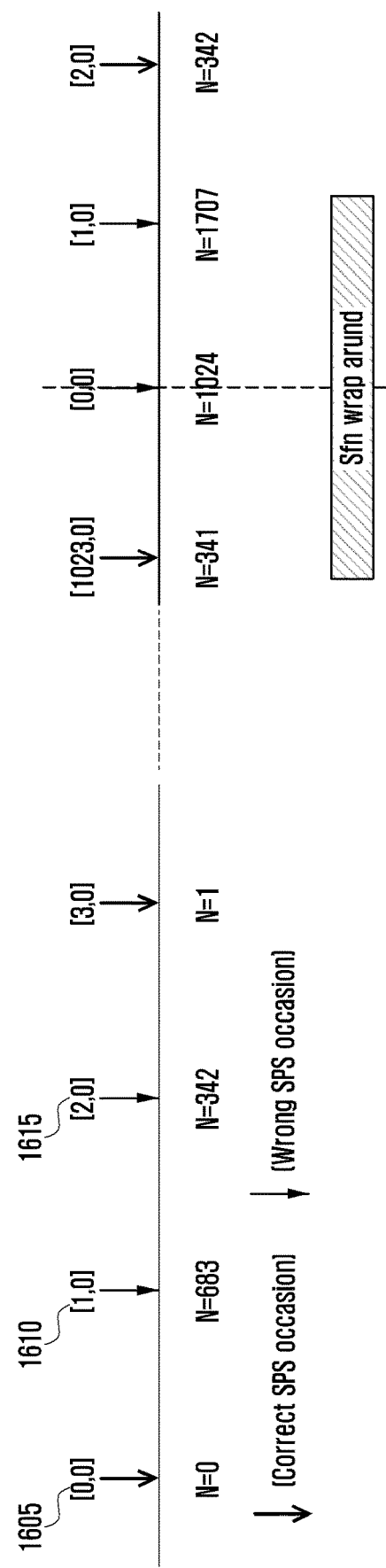
FIG. 16 is a diagram illustrating an exemplary erroneous situation occurring in the procedure of determining SPS subframe.

FIG. 16 is a diagram illustrating an exemplary erroneous situation occurring in the procedure of determining SPS subframe.

Referring to FIG. 16, when semiPersistSchedInterval is 30 ms and the configured resource has been initialized at 0th subframe of the radio frame of which SNF is 0 (hereinafter, expressed as [0, 0] 1605), equation (1) is fulfilled at [1, 0] 1610 and [2, 0] 1615 and thus the configured resource occurs.

In order to solve this problem, it is required to define N of equation (1) is a value incrementing in sequence. That is, if the configured resource is initialized, N is initialized and increments by 1 whenever the configured resource occurs. If the configured resource is reinitialized, it stops to use current N, and N is initialized to 0. In the present disclosure, the UE checks the subframe when the configured resource occurs using equation (2).

$$(10*SFN+subframe)=[(10*SFNstart\ time+subframe-start\ time)+N*semiPersistSchedInterval] modulo\ 10240, N>0\ and\ increment\ by\ 1 \quad \text{Equation (2)}$$

Here, SFNstart time denotes the system frame number of the radio frame when the configured resource has been initialized, subframestart time denotes the subframe number of the subframe when the configured resource has been initialized, and semiPersistSchedInterval denotes the configured resource occurrence interval.

If the SPS configuration (e.g. SPS period) changes in the state that the configured resource is being used (i.e. before the initialized configured resource is cleared), the UE has to calculate new N laboriously according to the changed period. Also, since the eNB cannot recognize the time when the new SPS configuration is applied correctly, the UE and the eNB may misrecognize the subframe when the configured resource occurs. In order to avoid this problem, it is preferred to change the SPS configuration in the state that the configured resource is being used.

According to an embodiment of the present disclosure, the eNB does not change the SPS configuration while the configured resource is used, and if the control message for changing the SPS configuration is received in the state that the configured resource is in use, the UE determines this as an error and thus releases the current connection initiates the connection reestablishment procedure. However, it may be allowed exceptionally to change the SPS configuration even when the configure resource is in used as an exception. For example, it is the case when the UE performs handover or when new SPS configuration clears the SPS configuration.

Figure 17:
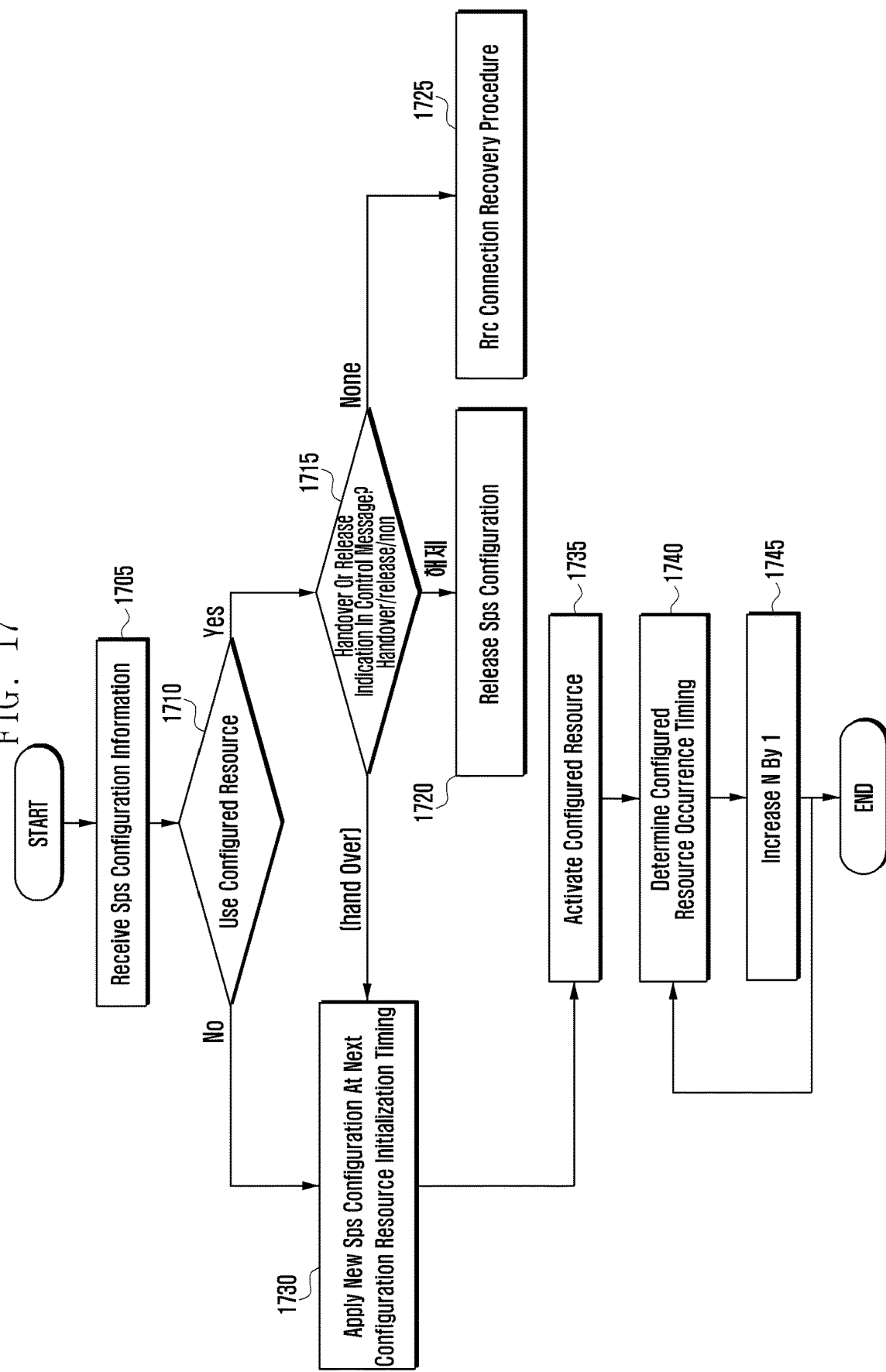
FIG. 17 is a flowchart illustrating the UE operation according to the fifth embodiment of the present disclosure.

FIG. 17 is a flowchart illustrating the UE operation according to the fifth embodiment of the present disclosure.

The UE receives the SPS configuration (SPS-config) information as the configured resource configuration information in a predetermined RRC control message, e.g. RRC Connection Reconfiguration message. The SPS configuration information may include the following informations.

1) SPS C-RNTI: cell level identifier of the UE for use in configured resource activation/deactivation command or HARQ retransmission command corresponding to the transmission using configured resource.

2) SemiPersistSchedInterval: configured resource occurrence interval.

3) numberOfConfSPS-Processes: number of HARQ processes for SPS operation. If this parameter is n, n processes from HARQ process 0 to (n−1) are sued in SPS operation.

The UE determines whether the configured resource is in use at step 1710. That is, the UE determines whether any SPS configuration information has been received before step 1705 and whether the configured resource is being used currently. If the configured resource is in use, the procedure goes to step 1715. If the configured resource is not in use, i.e. if any SPS configuration information has not been received or if although SPS configuration information has been received the configured resource is not in use, the procedure goes to step 1730.

At step 1715, the UE determines whether the control message including the SPS configuration information is a handover-related message or SPS configuration release indication message. If the control message including the SPS configuration information is the handover-related message, the procedure goes to step 1730 and, otherwise if the control message including the SPS configuration message is the SPS configuration release indication message, the procedure goes to step 1720. If both the two conditions are not fulfilled, the procedure goes to step 1725.

If the procedure progresses from step 1715 to step 1720, this means that, although the SPS configuration is reconfigured in the state of being used, the reconfiguration releases the SPS configuration. In this case, although the SPS configuration is reconfigured while the configured resource is in use, the aforementioned problem does not occur such that the UE reconfigures the SPS configuration as indicated at step 1720. That is, the SPS configuration is released. Then the configured resource in use currently is cleared.

If the procedure progresses from step 1715 to step 1725, this means that the SPS configuration is reconfigured in the state that he configured resource is in use and the aforementioned problem may occur. Since it is specified for the eNB to do not reconfigure the SPS configuration in such a situation, the UE determines that an irrecoverable problem has occurred and initiates the RRC Connection Reestablishment procedure at step 1725. If the RRC Connection reestablishment procedure is performed, this means that the UE releases all current configurations, stop all the timers, and perform the cell selection procedure. If a new cell is selected through the cell selection procedure, the UE transmits the RRC Connection reestablishment request message to reestablish the RRC connection. The RRC connection reestablishment request message includes the identifier of the previous serving cell, the UE identifier used in the previous cell, and a security token for us in UE authentication.

If the procedure progresses from step 1715 to step 1730, this means that the SPS configuration is reconfigured in the state that the configured resource is in use and the handover is in progress simultaneously. If the handover is triggered, the UE does not use the configured resource after clearing the configured resource and moving to the target cell until the configured resource is initialized, the aforementioned problem does not occur.

If the procedure progresses from step 1710 to step 1730, this means that the SPS configuration is reconfigured in the state that the configured resource is not in use and the aforementioned does not occurs. Accordingly, the UE memorizes the new SPS configuration at step 1730 for applying the new SPS when the configured resource is activated.

Afterward, the UE receives a configured resource activation command at step 1735. In detail, the UE receives Physical Downlink Control Channel (PDCCH) addressed to SPS C-RNTI and including NDI set to 0. The received PDCCH includes the information on the transmission resource to be used as configured resource and Modulation and Coding Scheme (MCS) information.

At step 1740, the UE memorizes the SFN of the subframe at which PDCCH is received and the subframe number, substitutes the parameters and SemiPersistSchedInterval to the equation (2), and sets N to 0 to determine the subframe when the configured resource occurs. The UE transmits or received data on the configured resource at the subframe. In more detail, the UE receives the data to which predetermined modulation and channel coding schemes have been applied on the predetermined transmission resource at the interval of SemiPersistSchedInterval from the time when the SPS activation command has been received. The received data is the HARQ initial transmission data and, if it fails to decode the data received on the SPS transmission resource, HARQ retransmission process is performed. In the HARQ retransmission, the SPS C-RNTI is used. The UE uses numberOfConfSPS-Processes HARQ processes alternately to process the data received on the SPS resource (i.e. stores data and performs HARQ operation using HARQ processes 0, 1, . . . , (n−1) whenever receiving data on SPS resource). The SemiPersistSchedInterval, numberOfConfSPS-Processes, and SPS C-RNTI are sent to the UE through the SPS configuration information of the RRC control message. The SPS transmission resource and MCS is transmitted to the UE through SPS activation command of PDCCH.

If the subframe when the configured resource occurs elapses, the UE increments N by 1 at step 1745 and the procedure returns to step 1740 to determine the next subframe when the configure resource occurs.

Sixth Embodiment

Transmission Time Interval (TTI) bundling is a technique for transmitting the same data at four consecutive subframes to solve the problem of power shortage of the UE at the cell edge. In the handover procedure, it is preferred to start TTI bundling immediately after moving to the target cell as far as possible. For this purpose, the control information instructing to perform TTI bundling in the target cell is transmitted to the UE through the handover command message.

In the handover procedure, the UE performs random access right after entering the target cell. The Random Access Response message received in the random access procedure includes an uplink grant, and the UE is capable of transmitting the control message for reporting handover complete based on the uplink grant. In this embodiment, the UE determines whether to apply TTI bundling to the uplink grant included in the Random Access Response message under the control of the eNB.

Figure 18:
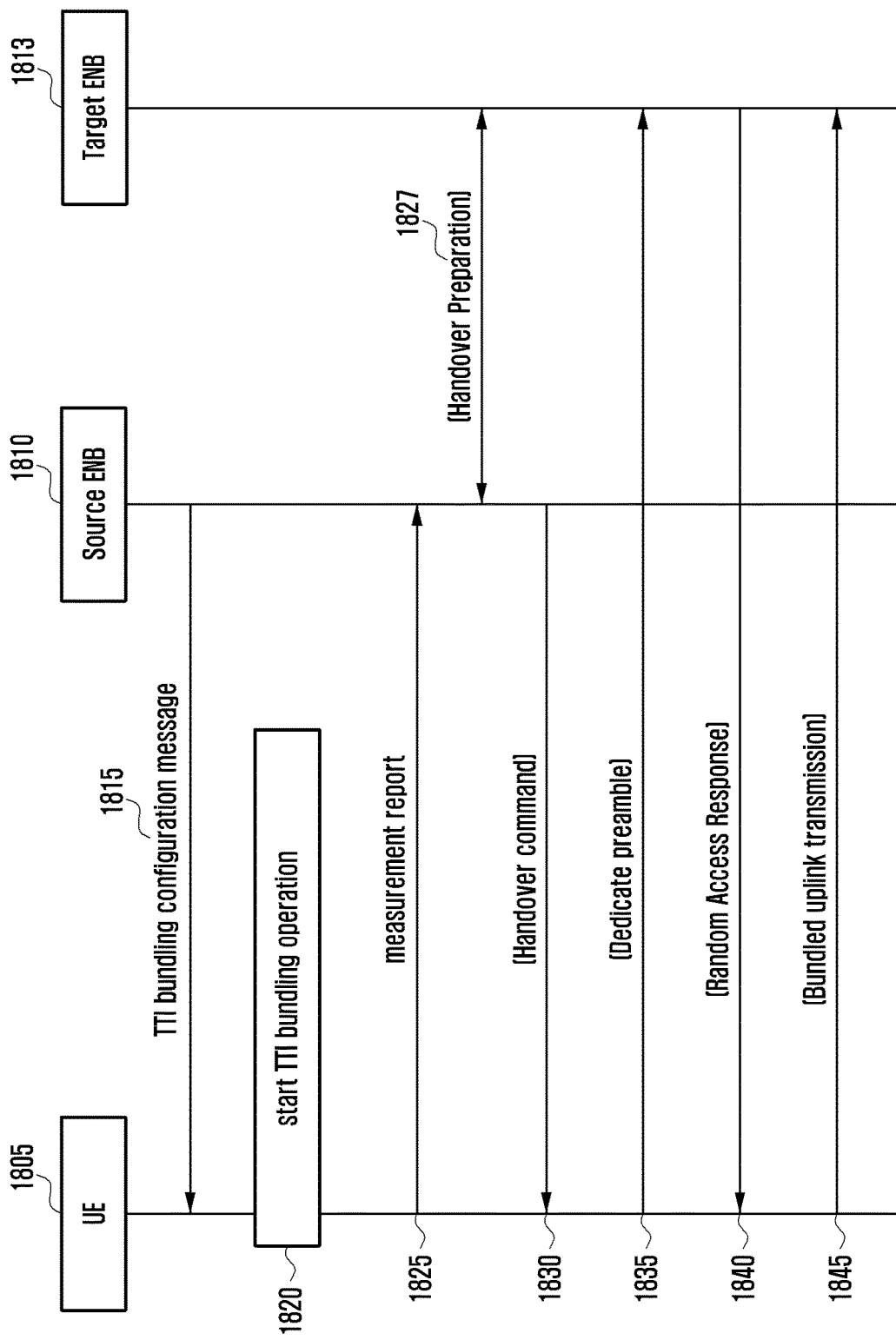
FIG. 18 is a signal flow diagram illustrating signal flows between the UE and eNBs according to the sixth embodiment of the present disclosure.

FIG. 18 is a signal flow diagram illustrating signal flows between the UE and eNBs according to the sixth embodiment of the present disclosure.

The source eNB 1810 first recognizes the power shortage of the UE 1805 and sends the UE a TTI bundling configuration message at step 1815. The TTI bundling configuration is indicated in such a way of setting ttiBundling parameter to 'true' in the RRC Connection Reconfiguration (RRC CONNECTION RECONFIGURATION) message.

If the RRC Connection Reconfiguration message is received, the UE starts TTI bundling at step 1820. The TTI bundling operates in such a way that if the uplink grant is received or if uplink transmission is triggered by the configured uplink grant, a MAC PDU is transmitted and retransmitted in sequence as many as predetermined number of times. The number of transmission times is indicated by the value of TTI_BUNDLE_Size. The uplink transmissions occurring consecutively are called 'bundle', and the HARQ operation is performed in unit of bundle. The eNB performs soft combining on the uplink signals transmitted repeatedly in sequence as so to maintain good transmission success rate even in the transmission power shortage situation of the UE.

If a situation in which the channel quality of a neighbor cell is superior in channel quality to the current cell over a predetermined offset is maintained over predetermined duration, the UE generates the measurement report for reporting the channel quality of the neighbor cell to the source eNB 1810.

Upon receipt of the channel quality report, the source eNB 1810 makes a handover decision by taking into consideration of various aspects such as channel quality (e.g. load status of cell) at step 1827. If the handover decision is made, the source eNB determines a target cell and performs handover preparation with the target eNB 1813 of the target cell. The handover preparation process is performed through exchanging HANDOVER REQUEST message and HANDOVER REQUEST ACK. The HANDOVER REQUEST ACK message includes the RRC CONNECTION RECONFIGURATION message transmitted from the target eNB 1813 to the UE 1805, and the HANDOVER REQUEST ACK MESSAGE (in detail, RRC connection reconfiguration message included in the HANDOVER REQUEST ACK MESSAGE) may include the information on the dedicated preamble for the UE to use in the target cell. The dedicated preamble is the preamble which the UE 1805 can use for predetermined duration dedicatedly and signaled by a ra-PreambleIndex field of the RRC connection reconfiguration message. The handover request ACK message also includes the ttiBundling parameter indicating whether to apply TTI bundling in the target cell.

The source eNB 1810 sends the UE 1805 a handover command at step 1830. In more detail, the source eNB 1810 sends the UE 1805 the RRC connection reconfiguration message including the information on the target eNB 1813. The RRC connection reconfiguration message is actually generated by the target eNB 1813 and transmitted to the source eNB 1810 in the handover request ACK message, and the source eNB 1810 forwards the RRC connection reconfiguration message included in the handover request ACK to the UE 1805 without any modification.

Afterward, the UE 1805 performs a procedure for handover with the target eNB 1813 at step 1835. In more detail, the UE 1805 acquires downlink synchronization to the target eNB 1813 and transmits the preamble using a predetermined resource in the target eNB 1813. This preamble is the first uplink signal in the random access procedure. If the dedicated preamble is assigned to the UE 1805, the UE 1805 transmits the dedicated preamble and, otherwise if no dedicated preamble is assigned to the UE 1805, the UE transmits a preamble selected randomly from a predetermined preamble set (hereinafter, referred to as random preamble). At this time, the UE 1805 transmits the preamble repeatedly, increasing the transmission power of the preamble, until receiving a Random Access Response (RAR).

If the preamble transmitted by the UE 1805 is received, the target eNB 1813 generates the Random Access Response (RAR) to the UE 1805 at step 1840. The Random Access Response (RAR) includes TAC indicating uplink transmission timing of the UE 1805 and the uplink transmission resource information.

If the Random Access Response (RAR) is received, the UE adjust the uplink transmission timing based on TAC. The UE prepares uplink transmission based on the uplink transmission resource information included in the Random Access Response (RAR). The first uplink data transmitted by the UE to the target eNB 1813 is the RRC CONNECTION RECONFIGURAITON COMPLETE message reporting successful RRC connection reconfiguration, and the UE may prepare transmission of RRC connection reconfiguration complete message on the allocated transmission resource.

The UE 1805 performs uplink transmission using the transmission resource allocated by the Random Access Response (RAR) at step 1845. If the UE uses the dedicated preamble and if the RRC connection reconfiguration message received at step 1830 includes the TTI bundling execution command, the UE executes TTI bundling in uplink transmission. That is, the UE transmits/retransmits a MAC PDU four times using four consecutive TTIs on the allocated transmission resource. If the dedicated preamble is not used, although the TTI bundling execution command is received in the RRC Connection Reconfiguration message, the UE 1805 does not apply TTI bundling to the uplink transmission. In the random preamble-based random access procedure, at the time when the preamble and the RAR has been exchanged, the target eNB 1813 does not know the type of the UE 1805 which has transmitted the preamble such that the eNB cannot receive the signal even with the application of TTI bundling. The target eNB 1813 allocates the dedicated preamble as far as possible but, if there is no available dedicated preamble, may command the UE 1805 to perform handover using the random preamble.

As described above, if the UE 1813 commands the UE to apply TTI bundling after handover and if the dedicated preamble is allocated, the UE executes TTI bundling from the uplink transmission corresponding to the uplink grant included in the RAR and, if the dedicated preamble is not allocated, the UE executes TTI bundling from the uplink transmission for which transmission resource is allocated through PDCCH other than the uplink transmission corresponding to the uplink grant of the RAR.

Figure 19:
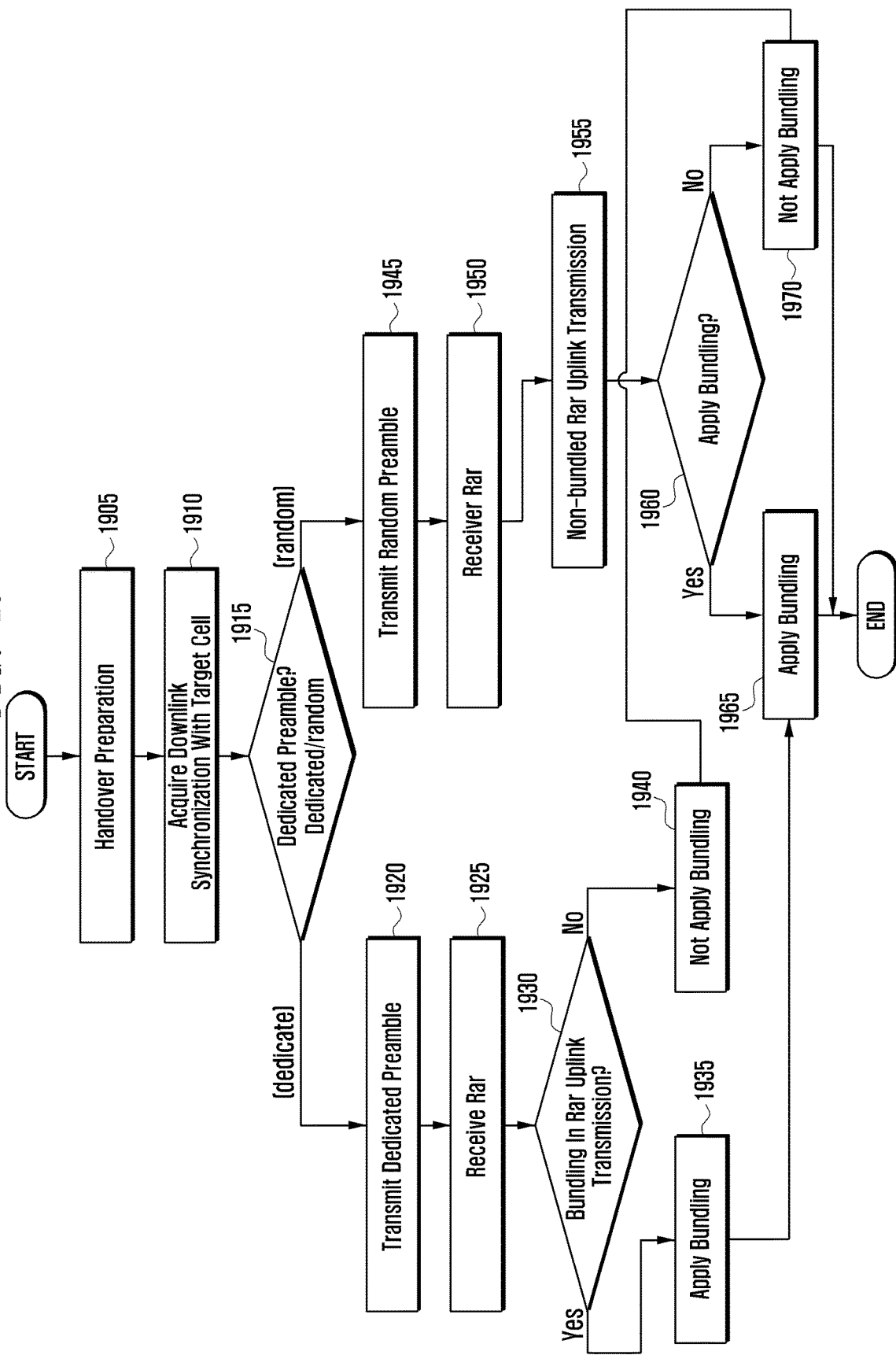
FIG. 19 is a flowchart illustrating the UE operation according to the sixth embodiment of the present disclosure.

FIG. 19 is a flowchart illustrating the UE operation according to the sixth embodiment of the present disclosure.

The UE 1805 receives a RRC connection reconfiguration message instructing handover from the source eNB 1810 at step 1905. In more detail, the source eNB 1801 sends the UE 1805 the RRC Connection Reconfiguration message including the information on the target eNB 1813. The RRC connection reconfiguration message is actually generated by the target eNB 1813 and transmitted to the source eNB 1810 in the handover request ACK message, and the source eNB 1810 forwards the RRC connection reconfiguration message included in the handover request ACK to the UE 1805 without any modification.

The UE 1805 acquires downlink synchronization with the cell indicated in the RRC connection reconfiguration message at step 1910. Next, the UE determines whether the RRC connection reconfiguration message includes indication of dedicated preamble at step 1915. The RRC connection reconfiguration message includes ra-PreambleIndex and, if this field is set to an integer in the range 1 to 63, this means that a dedicated preamble is allocated. If ra-PreambleIndix is not included or if although it is included the ra-PreambleIndex is set to 0, this means no dedicated preamble is allocated. If it is determined that a dedicated preamble is allocated, the procedure goes to step 1945.

The UE transmits the preamble indicated by the ra-PreambleIndex at a predetermined time using predetermined transmission resource at step 1920. The preamble transmission timing and transmission resource are notified to the UE in the system information and, in handover, notified to the UE 1805 in the RRC connection reconfiguration message instructing the handover. The UE 1805 transmits the preamble in a predetermined until the target eNB 1813 transmits a valid Random Access Response (RAR). The maximum number of preamble transmission times is restricted by preambleTransMax which is notified to the UE through the RRC connection reconfiguration message.

If any valid Random Access Response (RAR) is not received at step 1925, the UE 1805 adjusts the uplink transmission timing by applying TAC included in the Random Access Response (RAR). The UE also recognizes necessity of uplink transmission using the uplink transmission resource indicated in the Random Access Response (RAR). The valid Random Access Response (RAR) is the RAR including preamble id indicating the preamble transmitted by the UE in the subheader.

Afterward, the UE determines whether the RRC connection reconfiguration message instructing handover includes the ttiBundling parameter set to 'true' in order to determine whether to apply TTI bundling to the uplink transmission using the uplink transmission resource allocated in the Random Access Response (RAR at step 1930. If the RRC connection reconfiguration message includes the ttiBundling parameter set to 'true', the UE 1805 executes TTI bundling at step 1935. That is, the UE transmits a MAC PDU repeatedly using the transmission resource during the TTI_BUNDLE_SIZE TTI. The UE 1805 applies TTI bundling the next uplink transmission, i.e. the uplink transmission for which the transmission resource is allocated in PDCCH, at step 1965.

If the RRC connection reconfiguration message includes no ttiBundling parameter set to 'true', the UE 1805 does not apply TTI bundling to the uplink transmission using the transmission resource allocated in the Random Access Response (RAR) at step 1940. That is, the MAC PDU is transmitted using the transmission resource during 1 TTI (1 ms). The UE 1805 does not apply TTI bundling to the next uplink transmission, i.e. the uplink transmission to which the transmission resource is allocated through PDCCH.

If it is determined that no dedicated preamble is allocated at step 1915, the UE selects a preamble randomly from a predetermined preamble set and transmits the selected preamble using predetermined transmission resource at a predetermined timing. The preamble transmission timing and transmission resource is notified to the UEs in the system information and, in handover, notified to the UE 1805 in the RRC connection reconfiguration message instructing the handover. The UE 1805 transmits the preamble in a predetermined until the target eNB 1813 transmits a valid Random Access Response (RAR). The maximum number of preamble transmission times is restricted by preambleTransMax which is notified to the UE through the RRC connection reconfiguration message.

If any valid Random Access Response (RAR) is not received at step 1950, the UE 1805 adjusts the uplink transmission timing by applying TAC included in the Random Access Response (RAR). The UE also recognizes necessity of uplink transmission using the uplink transmission resource indicated in the Random Access Response (RAR). The valid Random Access Response (RAR) is the RAR including preamble id indicating the preamble transmitted by the UE in the subheader.

Afterward, the UE 1805 performs uplink transmission using the transmission resource allocated in the RAR without applying TTI bundling at step 1955 and the procedure goes to step 1960. At step 1960, if any uplink grant is received through PDCCH or uplink transmission is performed according to the configured uplink grant, the UE 1805 determines whether the RRC connection reconfiguration message instructing handover includes ttiBundling parameter set to 'true' in order to determine whether to apply TTI bundling.

If the RRC connection reconfiguration message includes the ttiBundling parameter set to 'true', the UE 1805 applies TTI bundling to the next uplink transmission, i.e. the uplink transmission for which transmission is allocated through PDCCH, at step 1965. If the RRC connection reconfiguration message includes no ttiBundling parameter set to 'true', the UE 1805 does not apply TTI bundling to the uplink transmission using the transmission resource allocated in the RAR at step 1970.

Seventh Embodiment

The service provider monitors the occurrence of coverage hole of the network and takes an action to resolve the problem. In order to search for coverage hole, the service provider may request the UEs to monitor and report the channel conditions, and this operation is referred to as Minimization of Drive Test (MDT). It is preferred to report the location information and channel condition together to improve the effect of the MDT. The seventh embodiment of the present disclosure proposes a method for selecting the UE which is likely to provide the location information to perform MDT.

The network may initiate MDT for various reasons. For example, when deploying a new eNB in a certain area, it is possible to check the network condition around the corresponding area through MDT. In the case that a certain UE complains continuously, it is possible to configure MDT to the UE to collect the information on the channel condition so as to resolve the complaints. MDT may be classified into two types: logged MDT in which the UE in the idle mode logs the channel condition periodically and immediate MDT in which the UE in connected mode reports the channel condition immediately in response to the instruction from the eNB.

As described above, the present disclosure relates to a method for allowing the eNB to select the UE having high probability of providing location information to perform MDT. Although the description is directed to the logged MDT as an example, the present disclosure is applicable to the immediate MDT.

For reference, the terms 'Global Positioning System (GPS)' and 'Global Navigation Satellite System (GNSS)' are interchangeably used in the present disclosure.

Figure 20:
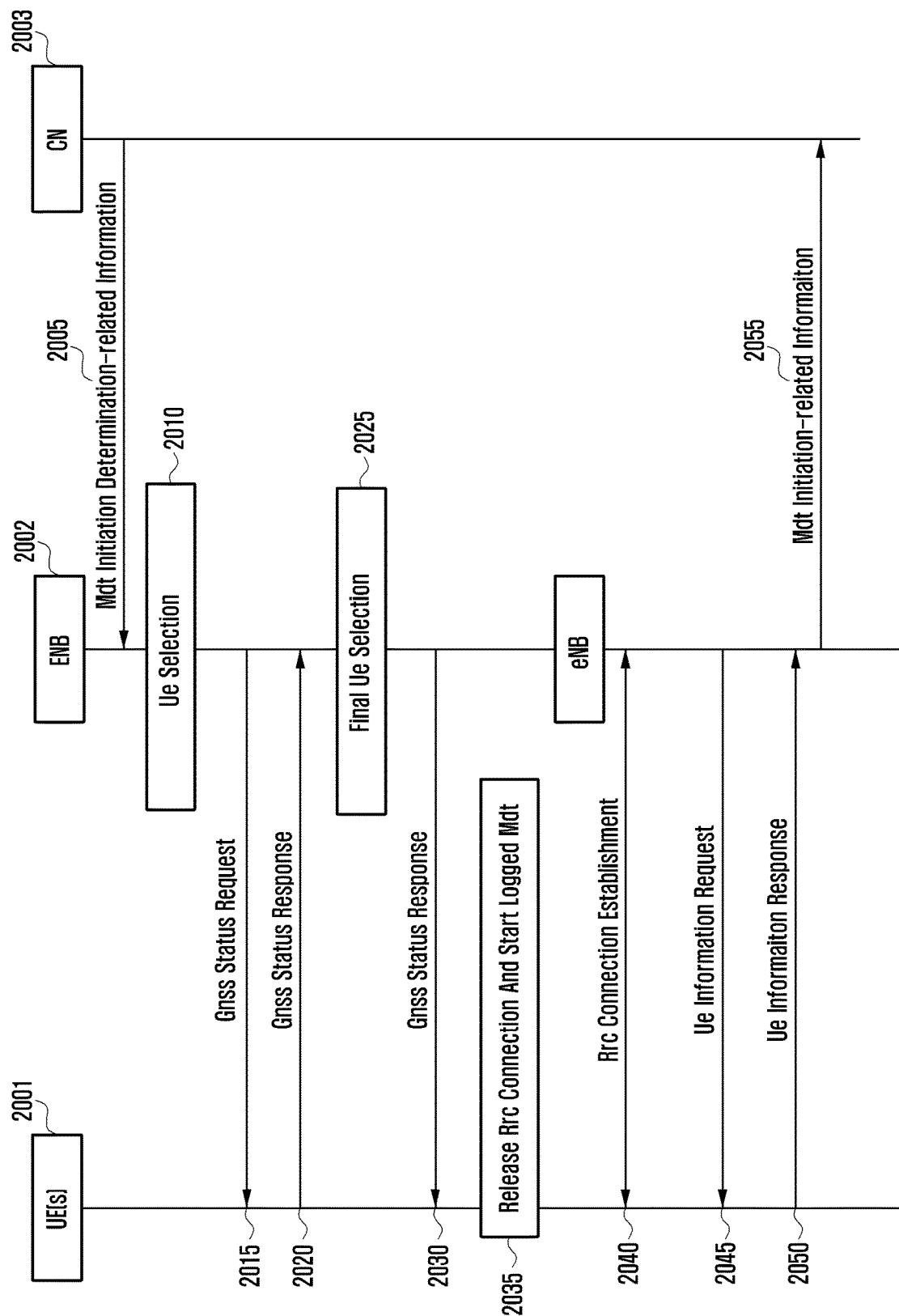
FIG. 20 is a signal flow diagram illustrating signal flows among UE, eNB, and Cone Network according to the seventh embodiment of the present disclosure.

FIG. 20 is a signal flow diagram illustrating signal flows among UE, eNB, and Cone Network according to the seventh embodiment of the present disclosure.

First, the Core Network (CN) 2003 determines to perform MDT at step 2005. The core network entity such as MME transmits MDT configuration information to the eNBs 2002 in the area for MDT. The configuration information includes a user consent list of the UE(s) 2001 consented to the MDT and area in which the MDT is to be performed.

If the MDT configuration information is received, the eNB 2002 selects the UEs firstly for MDT configuration among the UEs in the connected state by applying the following conditions at step 2010.

First selection conditions
UE consented to performing MDT
UE of which RRC connection is to be released in time:
  For example, if no downlink/uplink data occurs for a certain UE over a predetermined time, the eNB may determine that the RRC connection of the UE is to be released in the near future.

Afterward, the eNB 2002 transmits a GNSS status request message inquiring about current GNSS operation to the UEs 2001 fulfilling the above conditions. If the GNSS status request message is received, the UE 2001 transmits a GNSS status response message containing the GNSS operation information at step 2020. The GNSS status response message is also transmitted to the eNB 2002 in the form of RRC control message. The GNSS status response message includes the following information.

current GSS operation: Yes or No
  (if GNSS is operating currently) time elapsed since start of GNSS
  (regardless of GNSS operation status) GNSS operation history (e.g. GNSS operation time rate for predetermined duration, etc.)

If the GNSS status response message is received from the UE 2001, the eNB 2002 determines the UE to perform the logged MDT based on the information included in the GNSS status response message at step 2025. In the case that multiple UEs are operating GNSS, the eNB determines the UE to configure the GNSS MDT among the UEs having positive GNS operation history and short GNSS operation time. If the number of UEs operating GNSS at the corresponding time, it is possible to configure the logged MDT to the UE having positive GNSS operation history although it's GNSS is activated. If the GNSS operation history is positive, this means that the GNSS operation time rate in the past has been high.

At step 2030, the eNB 2002 configures the logged MDT to the selected UE 2001. The eNB 2002 sends the UE 2001 a control message including logged MDT measurement execution area, duration, interval, current reference time, etc.

If control message is received, the UE 2002 releases the RRC connection and starts logged MDT operation a step 2035. In more detail, the UE logs the channel state of the serving and neighbor cells and, if any valid GNSS location information, the GNSS location information at a predetermined interval. At this time, if the following conditions are fulfilled, the UE skips the logged MDT although the logged MDT execution time arrives. This is because the logged measurement result including no information for use in estimating the location of the UE is meaningless.

[Condition 1]
Assuming that the current time is t1 and the most recent valid GNSS information acquisition time is t2, the difference between t1 and t2 (i.e. the time elapsed since the acquisition of valid GNSS information) is equal to or greater than a predetermined threshold.

[Condition 2]
There is no valid neighbor cell measurement information at the time when start logging.

The reason why the log is performed only when the valid GNSS location information exist in a predetermined time is because, although the current position may be estimated to some extent using the current neighbor cell measurement result and past GNSS location information, it becomes difficult to estimate accurate location as the difference between the two time points increases. Also, since the UE does not measure the neighbor cell when the channel conditions of the serving cell is good, condition 2 is the case when the channel condition of the serving cell is very good, and MDT is not performed.

The UE 2001 establishes an RRC connection with the eNB 2002 for a certain reason at step 2040. At this time, the UE reports to the eNB that there is the logged measurement result to report. Afterward, the eNB 2002 sends the UE 2001 a UE information request message to request the UE 2001 to report the logged measurement result. Upon receipt of the UE information request, the UE 2001 sends the eNB 2002 a UE information response message including the logged measurement result) at step 2050. The eNB 2002 sends the CN 2003 the logged measurement result at step 2055.

Figure 21:
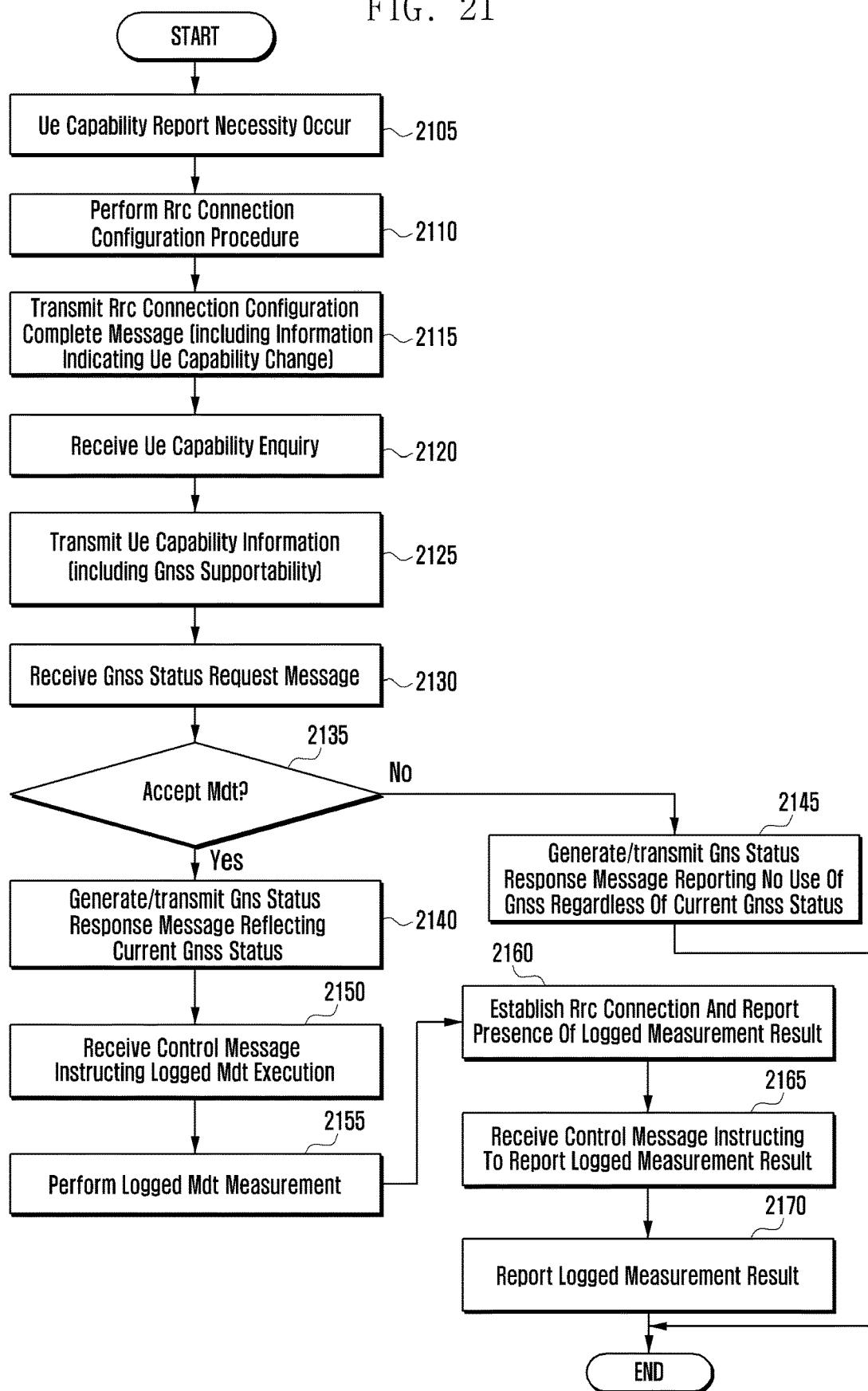
FIG. 21 is a flowchart illustrating the UE operation according to the seventh embodiment of the present disclosure.

FIG. 21 is a flowchart illustrating the UE operation according to the seventh embodiment of the present disclosure.

The UE 2001 detects the necessity of reporting of UE capability newly at step 2105. For example, if the UE powers on, the UE capability is likely to differ from the lastly reported UE capability. Particularly when the user changes the configuration on whether to consent the MDT execution (e g changes the MDT execution accept to MDT execution reject or vice versa), the UE has to report the new UE capability.

The UE 2001 performs RRC connection establishment procedure with the eNB 2002 at step 2110. The UE transmits an RRC connection configuration request message (containing information such as UE id and reason for RRC connection establishment), and the eNB 2002 transmits an RRC connection configuration message (containing UE's SRB configuration information, MAC configuration information, and PHY configuration information) in reply. If the RRC connection configuration message is received from the eNB 2002, the UE 2001 transmits an RRC connection complete message at step 2115. The RRC connection complete message contains a NAS message transmitted from the UE 2001 to the MME. The UE transmits the NAS message containing the information indicating that the UE capability has changed to report the UE capability. The MME stores the UE capability and, if the UE 2002 establishes the RRC connection, sends the eNB 2002 the radio capability extracted from the UE capability. This is to prevent the eNB from reporting UE capability too frequently whenever the RRC connection is established.

The UE performs normal operation after transmitting the RRC connection configuration complete message. As described above, the eNB 2002 transmits a UE capability enquiry message to acquire new capability information. The UE receives the UE capability enquiry message at step 2120 and the procedure goes to step 2125. At step 2125, the UE 2001 sends the eNB the UE capability information in response to the UE capability enquiry message. The UE capability information contains the information on the UE capability including the following two informations.

Logged MDT support indicator (1 bit)
GNSS support indicator (1 bit)

In order to support the logged MDT, extra memory is required. Accordingly, the UE 200a informs sends 1-bit information indicating whether it supports logged MDT. The UE generates the UE capability information in consideration of whether the user accepts the MDT as well as whether the UE supports the MDT in hardware and software. For example, although MDT is supported in hardware and software, if the user rejects the MDT execution, the UE 2001 sets the logged MDT supportability to No. If the user changes the MDT supportability, the logged MDT supportability also changes depending on the MDT supportability change. The GNSS supportability is the information necessary for the eNB to select the UE to perform MDT.

If the UE capability information is received, the eNB 2002 stores the information and sends the MME the UE capability information. Afterward, if a CN entity such as MME instructs to perform logged MDT at a certain time, the eNB determines whether to transmit the GNSS status request to the corresponding UE 2001 by referencing the above information. The eNB 2002 transmits the GNSS status request to the UEs supporting the logged MDT and GNSS among the UEs which are likely to release the RRC connection.

If the UE 2001 has reported that it supports both the logged MDT and GNSS at step 2125, the eNB 2002 may send the UE 2001 the GNSS status request message such that the UE 2001 receives the GNSS status request message at step 2130 and the procedure goes to step 2135. At step 2135, the UE determines whether to accept MDT. Although whether to accept the MDT has been reflected in 'logged MDT supportability' reported at step 2125, the UE checks again whether the user accepts MDT because the user may have changed the decision or the eNB may have misinterpreted the information. If it is determined that the user accepts MDT, the procedure goes to step 2140 and, otherwise if it is determined that the user rejects MDT, step 2145.

If the procedure progresses to step 2145, this means that it is not preferred to configure MDT to the UE 2001. The UE 2001 does not generate GNSS STATUS RESPONSE/POSITIONING STATUS RESPONSE MESSAGE OR GENERATE or generate GNSS STATUS RESPONSE/POSITIONING STATUS RESPONSE message but configures the following information regardless of whether the GNSS is actually used.

GNSS use indication: No
GNSS use history: 0% or activated positioning method: none
higher layer application using GNSS is not running and long time has elapsed since acquisition of last GNSS positioning information
GNSS is disabled on OS of UE Although the UE 2001 has not generated the GNSS STATUS RESPONSE/POSITIONING STATUS RESPONSE message, it generates RLC level response (RLC ACK or RLC NACK) normally in response to GNSS STATUS RESPONSE/POSITIONING STATUS RESPONSE message in order to prevent unnecessary RLC retransmission.

At step 2140, the UE 2001 generates the GNSS STATUS RESPONSE message including the following informations to the eNB 2002. Afterward, the eNB 2002 selects the UE 2001 to perform MDT based on the above information.

GNSS use indication: information indicating whether to use GNSS currently. 1 bit.
GNSS use time: information included only when GNSS is in use currently, use time of currently running GNSS
GNSS use history: rate of GNSS use time of the UE to past time duration n.

Or, the eNB 2002 may transmit a POSITIONING STATUS REQUEST message at step 2130, and the UE 2001 may transmit a POSITIONING STATUS RESPONSE message including the following information at step 2140.

Activated positioning method (e.g. information indicating no use of stand-alone GPS, A-GNSS, OTDOA, or positioning)
prediction accuracy (particularly in GPS, related to prediction uncertainty information)
prediction activation duration: information indicating how long the activated positioning method is maintained. It may be simple information like short/long/unknown.
current speed: The UE moving fast is not appropriate for performing MDT and thus it is effective to notify of the current speed of the UE. If the UE knows the current speed measured by the positioning method running currently, it reports the current speed.

information for use in determining whether GNSS is in used currently or to be used in the near future such as whether higher layer application using GNSS is running currently, how long time has elapsed since acquisition of last GNSS positioning information, and whether higher layer application has requested for GNSS positioning.

whether GNSS is enabled on OS of UE

Afterward, the UE 2001 receives the control message indicating whether to perform logged MDT from the eNB 2002 and waits until the RRC connection is released at step 2150. If the RRC connection is released, the UE 2001 performs MDT measurement logging at the interval indicated as far as predetermined conditions are fulfilled for the indicated duration in the indicated area at step 2155. The conditions include that the UE has camped on a certain eNB normally, it is not RRC connected state, no memory overflow occurs, and the UE 2001 has the valid location information acquired in a predetermined time.

Particularly, the UE 2001 may not perform the MDT measurement logging in the situation where one or both of [condition 1] and [condition 2] are fulfilled although the MDT measurement logging occasion arrives at a predetermined interval.

The UE 2001 establishes an RRC connection with the eNB 2002 for a certain reason and sends the eNB 2002 the RRC connection establishment complete message the presence of the logged measurement result to report at step 2160. Afterward, if a UE INFORMATION REQUEST message instructing to report the logged measurement result is received at step 2165, the UE 2001 transmits a UE INFORMATION RESPONSE message including the logged measurement result at step 2170.

In an alternative operation of the embodiment of FIG. 20, although the conditions 1 and 2 are fulfilled, the eNB 2001 performs the MDT measurement logging at step 2155 but reports the logged measurement result with the exception of the logged measurement result fulfilling conditions 1 and 2 in reporting the logged measurement resulting at step 2170.

In another alternative operation, the eNB 2002 informs the UE 2001 of the conditions to report GNSS STATUS or POSITIONING STATUS instead of enquiring the GNSS STATUS or POSITIONING STATUS and, if the conditions are fulfilled, transmits the GNSS STATUS RESPONSE message or POSITIONING STATUS RESPONSE message.

Figure 22:
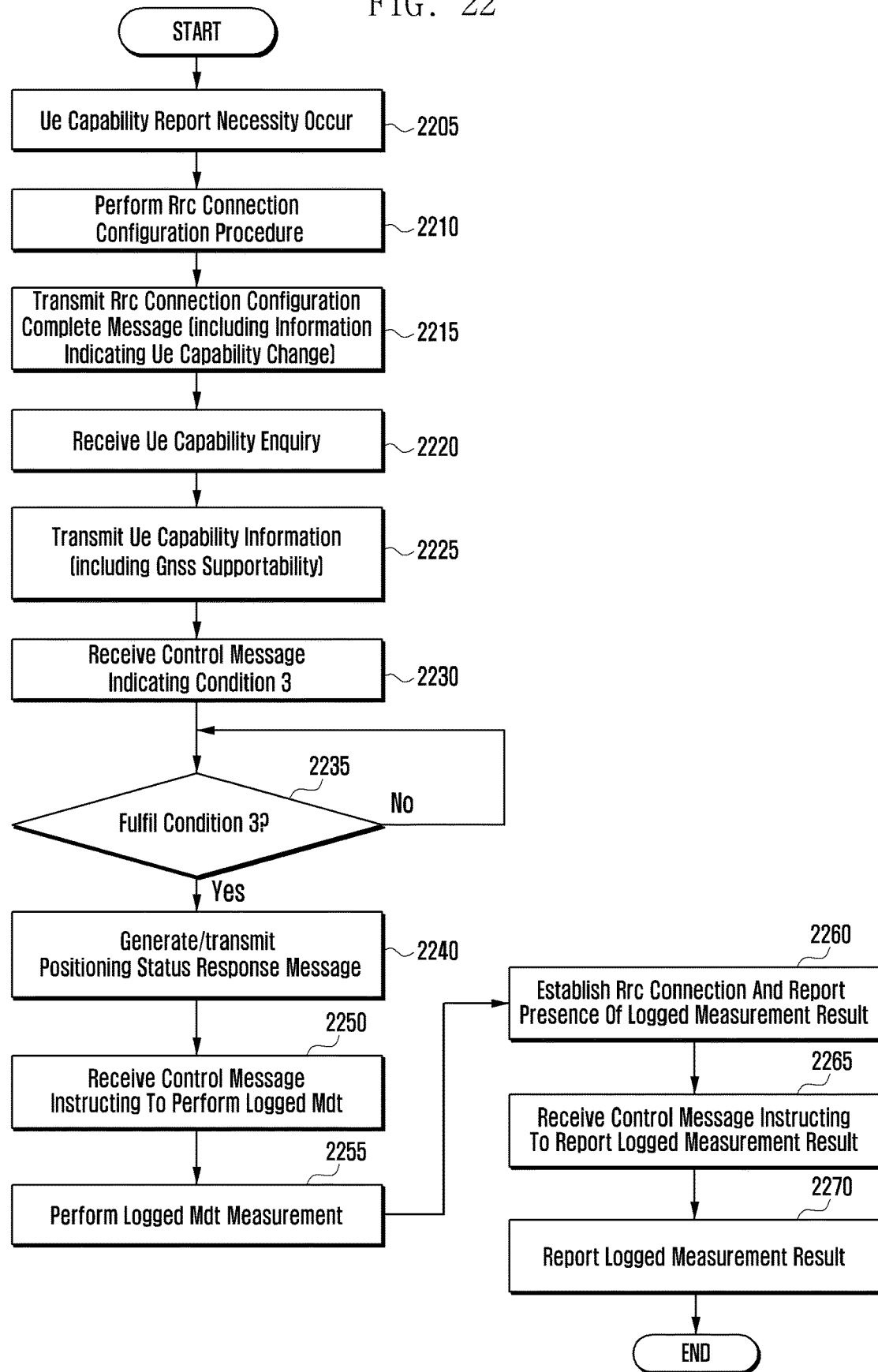
FIG. 22 is a flowchart illustrating alternative UE operation according to the seventh embodiment of the present disclosure.

This alternative operation according to an embodiment is depicted in FIG. 22.

FIG. 22 is a flowchart illustrating alternative UE operation according to the seventh embodiment of the present disclosure. Since steps 2205 to 2225 of FIG. 22 are identical with steps 2105 to 2125, detailed descriptions thereon are omitted herein.

At step 2230, the UE 2001 receives a control message from the eNB 2002 and, if [condition 3] is fulfilled, the control message includes the information instructing the UE to generate POSITIONING STATUS RESPONSE message.

[Condition 3]

higher layer (or application) of UE execute GPS
activate positioning session
starts use of positioning method
execute higher layer application using GNSS
GNSS positioning information become available (or GNSS positioning information becomes available after x ms since it has been reported that the GNSS position information has become available)
higher layer application using GNSS request the GNSS module for position information (or higher layer application request GNSS module for positioning information after x ms since it has been reported that the higher layer application has requested GNSS module for positioning information).

use of GNSS is enabled on OS of UE.

The control message may be transmitted to the UE in the system information or a Dedicated RRC control message. In the case that the control information is transmitted in the system information, a POSITIONING STATUS RESPONSE is transmitted when only the UE supporting GNSS and MDT and consenting MDT execution fulfils the condition.

The UE 2001 determines whether condition 3 is fulfilled at step 2235 and, if condition 3 is fulfilled, generates/transmits the POSITIONING RESPONSE message at step 2240.

Since steps 2250 to 2270 of FIG. 22 are identical with steps 2150 to 2170 of FIG. 21, detailed descriptions thereon are omitted herein.

Eighth Embodiment

Due with widespread use of smartphones, the terminal battery management becomes important more and more. In LTE, in order to reduce battery consumption of the UE, Discontinuous Reception (DRX) technique is used in the UE in connected state.

The DRX operates in such a way that the UE starts the following timers according to predetermined conditions and monitors PDCCH while at least one of the following timers is running. The detailed operations of the following timers are specified in detail at section 5.7 of TS36.321.

onDurationTimer: timer starting at every DRX cycle
inactivityTimer: timer starting when UE receive scheduling
retransmissionTimer: timer starting when HARQ retransmission is predicted at UE The timers have predetermined lengths and, once they start, the UE maintains active time until they expire. In the case that there is no more data to transmit, it is preferred to stop active time even when the time is running in view of battery consumption of the UE. The present disclosure proposes a control message instructing the UE to step some or all of the timers. The active time is specified in TS 36.321.

In order to stop the timers selectively and apply DRX period selectively, two different types of control message are defined as follows.

The first control message is used in the case that transmission data does not occur currently but are predicted to occur sooner or later and, if the first control message is received, the UE stops onDurationTimer and inactivityTimer and apply a short DRX cycle.

The second control message is used to stop currently running HARQ operation in the case that transmission data does not occur for significant duration and, if the second control message is received, the UE stops retransmissionTimer as well as onDurationTimer and inactivityTimer. Afterward, in order to prevent the retranmsissionTimer from restarting, the HARQ RTT timer is terminated too. Also, the data stored in the downlink HARQ buffer is discorded. The HARQ RTT timer is the timer for determined the start time of the retransmissionTimer and thus starts when the UE receives downlink data and, if the timer expires without decoding the received data successfully, the retransmissionTimer starts.

In the following description, the first control message is referred to as the first DRX MAC CE, and the second control message is referred to as the second DRX MAC CE for explanation convenience.

Figure 23:
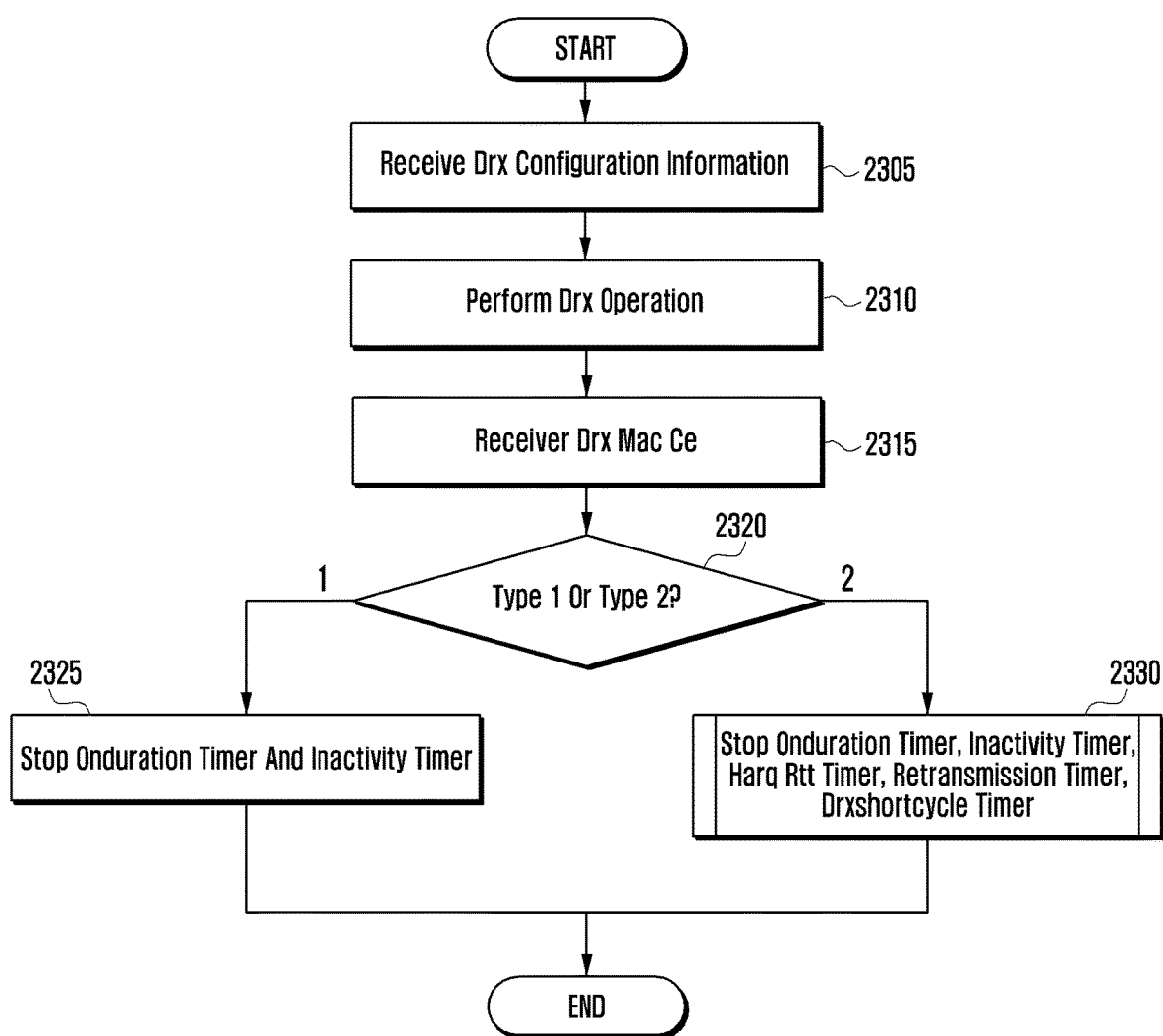
FIG. 23 is a flowchart illustrating the UE operation according to the eighth embodiment of the present disclosure.

FIG. 23 is a flowchart illustrating the UE operation according to the eighth embodiment of the present disclosure.

The UE first receives DRX configuration information from the eNB and configure DRX at step 2305. The DRX configuration information is transmitted through an RRC control message and includes following informations.

Value to be applied to onDurationTimer, value to be applied to drx-InactivityTimer, value to be applied to RetransmissionTimer, value to be applied to drxStartOffset, value to be applied to drxShortCycleTimer, longDRX-Cycle length, shortDRX-Cycle length, HARQ RTT timer, etc.

Afterward, the UE starts DRX operation at step 2310. This means that the active time and non-active time alternate according to a predetermined rule. The UE monitors PDCCH during the active time and stops monitoring PDCCH during the non-active time. The UE may operate with the short DRX cycle or the long DRX cycle. If the scheduling is received, the UE transitions from the long DRX cycle to the short DRX cycle and, in no scheduling is received during the drxShortCycleTimer, transitions to the long DRX cycle. The UE starts the onDurationTimer at every DRX cycle and maintains Active Time while the timer is running. If downlink or uplink transmission resource is allocated for new transmission during the active time, the UE starts the DRX-InactivityTimer. While the timer is running, the UE operates in Active time. If it fails to decode the downlink data, the UE sends HARQ NACK and, after predetermined duration (related to HARQ RTT timer), starts the DRX-RetransmissionTimer. The UE operates in active time while the timer is running The UE receives a DRX MAC CE from the eNB at step 2315. The MAC CE denotes the control message generated and processed by the MAC layer. Typically, the active time of the UE ends when all of the onDurationTimer, drx-InactivityTimer, and drx-RetransmissionTimer expire. If there is no more downlink data to transmit, the eNB sends the UE the DRX MAC CE to stop the timers to end the active time immediately, resulting in improvement of battery efficiency. If the DRX MAC CE is received, the procedure goes to step 2320.

At step 2320, the UE checks the type of the DRX MAC CE. If the DRX MAC CE is type 1, the procedure goes to step 2325 and, otherwise if the DRX MAC type is type 2, step 2330.

The type 1 DRX MAC CE is used for terminating the active time of the UE immediately without influence to the current HARQ operation and current DRX cycle. Although there is no more data to be transmitted to the UE, if the probability of occurrence of new data to be transmitted to the UE sooner or later is higher, the eNB uses the type 1 DRX MAC CE. The type 1 DRX MAC CE is indicated with a predetermined LCH ID (e.g. 11110) and has the payload of 0 byte.

The type 2 DRX MAC CE is the DRX MAC CE of which battery conservation efficiency is higher than the type 1 by preventing the UE from staying in the active time for HARQ retransmission even when there is HARQ packet to receive from the view point of the UE and applying the long DRX cycle immediately. If there is no more data to be transmitted to the UE, if there is no need of HARQ retransmission, and if there is no probability of occurrence of new data sooner or later, the eNB uses the type 2 DRX MAC CE. The type 2 DRX MAC CE is indicated with a predetermined LCH ID (e.g. 11010) different from the LCH ID of the type 1 DRX MAC CE and has the payload of 0 byte.

The UE stops the onDurationTimer and drx-InactivityTimer at step 2325. Since the drx-RetransmissionTimer is not stopped, the HARQ retransmission in progress is maintained. Also, the current DRX cycle is maintained. If the inactivityTimer is running, this means that the short DRX cycle is in use; and if the current DRX cycle is maintained, this means that the short DRX cycle is used. Afterward, the UE continues the normal DRX operation. That is, if there is no other reason for maintaining the active time (e.g. drx-RetransmissionTimer starts), the UE terminates the active time and waits for the start of the next active time.

At step 2330, the UE stops the onDurationTimer, drx-InactivityTimer, HARQ RTT timer, drx-Retransmission-Timer, and drxShortCycleTimer. By stopping the HARQ RTT timer and drx-RetranmsissionTimer, it is possible to prevent the UE from staying further in active time for HARQ retransmission. The UE also discards the data stored in the downlink HARQ buffer. By stopping the drxShort-CycleTimer, the UE applies the long DRX cycle other than the short DRX cycle. Afterward, the UE continues the normal DRX operation.

Figure 24:
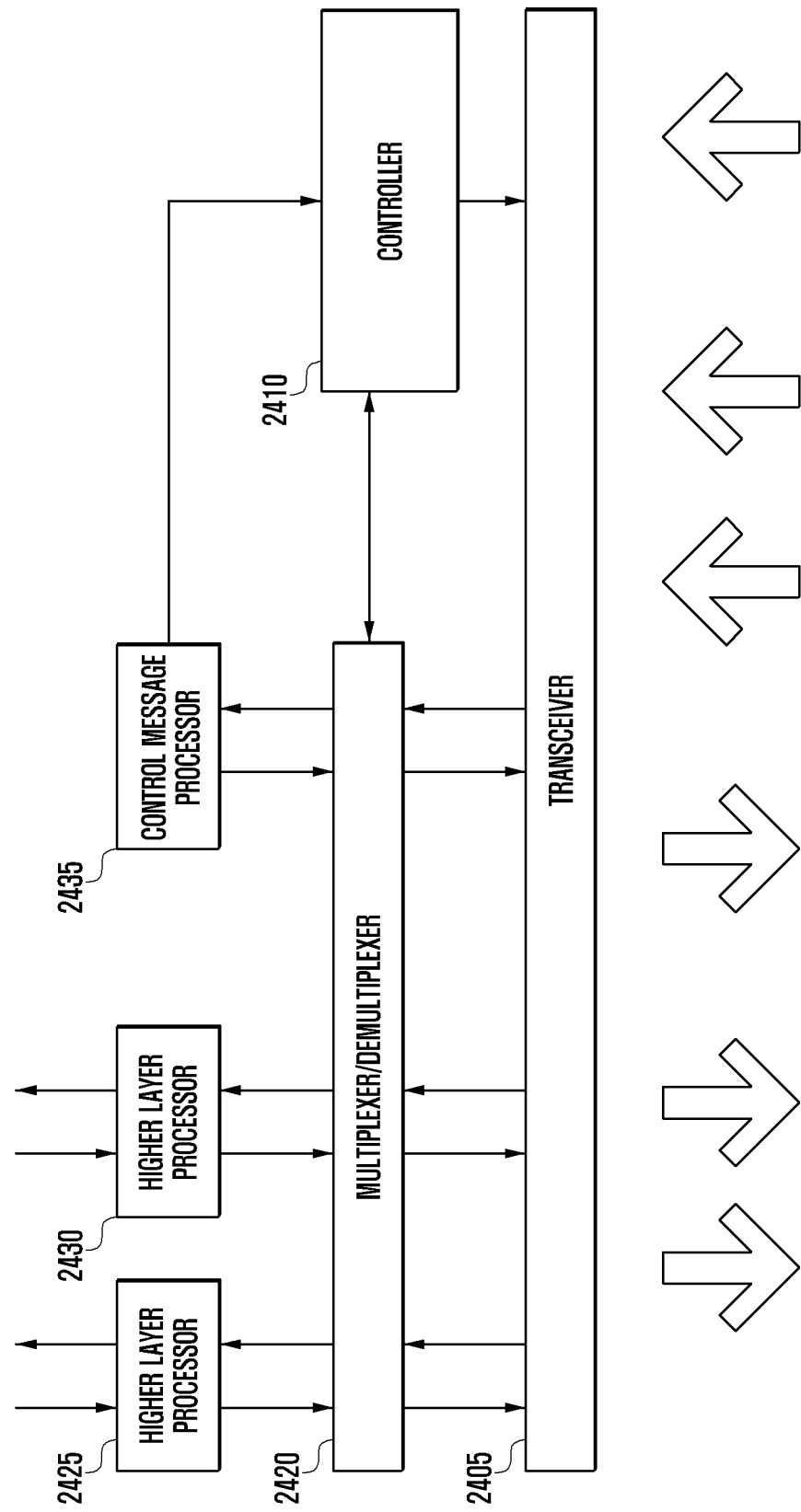
FIG. 24 is a block diagram illustrating a configuration of the UE according to an embodiment of the present disclosure.

FIG. 24 is a block diagram illustrating a configuration of the UE according to an embodiment of the present disclosure.

Referring to FIG. 24, the UE according to an embodiment of the present disclosure includes a transceiver 2405, a controller 2410, a multiplexer/demultiplexer 2415, a control message processor 2435, and various higher layer processors 2425 and 2430.

The transceiver 2405 receives data and predetermined control signals on the downlink channel of the serving cell and transmits data and predetermined controls signals on the uplink channel. If multiple serving cells are configured, the transceiver 2405 is capable of transmitting and receiving the data and control signals through multiple serving cells.

The multiplexer/demultiplexer 2415 multiplexes data generated by the higher layer processors 2425 and 2430 and the control message processor 2435 and demultiplexes the data received by the transceiver 2405 to deliver the demultiplexed data to the corresponding higher layer processors 2425 and 2430 and the control message processor 2435.

The control message processor 2435 is an RRC layer device and processes the control message received form the eNB to take a required action. For example, the control message processor 2435 processes the RRC control message to generate the SCell information, DRX information, SPS information, TTI bundling information, etc. to the controller. The control message processor checks which cell belongs to which TAG and sends the corresponding information to the controller 2410.

The higher layer processors 2425 and 2430 may be configured per service. The higher layer processors 2425 and 2430 process the data generated for the user services such as File Transfer Protocol (FTP) and Voice Over Internet Protocol (VoIP) to provide the processed data to the multiplexer/demultiplexer 2415 and process data from the multiplexer/demultiplexer 2415 to deliver the processed data to the higher layer service applications.

The controller 2410 checks the scheduling command, e.g. uplink grants, received by the transceiver 2405 and controls the transceiver 2405 and the multiplexer/demultiplexer 2415 to perform uplink transmission using appropriate transmission resource at appropriate timing. The controller also controls the SCell configuration and activation/deactivation.

The controller also controls configured resource-related UE operation, DRX-related UE operation, MDT-related UE operation, random access-related UE operation, TTI bundling-related UE operation, per-TAG uplink transmission timing management operation, etc.

Figure 25:
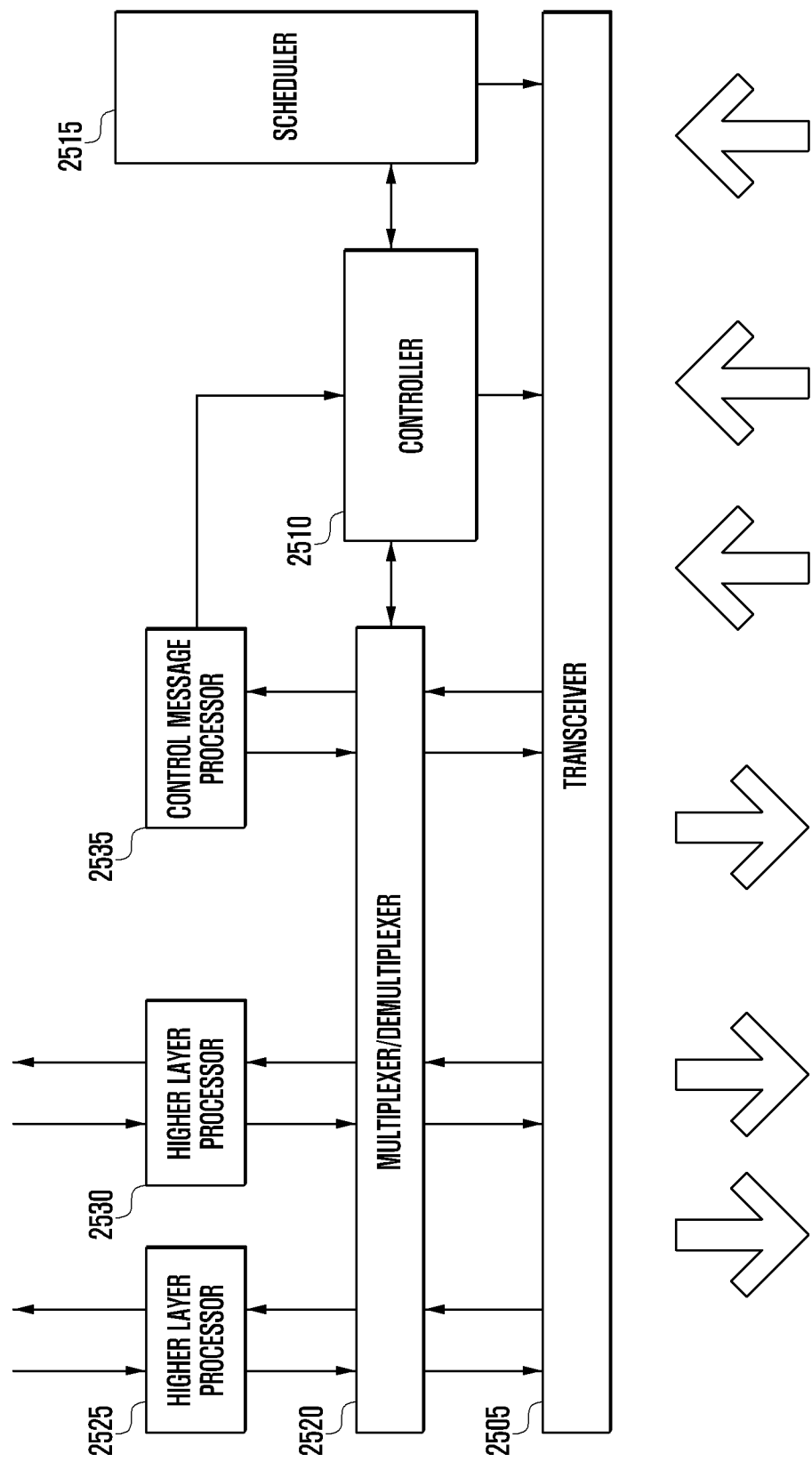
FIG. 25 is a block diagram illustrating a configuration of the eNB according to an embodiment of the present disclosure.

FIG. 25 is a block diagram illustrating a configuration of the eNB according to an embodiment of the present disclosure.

Referring to FIG. 24, the eNB according to an embodiment of the present disclosure includes a transceiver 2505, a controller 2510, a multiplexer/demultiplexer 2520, a control message processor 2535, various higher layer processors 2525 and 2530, and a scheduler 2515.

The transceiver 2505 transmits data and predetermined control signals on a downlink carrier and receives data and predetermined control signals on an uplink carrier. If multiple serving cells are configured, the transceiver 2505 is capable of transmitting and receiving the data and control signals through multiple carriers.

The multiplexer/demultiplexer 2520 multiplexes data generated by the higher layer processors 2525 and 2530 and the control message processor 2535 and demultiplexes the data received by the transceiver 2505 to deliver the demultiplexed data to the corresponding higher layer processors 2525 and 2530 and the control message processor 2535. The control message processor 2435 may process the control message transmitted by the UE to take a required action or generates a control addressed to the UE to the lower layer.

The higher layer processors 2525 and 2425 may be configured per service, processes the data received from S-GW or another eNB to generate RLC PDU to the multiplexer/demultiplexer 2520 or processes the RLC PDU from the multiplexer/demultiplexer 2520 to generate PDCP SDU to the S-GW or another eNB.

The scheduler 2515 allocates transmission resource to the UE at an appropriate time and controls the transceiver to process the signal transmitted by the UE and transmit the signal to the UE in consideration of the buffer state and channel state.

The controller 2510 controls the SCell configuration procedure and SCell activation/deactivation procedure. The controller also controls configured resource-related operation, DRX-related operation, MDT-related operation, random access-related operation, TTI bundling-related operation, TAG management operation, etc.

Although the description has been made with reference to particular embodiments, the present disclosure can be implemented with various modifications without departing from the scope of the present disclosure. Thus, the present disclosure is not limited to the particular embodiments disclosed but will include the following claims and their equivalents.

What is claimed is:

1. A method performed by a terminal in a wireless communication system, the method comprising:
    receiving, from a base station via a radio resource control (RRC) signaling, discontinuous reception (DRX) related information including a timer value related to an on-duration, a long DRX cycle value and a short DRX cycle value;
    receiving, from the base station, control information with a zero bit payload, the control information including a logical channel identifier (LCID), the LCID identifying a type of the control information;
    identifying the type of the control information based on the LCID;
    configuring a DRX cycle with the long DRX cycle value, in case that the control information is associated with a long DRX; and
    configuring the DRX cycle with the short DRX cycle value, in case that the control information is associated with a short DRX,
    wherein the long DRX and the short DRX are configured with the timer value related to the on-duration included in the DRX related information.

2. The method of claim 1, wherein the DRX related information further comprises a timer value related to a DRX inactivity and a timer value related to the short DRX cycle.

3. The method of claim 2, further comprising:
    stopping a timer related to the on-duration, a timer related to the DRX inactivity and a timer related to the short DRX cycle, in case that the control information is associated with the long DRX.

4. The method of claim 2, further comprising:
    stopping a timer related to the on-duration and a timer related to the DRX inactivity, in case that the control information is associated with the short DRX.

5. A method performed by a base station in a wireless communication system, the method comprising:
    transmitting, to a terminal via a radio resource control (RRC) signaling, discontinuous reception (DRX) related information including a timer value related to an on-duration, a long DRX cycle value and a short DRX cycle value; and
    transmitting, to the terminal, control information with a zero bit payload, the control information including a logical channel identifier (LCID), the LCID identifying a type of the control information,
    wherein a DRX cycle is configured with the long DRX cycle value by the terminal, in case that the control information is associated with a long DRX,
    wherein the DRX cycle is configured with the short DRX cycle value by the terminal, in case that the control information is associated with a short DRX, and
    wherein the long DRX and the short DRX are configured with the timer value related to the on-duration included in the DRX related information.

6. The method of claim 5, wherein the DRX related information further comprises a timer value related to a DRX inactivity and a timer value related to the short DRX cycle.

7. The method of claim 6, wherein a timer related to the on-duration, a timer related to the DRX inactivity and a timer related to the short DRX cycle are stopped by the terminal, in case that the control information is associated with the long DRX.

8. The method of claim 6, wherein a timer related to the on-duration and a timer related to the DRX inactivity are stopped by the terminal, in case that the control information is associated with the short DRX.

9. A terminal in a wireless communication system, the terminal comprising:
    a transceiver; and
    a controller coupled with the transceiver and configured to:
        receive, from a base station via a radio resource control (RRC) signaling, discontinuous reception (DRX) related information including a timer value related to an on-duration, a long DRX cycle value and a short DRX cycle value,
        receive, from the base station, control information with a zero bit payload, the control information including a logical channel identifier (LCID), the LCID identifying a type of the control information, identify the type of the control information based on the LCID, configure a DRX cycle with the long DRX cycle value, in case that the control information is associated with a long DRX, and configure the DRX cycle with the short DRX cycle value, in case that the control information is associated with a short DRX, wherein the long DRX and the short DRX are configured with the timer value related to the on-duration included in the DRX related information.

10. The terminal of claim 9, wherein the DRX related information further comprises a timer value related to a DRX inactivity and a timer value related to the short DRX cycle.

11. The terminal of claim 10, wherein the controller is further configured to stop a timer related to the on-duration, a timer related to the DRX inactivity and a timer related to the short DRX cycle, in case that the control information is associated with the long DRX.

12. The terminal of claim 10, wherein the controller is further configured to stop a timer related to the on-duration and a timer related to the DRX inactivity, in case that the control information is the associated with the short DRX.

13. A base station in a wireless communication system, the base station comprising:

a transceiver; and a controller configured to:

transmit, to a terminal via a radio resource control (RRC) signaling, discontinuous reception (DRX) related information including a timer value related to an on-duration, a long DRX cycle value and a short DRX cycle value, and transmit, to the terminal, control information with a zero bit payload, the control information including a logical channel identifier (LCID), the LCID identifying a type of the control information, wherein a DRX cycle is configured with the long DRX cycle value by the terminal, in case that the control information is associated with a long DRX, wherein the DRX cycle is configured with the short DRX cycle value by the terminal, in case that the control information is associated with a short DRX, and wherein the long DRX and the short DRX are configured with the timer value related to the on-duration included in the DRX related information.

14. The base station of claim 13, wherein the DRX related information further comprises a timer value related to a DRX inactivity and a timer value related to the short DRX cycle.

15. The base station of claim 14, wherein a timer related to the on-duration, a timer related to the DRX inactivity and a timer related to the short DRX cycle are stopped by the terminal, in case that the control information is associated with the long DRX.

16. The base station of claim 14, wherein a timer related to the on-duration and a timer related to the DRX inactivity are stopped by the terminal, in case that the control information is associated with the short DRX.

* * * * *